(12) United States Patent
Gounalis

(10) Patent No.: US 7,248,203 B2
(45) Date of Patent: Jul. 24, 2007

(54) SYSTEM AND METHOD FOR DETECTING AND JAMMING EMITTER SIGNALS

(75) Inventor: Anthony J. Gounalis, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 30 days.

(21) Appl. No.: 11/365,994

(22) Filed: Mar. 1, 2006

(65) Prior Publication Data

US 2007/0080847 A1    Apr. 12, 2007

Related U.S. Application Data

(63) Continuation of application No. 10/675,540, filed on Sep. 30, 2003, now Pat. No. 7,068,209.

(60) Provisional application No. 60/427,103, filed on Nov. 18, 2002.

(51) Int. Cl.
*G01S 7/38* (2006.01)
(52) U.S. Cl. .............................. 342/13; 342/15; 342/16
(58) Field of Classification Search ................. 342/22, 342/27, 28, 192, 193, 13–15, 89, 90, 98, 342/99, 195
See application file for complete search history.

(56) References Cited

U.S. PATENT DOCUMENTS

| | | | |
|---|---|---|---|
| 4,689,622 A | 8/1987 | Kuhrdt | |
| 4,695,790 A | 9/1987 | Mathis | |
| 4,726,050 A | 2/1988 | Menich et al. | |
| 4,860,318 A | 8/1989 | Shaw et al. | |
| 4,922,256 A | 5/1990 | Brandstetter | |
| 5,061,930 A | 10/1991 | Nathanson et al. | |
| 5,293,114 A | 3/1994 | McCormick et al. | |
| 5,363,103 A | 11/1994 | Inkol | |
| 5,563,806 A | 10/1996 | Barry et al. | |
| 5,727,204 A | 3/1998 | Greene, VII | |
| 5,884,294 A | 3/1999 | Kadar et al. | |
| 6,163,297 A | 12/2000 | Rose | |

(Continued)

OTHER PUBLICATIONS

"Performance bounds for interference mitigation in radar systems", Techau, P.M.; Guerci, J.R.; Slocumb, T.H.; Griffiths, L.J. Radar Conference, 1999. The Record of the 1999 IEEE 1999 pp. 12-17.*

(Continued)

*Primary Examiner*—John B. Sotomayor
(74) *Attorney, Agent, or Firm*—Wolf, Greenfield & Sacks, P.C.

(57) ABSTRACT

A system and method is provided for detecting emitter signals and for determining a scan strategy for a receiver system that receives such emitter signals. In one embodiment, the scan strategy may be computed to operate in a manner cognizant of on-board active jammers, optimizing the jammer band and intercept band performance. The additional inputs for this task are a jammer band assignment table, and a blanking assignment table. The capability to generate "dry" (no jam) and "wet" (jamming) scan strategies for an emitter set is provided, with separate intercept rules for each.

6 Claims, 32 Drawing Sheets

U.S. PATENT DOCUMENTS

| | | |
|---|---|---|
| 6,177,902 B1 | 1/2001 | Huntley et al. |
| 6,313,781 B1 | 11/2001 | Lee |
| 6,313,794 B1 | 11/2001 | Rose |
| 6,388,604 B1 | 5/2002 | Lee |
| 6,476,755 B1 | 11/2002 | Senio et al. |
| 6,538,597 B1 | 3/2003 | Steudel |
| 6,697,007 B2 | 2/2004 | Greet |
| 6,914,552 B1 * | 7/2005 | McEwan .................... 342/22 |
| 2004/0117139 A1 | 6/2004 | Gounalis |
| 2004/0130477 A1 | 7/2004 | Gounalis |

OTHER PUBLICATIONS

"Analysis of an on-off jamming situation as a dynamic game", Mallik, R.K.; Scholtz, R.A.; Papavassilopoulos, G.P. Communications, IEEE Transactions on vol. 48, Issue 8, Aug. 2000 pp. 1360-1373.*

"Application of passive location and data fusion techniques in emitter target tracking", Liu-Yi-An, Chen-Song-Can; Liu-Tong-Ming; Han-Bin. Systems-Engineering-and-Electronics (China), vol. 25, No. 8, p. 946-70, Aug. 2003.

"Bistatic sensor cross correlation for emitter location", Pollard-R-J-E-; Gould-D-M. 28$^{th}$ European Microwave Conference Proceedings, vol. 1, Amsterdam, Netherlands, Oct. 6-8, 1998, In: p. 540-5 vol. 1.

"The ADELE passive jammer location demonstrator", Dean-A-M. IEE Colloquium on 'Signal Processing Techniques for Electronic Warefare' (Digest No. 024), London, UK, Jan. 31, 1992, p. 3/1-6.

"Meeting the challenge of ESM/ECM integration", Greer-T-H. Defense-Electronics (USA), vol. 17, No. 9, p. 74-82, Sep. 1985, Translation in: A01.

* cited by examiner

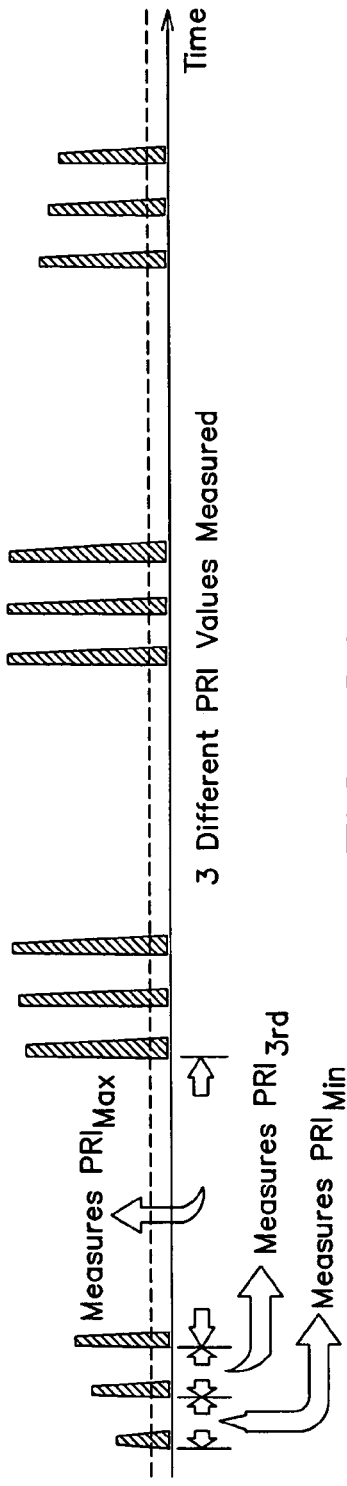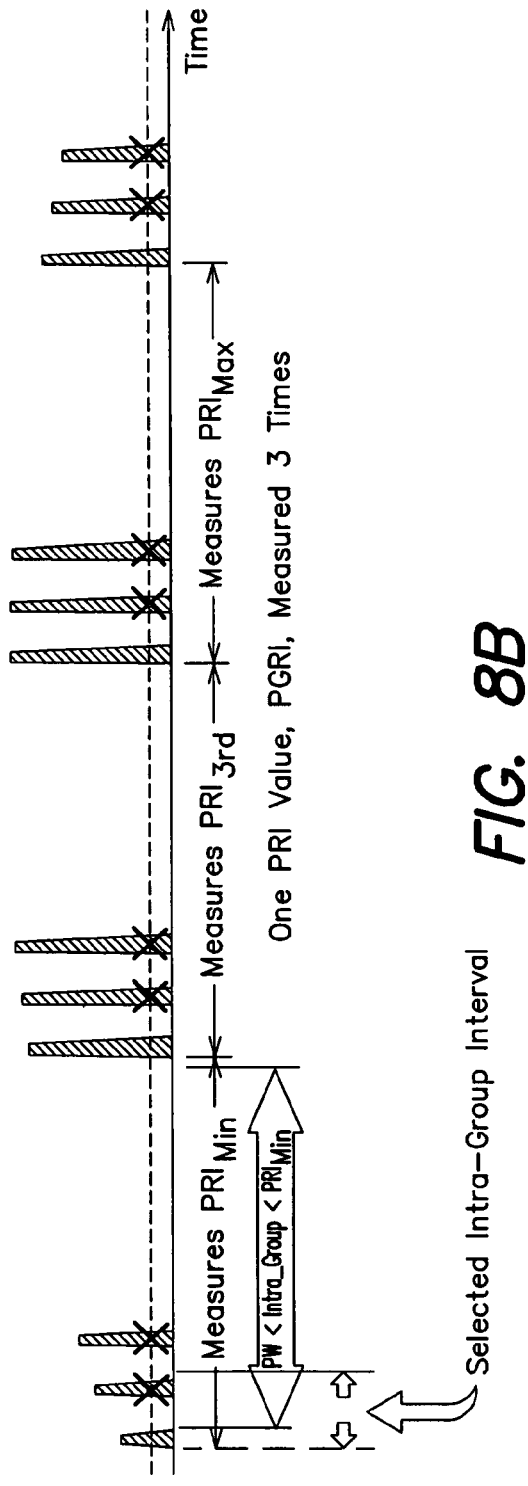

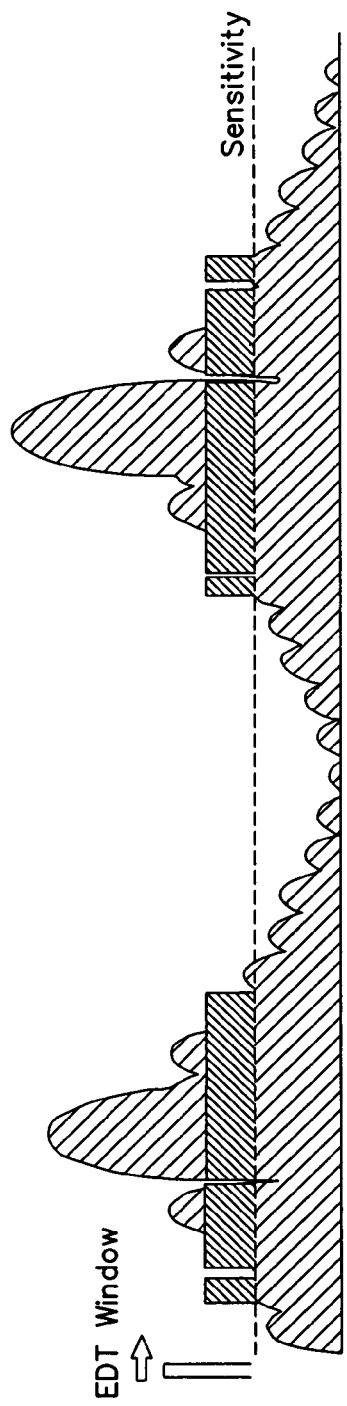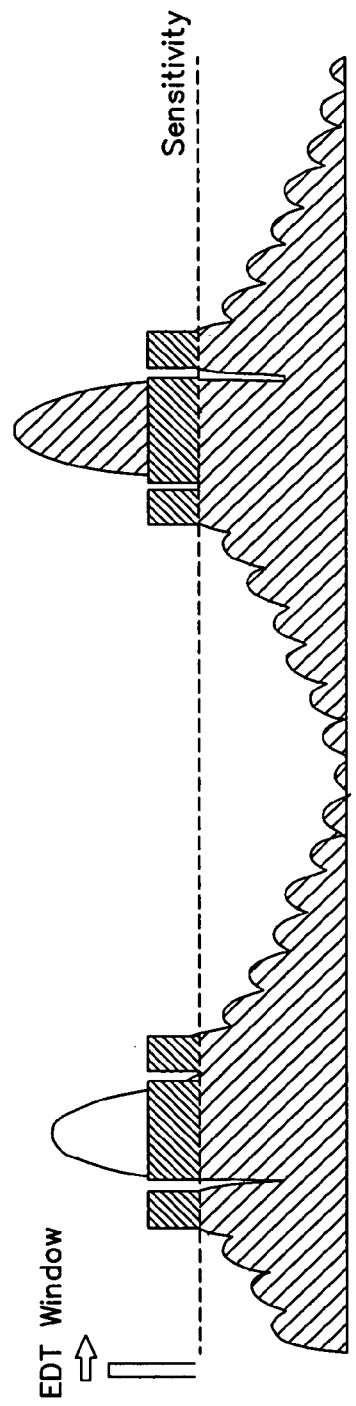

| Emitter Name | Detecting Method 1 250MHz IF/ 15MHz VBW RVT | Detecting Method 2 30MHz IF/ 15MHz VBW RVT | RF Min (MHz) | RF Max (MHz) | Min MDT (ms) |
|---|---|---|---|---|---|
| E1 | 100 ms | 650 ms | 1000 | 1300 | 3 |
| E2 | 120 ms | 780 ms | 1220 | 1350 | 5 |
| E3 | 110 ms | 330 ms | 1510 | 1810 | 2 |
| E4 | 130 ms | 390 ms | 1730 | 1860 | 4 |

Solution 1

| Dwell 1 |
|---|
| $DD_{Max} = 5$ |
| $RVT_{Min} = 100$ |

Cost = 5/100 = .05

Solution 2

| Dwell 1 | Dwell 2 | Dwell 3 | Dwell 4 | Dwell 5 | Dwell 6 | Dwell 7 | Dwell 8 | Dwell 9 |
|---|---|---|---|---|---|---|---|---|
| $DD_{Max}$ 3 | $DD_{Max}$ 3 | $DD_{Max}$ 3 | $DD_{Max}$ 3 | $DD_{Max}$ 3 | $DD_{Max}$ 3 | $DD_{Max}$ 3 | $DD_{Max}$ 5 | $DD_{Max}$ 5 |
| $RVT_{Min}$ 650 | $RVT_{Min}$ 650 | $RVT_{Min}$ 650 | $RVT_{Min}$ 650 | $RVT_{Min}$ 650 | $RVT_{Min}$ 650 | $RVT_{Min}$ 650 | $RVT_{Min}$ 650 | $RVT_{Min}$ 650 |

Total Cost = Cost 3/650 + Cost 3/650 + Cost 3/650 + Cost 3/650 + Cost 3/650 + Cost 3/650 + Cost 3/650 + Cost 5/650 + Cost 5/650 = 31/650 ≈ .048

FIG. 14A

Solution 1

| Dwell 1 |
|---|
| $DD_{Max} = 4$ ms |
| $RVT_{Min} = 330$ ms |

$Cost = 4/330 = .01\overline{2}$

Solution 2

| Dwell 1 | Dwell 2 | Dwell 3 | Dwell 4 | Dwell 5 | Dwell 6 | Dwell 7 | Dwell 8 | Dwell 9 |
|---|---|---|---|---|---|---|---|---|
| $DD_{Max}$ 2 | $DD_{Max}$ 2 | $DD_{Max}$ 2 | $DD_{Max}$ 2 | $DD_{Max}$ 2 | $DD_{Max}$ 2 | $DD_{Max}$ 2 | $DD_{Max}$ 4 | $DD_{Max}$ 4 |
| $RVT_{Min}$ 330 ms | $RVT_{Min}$ 330 ms | $RVT_{Min}$ 330 ms | $RVT_{Min}$ 330 ms | $RVT_{Min}$ 330 ms | $RVT_{Min}$ 330 ms | $RVT_{Min}$ 330 ms | $RVT_{Min}$ 330 ms | $RVT_{Min}$ 330 ms |

$Cost\ 2/330 + Cost\ 2/330 + Cost\ 2/330 + Cost\ 2/330 + Cost\ 2/330 + Cost\ 2/330 + Cost\ 2/330 + Cost\ 4/330 + Cost\ 4/330 = 22/330 = .0\overline{6}$

*FIG. 14B*

| Emitter | Dwell Duration (ms) | Revisit Time (ms) |
|---|---|---|
| Emitter 1 | 1 | 500 |
| Emitter 2 | 2 | 1200 |

FIG. 19

| Emitter | Dwell Duration (ms) | Revisit Time (ms) | Cost |
|---|---|---|---|
| Emitter 1 | 1 | 500 | .002 |
| Emitter 2 | 5 | 1000 | .005 |

| MDT | EDT | RVT |
|---|---|---|
| 3.05 | 17 | 2868 |
| 3 | 19 | 2000 |
| 3 | 19 | 2000 |
| 1 | 7 | 500 |
| 2 | 9 | 700 |
| 2.3 | 11 | 800 |
| 0.5 | 3.5 | 1000 |

Data — 9044

FIG. 24B

| MDT | EDT | RVT |
|---|---|---|
| 1 | 7 | 500 |
| 2 | 9 | 700 |
| 2.3 | 11 | 800 |
| 0.5 | 3.5 | 1000 |
| 3 | 19 | 2000 |
| 3 | 19 | 2000 |
| 3.05 | 17 | 2868 |

Data — 9044, 9048, 9049, 9050

FIG. 24C

| MDT | EDT | RVT |
|---|---|---|
| 1 | 7 | 500 |
| 2 | 9 | 700 |
| 2.3 | 11 | 800 |
| 3 | 19 | 2000 |
| 3.05 | 17 | 2868 |

Data — 9044, 9051, 9052

FIG. 24E

Data (9044)
| MDT | EDT | RVT |
|---|---|---|

Solution (9046)
| MDT | EDT | RVT |
|---|---|---|
| 1 | 19 | 500 |
| 2 | 11 | 700 |

FIG. 24F

Solution (9046)
| MDT | EDT | RVT |
|---|---|---|
| 1 | 19 | 500 |
| 2 | 11 | 700 |

FIG. 24D

Data (9044)
| MDT | EDT | RVT |
|---|---|---|
| 2 | 9 | 700 |
| 2.3 | 11 | 800 |

Solution (9046)
| MDT | EDT | RVT |
|---|---|---|
| 1 | 19 | 500 |

SYSTEM AND METHOD FOR DETECTING AND JAMMING EMITTER SIGNALS

RELATED APPLICATIONS

This application is a continuation of application Ser. No. 10/675,540, filed Sep. 30, 2003, now U.S. Pat. No. 7,068,209 entitled SYSTEM AND METHOD FOR DETECTING AND JAMMING EMITTER SIGNALS, which claims the benefit under 35 U.S.C. § 119(e) to commonly-owned U.S. provisional patent application Ser. No. 60/427,103, entitled SYSTEM AND METHOD FOR SCAN TABLE ANALYSIS AND GENERATION, filed on Nov. 18, 2002. Each of these applications is hereby incorporated by reference in its entirety.

FIELD OF THE INVENTION

The invention generally relates to signal detection, and more particularly, to detecting and analyzing signals generated by emitters.

BACKGROUND OF THE INVENTION

Detection systems exist for detecting signals generated by emitters which are of interest. For example, there are scanners (e.g., a police scanner) that are capable of scanning a frequency band for transmissions within that frequency band. In the case of a police scanner, channels are scanned sequentially to find a signal of interest. Scanning is achieved by tuning receiver hardware to a particular frequency to observe one or more transmissions within that particular frequency.

There are more sophisticated systems to detect transmitted signals that use other methods for determining signals of interest. For instance, there are what are referred to as Electronic Support Measures/Electronic Intelligence (ESM/ELINT) systems for conducting surveillance (e.g., radar, and other signals across a wide range of frequency spectrums). These systems detect one or more signals produced by emitters (often called "threats") that are detected and observed.

For example, in a military aircraft or other vehicle, enemy signals (e.g., radar) may be observed that are capable of detecting the vehicle (e.g., an airplane). These threats may need to be determined prior to detection to ensure the safety of the vehicle, and are often observed and classified to identify the particular threat. For example, certain signals may have particular signatures that are indicative of certain types of emitters. Further, there may be a need to detect and identify the location of a threat (e.g., a radar installation) for targeting purposes.

There is a problem in that there may be multiple threats but only a finite number of resources to detect them. More particularly, there may be hundreds of threats, but receiver capabilities do not allow all threats to be observed simultaneously at all frequencies. However, there is a need to scan the frequency spectrum in an efficient manner to detect all of the signals of interest. In some cases, there is a need to have assurance that a threat will be detected in time to respond to that threat. In the case of detection of a radar emitter by a vehicle, it may be also necessary to detect the threat before the threat is capable of detecting the vehicle.

There is difficulty in balancing the need for detecting each of numerous possible threats because of the finite resources of the detection system. That is, hardware and/or software (e.g., memory, processing capability, etc.) of the detection system may be limited to monitor only certain portions of the frequency spectrum of interest or may be limited to detecting a limited number of threats. Practically, there are a number of threats that are concurrently transmitting that should be detected, but it is expensive from a hardware standpoint to monitor all frequencies of interest at all times to detect all threats simultaneously. For example, U.S. Pat. No. 6,020,842 discloses one method for improving the probability of intercepting data transmitted in a number of different frequency bands. In summary, there is a continuing need for improved methods for detecting and analyzing emitter signals.

SUMMARY OF THE INVENTION

In one embodiment of the invention, a method for use in detecting and jamming emitter signals is provided. The method comprises acts of: determining, for at least one emitter, a period at which a jamming signal is applied; and determining, for the at least one emitter, a detection period, wherein the act of determining the detection period is based on the period in which the jamming signal is applied.

In another embodiment of the invention, a computer-readable medium is provided. The computer-readable medium has computer-readable signals stored thereon that define instructions that, as a result of being executed by a computer, instruct the computer to perform a method for use in detecting and jamming emitter signals, the method comprising acts of: determining, for at least one emitter, a period at which a jamming signal is applied; and determining, for the at least one emitter, a detection period, wherein the act of determining the detection period is based on the period in which the jamming signal is applied.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The invention is pointed out with particularity in the appended claims. The above and further advantages of this invention may be better understood by referring to the following description when taken in conjunction with the accompanying drawings in which similar reference numbers indicate the same or similar elements.

FIGS. 8A–8B are charts showing how signals are measured without and with pulse grouping logic, respectively;

FIGS. 10A–10B are charts showing time in beam (TIB) extraction for different sensitivity levels according to one embodiment of the invention;

FIG. 13 is a table showing an example of a portion of an information matrix, according to one embodiment of the invention;

FIGS. 14A and 14B are diagrams showing possible dwell placement solutions for the information matrix of FIG. 13, according to one embodiment of the invention;

FIG. 19 is a table showing emitter timing data, according to one embodiment of the invention;

FIG. 20 is a table showing emitter timing data and dwell cost, according to one embodiment of the invention;

FIG. 23 is a flow chart illustrating a method of

FIGS. 24A–24F are examples Solution and Data matrices, according to one embodiment of the invention;

DETAILED DESCRIPTION

Figure 1:
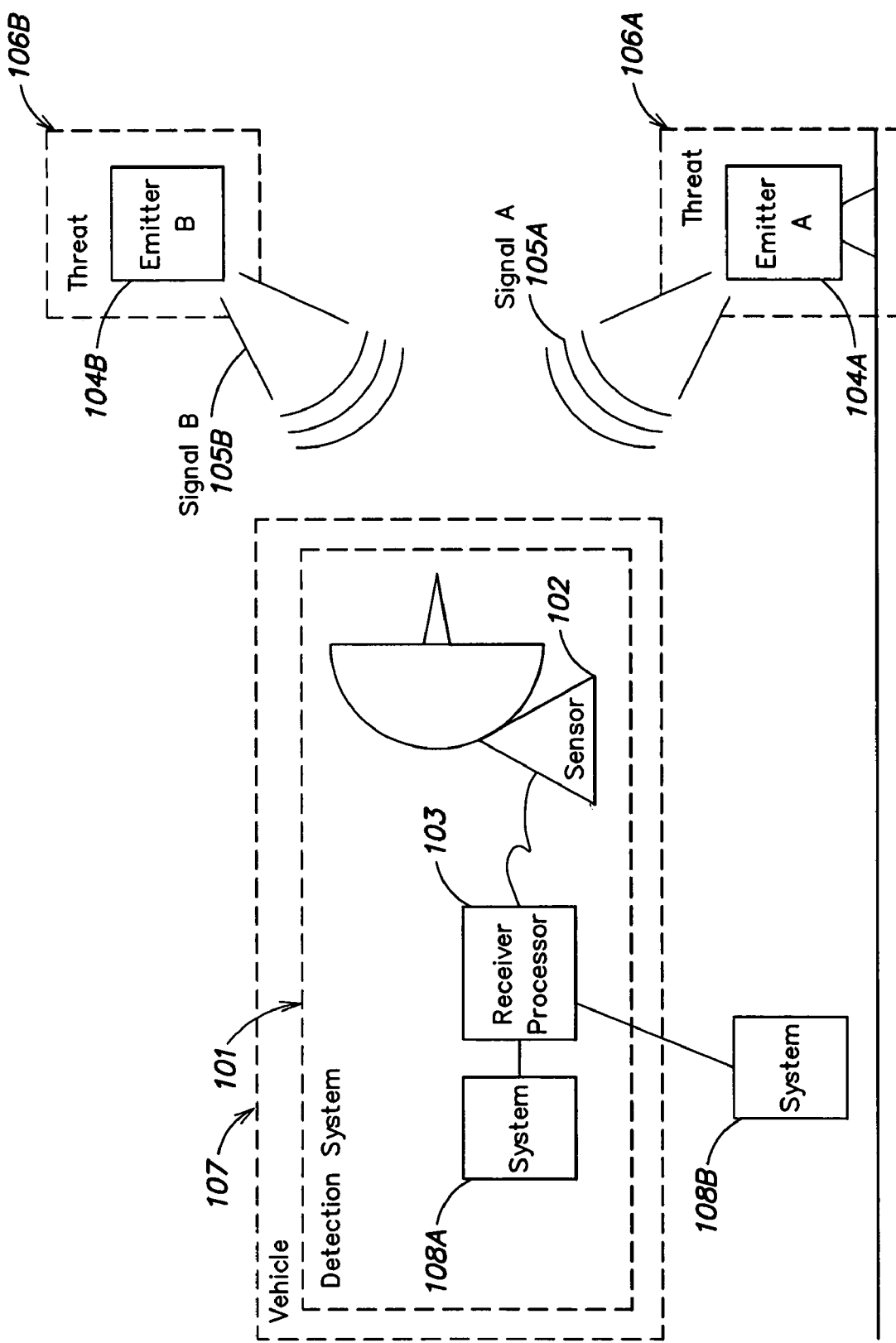
FIG. 1 is a block diagram of a detection system according to one embodiment of the invention.

According to one aspect of the present invention, an improved method is provided for detecting signals generated by one or more emitters. FIG. 1 shows an embodiment in which various aspects of the invention may be employed. In particular, a method for determining a scan strategy may be employed in conjunction with a detection system 101 that detects one or more signals 105A, 105B transmitted by one or more emitters 104A, 104B. As discussed above, these emitters 104A, 104B may be transmitted by one or more threats 106A, 106B, respectively.

Detection system 101 may include one or more sensors 102 and one or more processing systems 103 that receive and process signals 105A, 105B received by sensor 102. These signals 105A, 105B may be, for example, electromagnetic signals transmitted in any one of a number of frequencies, including radar, communication, and other types of signals. In one embodiment, the receiver or receivers may be capable of detecting one or several instantaneous frequency (IF) bandwidth and video bandwidth (VBW) combinations with varying sensitivity. Further, the detection system may employ alternate, single or multiple methods of signal detection.

Signals received from sensor 102 are passed to receive processor 103. In one aspect of the present invention, receiver processor 103 receives and processes multiple signals from one or more sensors 102 and implements a scan strategy. In particular, processor 103 may be capable of detecting one or more threats 106A–B by observing frequency bands defined by the scan strategy. This scan strategy may be provided by one or more systems 108A–108B, for example.

As discussed above, detection system 101 may be implemented in various ways. For example, a scan strategy may be computed offline by system 108B. The scan strategy may then be transferred to detection system 101, which is mounted in a vehicle. Detection system 101 may then implement the scan strategy computed by system 108B. Vehicle 107 may be, for example, an aircraft that flies a particular mission. Although system 101 may be installed on or used in conjunction with a vehicle 107, it should be appreciated that the invention is not limited to being used with a vehicle. For example, system 101 may be used as a standalone system, or may be a stationary or mobile unit.

System 101 may be implemented in hardware, software, or a combination thereof. In one embodiment of the invention, various components of system 101 may be implemented in a software program executing in a general purpose computer system (e.g., a personal computer (PC)). It should be appreciated that the present invention is not limited to any particular combination of hardware or software, but rather, the system may be implemented with any number and combination of hardware and/or software systems.

System 108A–108B may determine an optimum strategy for scanning the multiple signals according to various embodiments of the invention. In one embodiment of the invention, processing systems 108A–108B provide an evaluation of the strategy to determine whether each signal of interest is detected within defined constraints.

A determination of scan information (e.g., a scan database in the form of a scan table) that describes an optimum scan strategy may be performed by system 108A (e.g., system 108A may form part of detection system 101) or by a system 108B external to detection system 101 (e.g., a computer system configured to determine scan table information for detection system 101). Any system, either part of or separate from detection system 101 may be used to determine a scan strategy. According to one aspect of the present invention, a software program that executes on a PC may accept a number of parameters describing emitters of interest, system configuration information and in, one embodiment, actual emitter data to determine an optimum scan table for the detection system 101. The software program may be capable of producing scan information in a format that can be used to execute the determined scan strategy by detection system 101. For a detection system 101 implemented in a vehicle 107 (e.g. an aircraft), the software program may be operated prior to a mission to determine an optimum scan table, and the scan table may be input to the detection system 101 for use during a mission.

Figure 2:
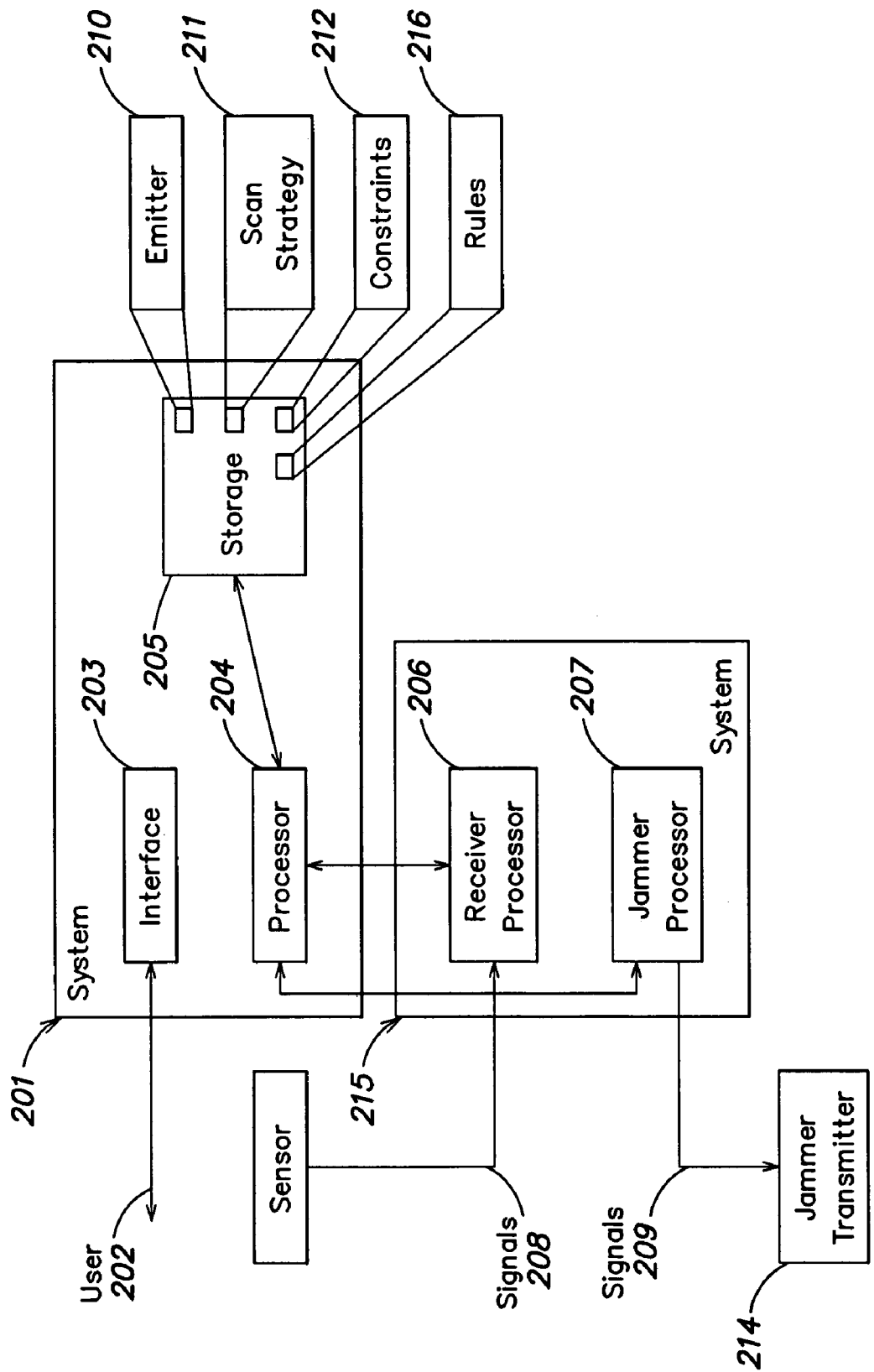
FIG. 2 is a block diagram of a detection system according to another embodiment of the invention.

FIG. 2 shows a system 201 for determining a scan strategy according to one embodiment of the invention. System 201 is similar in function to systems 108A–108B described above and is configured to determine a scan strategy for one or more detection systems (e.g., detection system 215). System 215, similar in function to systems described above, is configured to receive one or more signals 208 to be detected and identified. These signals may be received by one or more receiver/processor 206, outputs of which are processed by a processor 204. Processor 204 analyses and identifies these signals based on the scan strategy and other information provided by system 201 and information identified in the received signals.

As discussed above, these signals may be transmitted by one or more threats, and system 201 may be used in conjunction with a detection system (e.g., system 215) to identify these threats to a user. That is, system 101 may be operated to provide a scan strategy to detection system 215.

Further, system 201 may have an associated interface 203 to receive input from and display information to user 202. Interface 203 may be, for example, a graphical user interface of a computer system. User 202 may also provide input to system 201 to configure system 201, input define constraints, provide information regarding emitters, or provide any other type of input. According to one embodiment of the invention, a number of emitters are defined to the detection system 201 by user 202, and based on these emitters, a scan strategy 211 may be determined for one or more of these emitters. As discussed above, a system for determining scan strategy may be incorporated in a detection system, or may be implemented separately, and it should be appreciated that the invention is not limited to any particular implementation.

System 201 may include an associated storage 205 for storing one or more emitters 210 that includes one or more emitter entries, a scan strategy 211, any constraints 212, and rules 216 for processing emitters. Although FIG. 2 shows storage 205 that is part of system 201, it should be appreciated that storage 205 may be separate from system 201. Further, it should be understood that any portion of the data used by system 201 may be stored in any location, either on system 201 or elsewhere.

In one embodiment, an emitter entry includes a number of parameters that describe a particular emitter (e.g., frequency range, antenna type, scanning method used, etc.) Constraints 212 may include, for example, constraints of system 201 which may include, for example, processor 204 capability, memory limitations, or any other limitations of hardware and/or software of system 201 that may effect its performance in detecting and identifying signals 208. Constraints 212 may also include those limitations posed by a user (e.g., limitation to a particular frequency band of interest, removal of a particular emitter type, or other user limitation). Scan strategy 211 may include a number of entries that define one or more "dwells" used to scan one or more of the emitters defined in emitter database 210. A dwell generally defines scan resource solution(s) (e.g., frequency range to be scanned, sensitivity, scan period, revisit time, etc.) that meet one or more emitter requirements. A dwell may be used to configure a receiver that detects the one or more emitters that the dwell is designed to detect.

Optionally, system 201 may be adapted to determine a scan strategy taking into account the operation of one or more jammers 207 that actively provide signals 209 to a jammer transmitter 214 that "jams" one or more emitters. That is, system 215 may be capable of producing a signal that interferes with detection by a threat. According to one aspect of the invention, it is realized that a jammer may have an effect on detection of one or more signals by system 215, and therefore it may be beneficial to consider activity of a jammer in determining a scan strategy by system 201.

Determining Scan Strategy

According to one aspect of the present invention, a receiver scan strategy may be generated that provides optimal or near optimal intercept performance against an arbitrary selected set of emitter parameters. It is realized that a scan strategy that can enable efficiently scanning of a set of emitters and meet the intercept requirements of each emitter in the set. Also, based on one or more emitters of the set, a scan strategy may be determined that minimizes the number of tuning dwells used to detect the emitter(s). In another aspect of the present invention, the scan strategy minimizes the number of receiver resources necessary to detect one or more emitters of interest.

Figure 3:
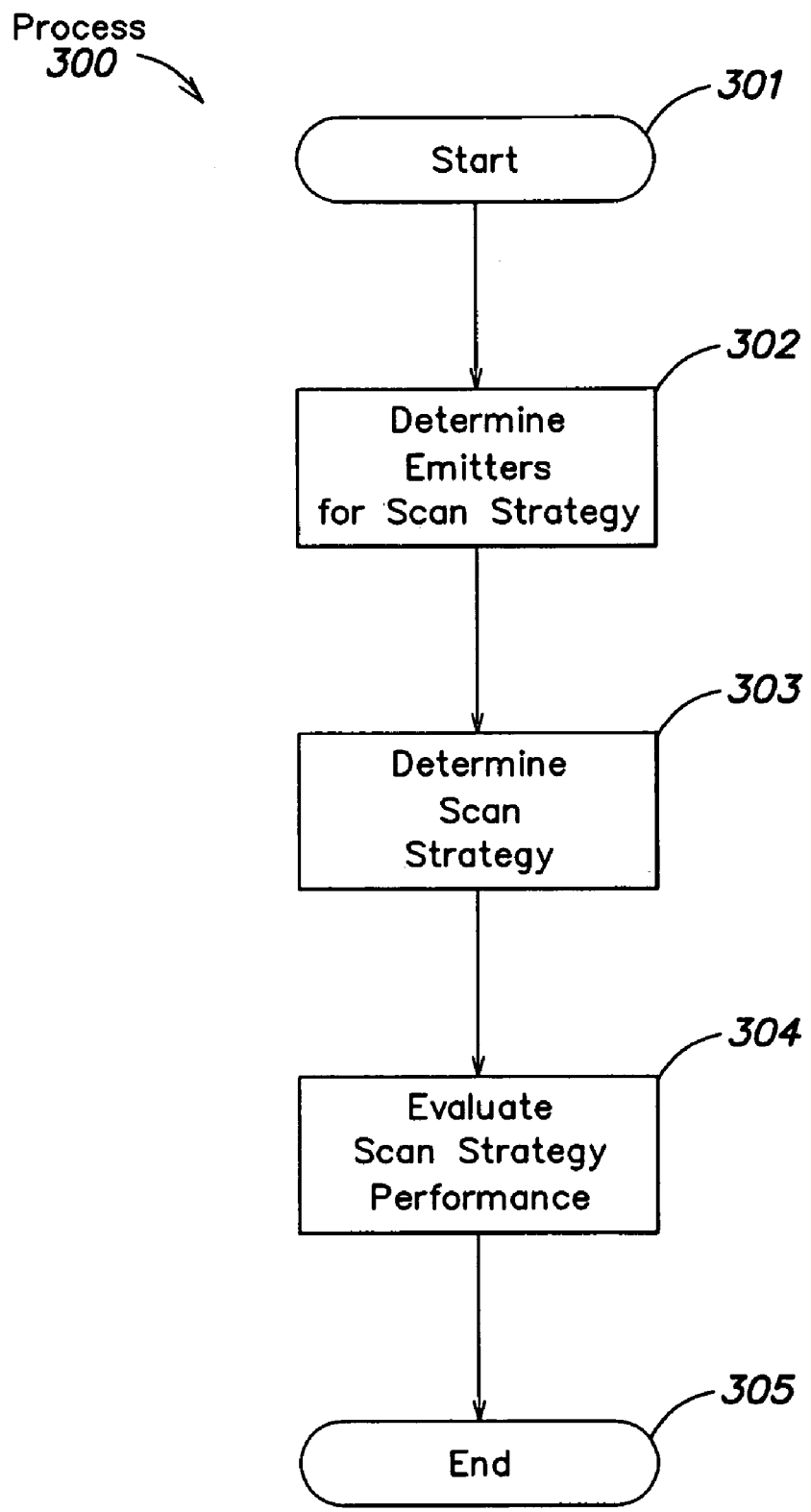
FIG. 3 is a flow diagram of a process for determining scan strategy according to one embodiment of the invention.

FIG. 3 shows a process 300 for determining a scan strategy. At block 301, process 300 begins. At block 302, a solution is determined for one or more emitters of interest. As discussed above, parameters associated with each emitter of interest may be input to system 201. System 201 may be capable of allowing a user to select emitters for which a scan strategy is to be determined. Optionally, constraints may be defined to system 201. A mathematical model may be constructed using emitter parameters and constraints, if any, that can be used to determine tuning dwells and their associated parameters. More particularly, at block 303, a scan strategy may be determined, for example, by determining dwells that meet the emitter requirements, selecting an optimum dwell set (e.g., based on cost of executing the dwell set). For instance, dwells may be defined that meet the requirements of a set of emitters, and dwells may be compared based on a cost of implementation, and dwells may be selected as part of a solution set of dwells based on their cost of implementation. According to one embodiment of the invention, a database of emitter parameters is used to determine a set of receiver tuning dwells that are minimal or near minimal in number and minimal or near minimal in usage of receiver resources, as allocated in time, the set of dwells, when executed, allows the receiver to satisfy its intercept requirements. Optionally, the determined scan strategy may be evaluated to measure its performance at block 304. At block 305, process 300 ends.

In one embodiment, a database of emitter parameters is created that includes intercept requirements for each emitter. In another embodiment, the database may include alternative and/or multiple intercept requirements per emitter.

Emitters in the database or a subset thereof are selected, and dwell parameters are determined for these selected emitters. According to one embodiment, the dwell solution may be constrained by one or more solution constraints, if any. In another embodiment, inputs are accepted that constrain the solution based on environmental knowledge of the operating theater or region. According to one aspect of the invention, each of the emitter model, its dwell solution(s), constraints, and other related information may be stored in an entity referred to as an emitter database.

Figure 4:
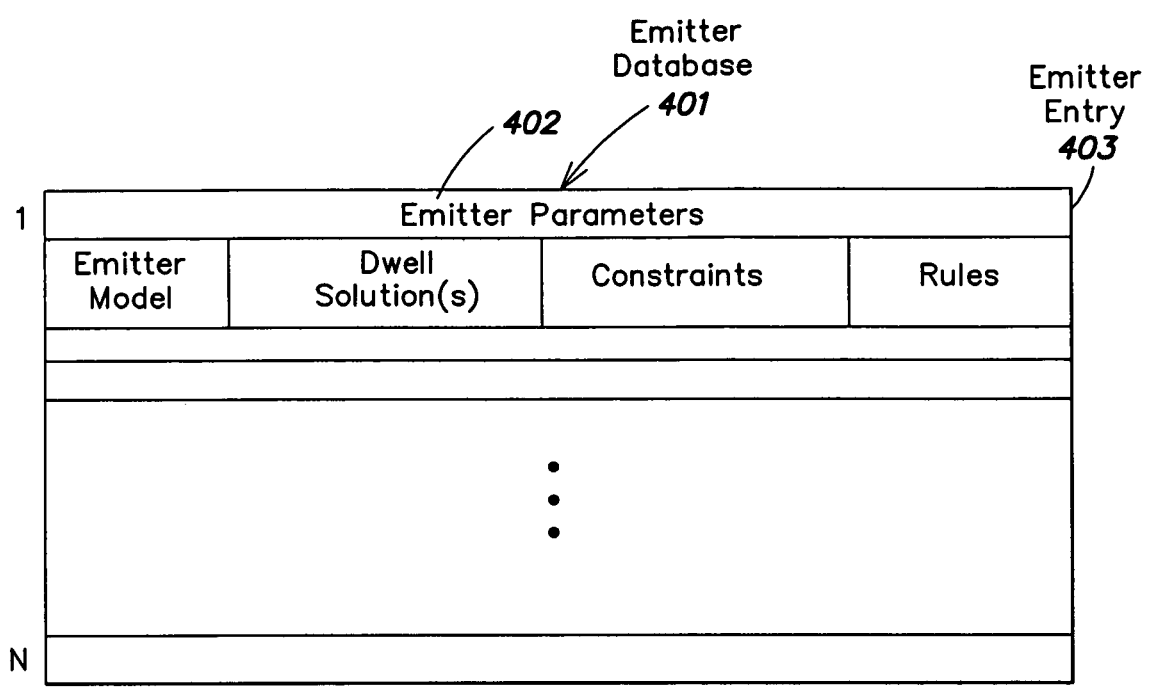
FIG. 4 is a block diagram of an emitter database according to one embodiment of the invention.

FIG. 4 shows an emitter database 401 according to one embodiment of the invention. More particularly, emitter database 401 includes one or more emitter entries 403, each of which corresponds to an emitter to be detected by the detection system (e.g., system 215). Associated with each emitter entry are a number of emitter parameters 402 which describe characteristics of each emitter. Emitter parameters 402 may also include one or more solutions for each emitter (e.g., dwell solutions that satisfy the emitter requirements). The emitter database 401 can take the form of an N by M matrix (referred to hereinafter as an "information matrix") that models emitters (N) and their potential solutions (M) in which the minimal solution set is contained. As discussed above, constraints may also apply to this N×M information matrix.

Based on the emitter and constraint (if necessary) inputs, dwell parameters may be computed for each selected emitter database entry (N inputs). This computation may be performed for every possible receiver tuning configuration (e.g., IF/VBW combination), yielding several potential solutions per emitter database entry (M).

As discussed above, modeling may be used to determine a scan strategy. In particular, a model of the receiver may be employed to establish receiver characteristics with respect to valid tuning configurations. An environment model may also be included to model electromagnetic propagation between each emitter and the receiver. For example, system 201 may model 2-dimensional and 3-dimensional emitter transmitted scan patterns. These models and their characteristics are then used to determine hardware settings of a receiver processor for detecting these emitters within particular constraints as discussed further below.

Determining an Optimal Dwell Solution

As discussed above, the emitter database 401 may include one or more dwell solutions for each emitter. These dwell solutions may include one or more parameters that specify tuning configurations to detect the emitter signal. According to one embodiment of the invention, emitter database 401 (e.g., an information matrix) may include, for example, one or more tuning parameters of the dwell including parameters referred to herein as dwell duration and revisit time. Dwell duration is the amount of time spent observing a particular frequency (e.g., a portion of the electromagnetic frequency spectrum), and the revisit time of a particular dwell frequency is the time between observations of that frequency. Revisit time may be solved for single and multiple illumination time cases, as appropriate.

A ratio of dwell duration and revisit time may be used to approximate the receiver "cost" of executing the dwell. Given an N by M information matrix, a search may be performed for an optimum solution that minimizes the cost of the dwells, and the solution may be constrained as necessary. According to one embodiment of the invention, the optimum solution may be defined as any set of scan strategy dwells that reduces both the dwell count and receiver usage, the receiver usage being defined as the sum of individual dwell durations divided by individual dwell revisit times.

Because a search for the optimal solution using this model is an NP-Complete problem that cannot be solved mathematically, several methods may be used to guide, limit and prune the search to avoid searching exhaustively. These methods include but are not limited to receiver segmentation (multiple receivers), frequency segmentation, field of view segmentation, pre-filtering and post-filtering techniques to set and reset potential solution paths, and partial path evaluation to identify and avoid false solutions. It should be appreciated that any method may be used to determine an optimal solution, and the invention is not limited to any particular solution determining method.

According to one embodiment of the invention, the receiver model may be used to take advantage of timing relationships between dwells to minimize the cost function and remove potential scan redundancy. Once an optimum solution is found, it is still possible that the solution cannot be realized, given hardware and/or software constraints of the receiving system. This condition may be detected and a realizable solution may be determined, for example, by fully consuming the constrained capacity, then completing the solution search with the consumed capacity excluded from potential solution set. A solution search may be performed iteratively on each capacity modeled, until a viable solution is found, or the conclusion is drawn that no viable solution exists (e.g., the receiving system lacks the hardware or software resources to solve the desired intercept problem requirements).

Receiver dwells may be outputted by system 201 along with data indicating estimated real-world performance. This information may be output, for example, to a user for evaluation purposes. Scan strategy (e.g., a set of receiver dwells) may be output by system 201 to a receiver system capable of performing the scan strategy. Alternatively, system 201 may be part of the receiver system, and there fore may be part of a system that executes the scan strategy. The set of dwells used by the receiver system may be output in a form usable by the receiver system.

In another embodiment of the invention, it is recognized that ELINT and ESM receiver systems are designed to intercept non-cooperative signals of interest. Because the signals are non-cooperative, the receiver system analyzes all detected signals present in the environment to discriminate signals of interest from environmental noise and incidental background signals. Because the detection environment complicates detection of emitters of interest, computational and throughput burdens are imposed on the receiver system and these burdens can slow signal intercept performance. Thus, it may be beneficial to reduce the effects of the processing burden and improve receiver intercept performance in the presence of significant environmental background energy.

ELINT and ESM receivers employ a scan strategy to scan the frequency spectrum for signals of interest. This scan strategy comprises a set of dwells, which define for how long energy is sampled in a portion of the frequency spectrum, and how often that portion of the frequency spectrum should be sampled. These are referred to as Dwell Duration (DD) and dwell Revisit Time (RVT) respectively. Dwell Duration may be further subdivided into two time intervals, Minimum Dwell Duration (MDT) and Extended Dwell Duration (EDT). A value of MDT defines the shortest time period spent for a given dwell, while a value of EDT defines the maximum amount of time spent for the given dwell. The actual time spent (Dwell Duration) ranges between these two limits, based on the signal density in the sampled portion of the spectrum.

Described below are various aspects of the invention which relate to the detection of emitter signals and/or determination of a scan strategy. Each aspect, although described below in terms of one or more examples, is independent and therefore each independent is not limited to the examples, or to any other aspects described herein.

Discontinuity Correction

As discussed above, emitters may be modeled using parameters that describe the transmission characteristics of the emitter signal. These characteristics are commonly referred to in the art as an antenna model. These characteristics may include, for example, beamwidth, frequency range, gain (e.g., in main beam and side lobes), etc.

Often, there may be errors in the models that may affect how the emitters are processed and detected. When revisit times are computed for each receiver detecting method (e.g., HW bandwidths) for an emitter in an information matrix of emitters, they may not be monotonically increasing/decreasing as expected due to discontinuities in the emitter antenna model. According to one embodiment, these discontinuities are identified and errors are flagged if the correction would be large enough to imply an error in the model. These errors may be created, for example, during emitter input (e.g., a data entry error) may be due to a data integrity error, or other reason. In conventional detection systems, such errors are not detected and if unrecognized, would lead to an inefficient or erroneous dwell strategy.

More specifically, it is assumed that the antenna structure of an emitter will have a main beam which is several degrees (or fractions of a degree) wide, and a sidelobe structure situated on either side of the main beam. These side lobes will have lower magnitude moving away from the main beam, and this magnitude drops sharply as the distance from the main beam becomes greater.

If a system used to detect such an emitter sees an atypical lobing structure, the emitter may be ignored as the antenna model is incorrect (and therefore the emitter should not be used to determine the dwell solution). For instance, using the antenna model described above, it is expected that as the sensitivity of the receiver is adjusted to detect more of the model (e.g., sidelobes), the revisit time for detecting should also increase. If the revisit time decreases as sensitivity increases, an error may exist in the antenna model.

Figure 5:
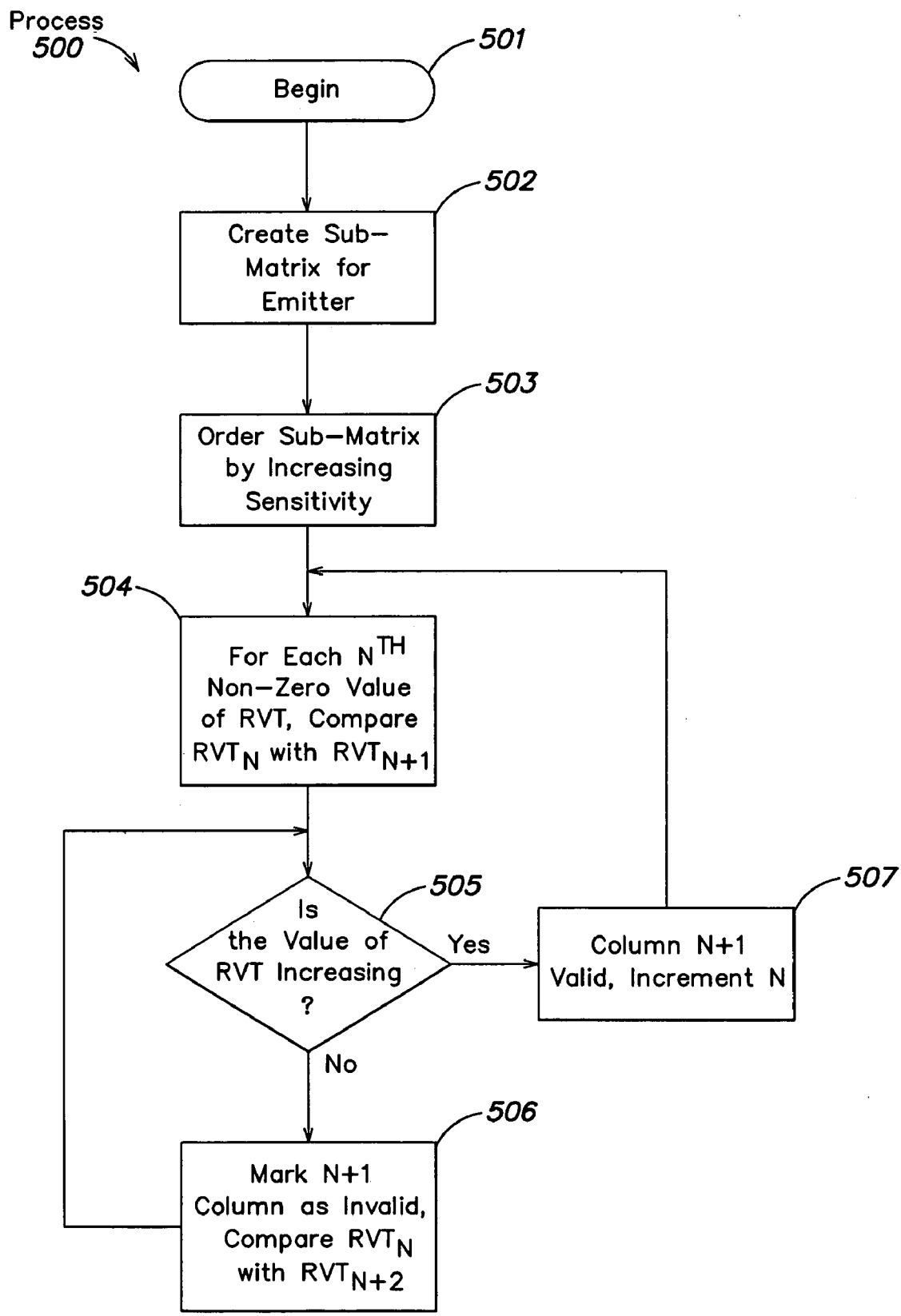
FIG. 5 is a flow chart of a process for evaluating an antenna model according to one embodiment of the invention.

FIG. 5 shows a process 500 for evaluating an antenna model according to one embodiment of the invention. This process may be performed, for example, by a detection system (e.g., system 201). At block 501, process 500 begins. As part of determining dwell duration, dwell revisit time (RVT) is computed for each detecting method (e.g., IF and video bandwidth combinations) of the receiver. At block 502, a sub-matrix may be created for each emitter/emitter mode processed, each row representing the results for each emitter/mode, and each column representing one of the detecting methods. At block 503, the columns are ordered by increasing sensitivity of the detecting method. Because the columns are in increasing sensitivity order, physics dictates that the computed revisit time (RVT) across the columns should be equal or monotonically increasing. Therefore, according to one embodiment of the invention, a method is provided that determines whether revisit time decreases as sensitivity increases, and if so, an error is identified.

According to one embodiment, an algorithm is provided that analyzes the emitter matrix for errors in an antenna model. In one example shown in FIG. 5, the detection system loops through each row of the sub-matrix and compares the $N^{th}$ non-zero value of RVT to N+1 value, to identify a decreasing delta (in one embodiment, a value of zero is used to indicate that no RVT computation was performed for the corresponding detection method). In particular, the detection system evaluates for each $N^{th}$ non-zero value of RVT, the difference between the values of $RVT_N$ and $RVT_{N+1}$, at block 504. At block 505 it is determined whether the value of RVT is increasing, and if so, the N+1 column is determined to be valid, and N is incremented at block 507. If the value of RVT is decreasing the N+1 column is marked as invalid, and the $N^{th}$ column is compared with the $N^{th}+2$ column to determine whether RVT is increasing. If no discrepancies are found, then the column of the sub-matrix is valid.

Optionally, if the deltas are small enough, the column values are put in ascending RVT order, under the assumption that the error is due to a minor modeling discontinuity. An error may be considered "large enough," for example, depending on how good the antenna model is (e.g., whether the antenna model is accurate in its description of the lobing structure) and how closely the detection system should adhere to this model. For example, if the antenna model is determined empirically from data, and data points are interpolated, a less-stringent error may be needed to account for minor errors in the model. However, if the model is based on range testing or some other more accurate method, then the allowable error may be less. According to one embodiment, this error is configurable by an operator according to the antenna model used. For instance, the model could be considered valid if error is not greater than 30%. However, it should be appreciated that the error value could be adjusted to any acceptable value to identify model errors without triggering false indications, and that the invention is not limited to any particular value.

If the detected error is large, no correction is made and the error is left for downstream validation to detect and flag to the operator (e.g., via interface 203). In one embodiment of the invention, the algorithm may be performed as part of process 300 for determining a scan strategy as discussed above. In particular, the algorithm may be performed as part of, for example, block 302 wherein emitter data is input, and is checked for discontinuities prior to determining a dwell strategy.

Figure 6:
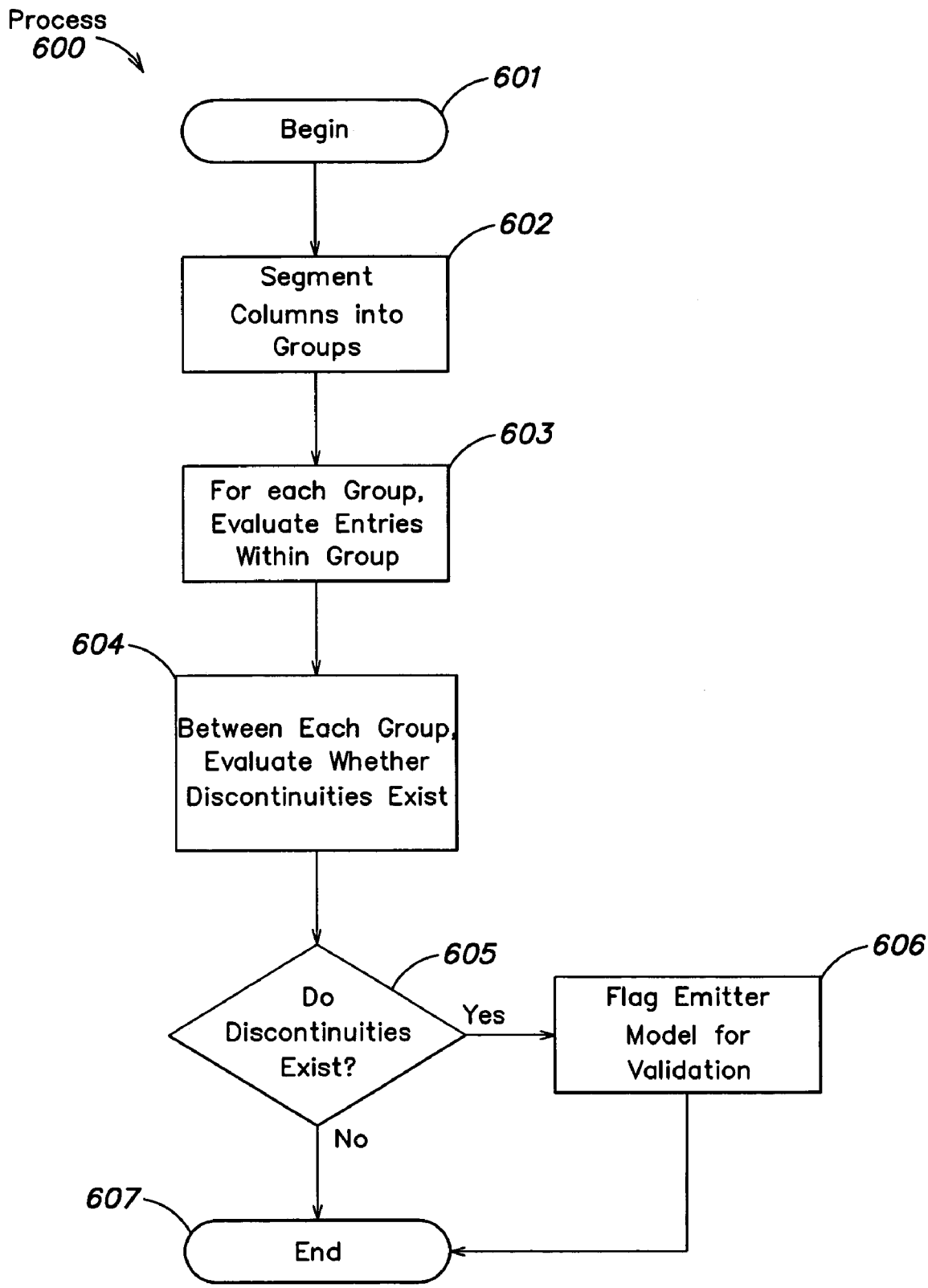
FIG. 6 is a flow chart of another process for evaluating an antenna model according to one embodiment of the invention.

FIG. 6 shows another process 600 for evaluating an antenna model according to one embodiment of the invention. At block 601, process 600 begins. According to this embodiment, the evaluation is segmented by columns at block 602, allowing comparisons across groups of related columns, and therefore the detection system can perform comparisons between groups of related detecting methods. For each group, the detection system evaluates the entries within the group at block 603. This evaluation for a sub-group may be similar to the evaluation performed on an entire group as discussed above with reference to FIG. 5. In one embodiment of the invention, seven columns are checked in two passes, one pass testing the monotonic relationship across the first four columns representing a first group, and the other pass testing across the last three columns representing a second group. According to one embodiment, detecting methods within a group may be reordered within that group. Discontinuities among the groups can also be identified (e.g., at block 604). In one embodiment of the invention, if there is a discontinuity between groups, it is left uncorrected to be flagged by downstream validation logic for the operator's resolution or resolution by another process. For instance, at block 606, the emitter model may be flagged as being suspect for resolution by the operator or another process. At block 607, process 600 ends.

According to one embodiment of the invention, evaluation of error may be performed within video bandwidth (VBW) groups. More particularly, groups may be placed, for example, in ascending order, and errors determined by comparing consecutive entries. As discussed above, entries having a decreasing value within the ascending order may be ignored, while errors due to minor sensitivity deltas may be corrected. Errors between IF bandwidths may also be detected, however, the error may be coarser, and therefore the error tolerance greater between entries.

In this manner, the accuracy of the emitter database is increased, and as a result, the scan strategy based on the more accurate database is more accurate. More particularly, errors in the emitter database are eliminated and removed prior to determining the scan strategy, and therefore the scan strategy is more accurate.

Multi-valued Illumination Time Revisit Time Calculation

As discussed above, an emitter may, for example, present more than one illumination time to a detecting receiver. For example, a multifunction radar that both sweeps azimuth and changes its elevation angle presents multiple illuminations to be detected. In this example, each pass of the radar provides a different power level beam width to the receiver that should be detected.

According to one aspect of the present invention, a method is provided for computing the revisit time for an emitter that presents more than one unique value of illumination time to the detecting receiver. In one embodiment, each of the multivalued illuminations are represented as a single emitter, and a revisit time is calculated that meets requirements for detecting any of the illuminations.

The revisit time equation is a closed-form equation when illumination time is single valued, but needs to be solved iteratively when it is not. An inefficient approximation is to take the average of the illumination time values and use the closed form equation. Conventional systems generally use the average value and it is realized that this average value is not, in general, the most efficient solution. According to one aspect of the invention, a detection system uses a more weighted method for determining revisit time for multivalued illuminations, in one embodiment, an open-form equation is used to determine a corresponding revisit time for multivalued illuminations. Therefore, one aspect of the invention involves solving the open-form equation in an iterative manner within a tolerance (e.g., an acceptable probability of detecting each illumination). In one embodiment, an initial RVT is determined based on an average value of the time in beam (TIB) of all of the illuminations of interest. The average value of RVT may be, in most instances, a good "first guess" at an RVT value which can be improved upon iteratively. For instance, in one embodiment, the initial RVT may be estimated (e.g., by taking the average value) and then adjusted to meet a desired probability of detection.

In one embodiment of the invention, dwell revisit time (RVT) is determined for each detecting method (e.g., IF and video bandwidth combinations) of the receiver. This computation involves evaluating the following equation:

$$RVT = TIB\left(1 - \frac{N}{\text{Ln}(1 - Pd)}\right) \quad \text{Equation 1}$$

Where N is the number of detection opportunities (e.g., allowable radar "paints"), Pd is the desired probability of detection and TIB is the expected duration of each "paint" or illumination. TIB is only a single value for 2D scans under static conditions. For 3D scans, there may be several values of TIB per "paint" (N), and under dynamic scenarios, 2D TIB increases/decreases on subsequent paints based on decreasing/increasing range, respectively.

The following example process determines RVT with several TIB values per paint N and varying TIB values per paint N. This process includes an assessment of the partial contribution of each TIB in satisfying the overall probability of detect, and incrementing/decrementing the trial RVT value until the sums satisfy the desired probability of detection, within a tolerance.

Given:
  TIBS: A vector of illumination times for the observation period
  Pd: Desired probability of detection
  STEP: Minimum RVT increment
  $RVT_{max}$: Maximum permissible RVT value
  The following process may be used to determine RVT:
1. Initialize the constants NI and PPT.
  NI:=integer number of "paints" in the observation period
  PPT:=number of elements in TIBS
  These represent the total number of passes the radar makes across the search volume, and the total number of paints within that are observable within the search volume across the observation period, respectively. If the TIBS data represents 3D scan information, these constants are adjusted as follows:
  PPT:=PPT÷NI (paints per volume search)
  NI:=1
2. Using Equation 1 above, compute the initial RVT by setting N to NI and TIB to the average value of TIBS. If the resulting RVT is larger than the largest value in TIBS (and therefore the average value of TIBS may not be the best "first guess"), re-compute RVT with TIB set to the max value of TIBS and N=1.
3. RVT is now that initial solution. Determine the search direction:

$$\text{SIGN} = \ln(1 - Pd) - \sum_{M=1}^{PPT} \frac{NI}{1 - \frac{RVT}{TIBS_M}}$$

Set SIGN to +1 or −1, depending on if it is positive or negative.
4. Determine if RVT value is close enough, exiting if the predicted Pd delta is within tolerance:

$$\text{Tolerance} \geq Pd - e^{\sum_{M=1}^{PPT} \frac{NI}{1 - \frac{RVT}{TIBS_M}}}$$

5. Increment/decrement trial RVT:

$RVT = RVT + \text{SIGN} \times \text{STEP}$

Exit if RVT increments/decrements out of the range $0 \leq RVT \leq RVT_{max}$, limiting RVT to the crossed bound. If the loop counter exceeds $RVT_{max} \div STEP$, exit logging an error.

6. Test trial RVT:

$$SIGN_T = \ln(1 - Pd) - \sum_{M=1}^{PPT} \frac{NI}{1 - \frac{RVT}{TIBS_M}}$$

Set $SIGN_T$ to +1 or −1, depending on if it is positive or negative

7. If SIGN equals $SIGN_T$, repeat steps 5 and 6. Exit if $SIGN_T$ is positive. If $SIGN_T$ is negative, decrement RVT by STEP and exit.

By using the above process, an RVT is determined that takes into account more than one unique value of illumination time, and is more efficient than computing an average value using all of the illuminations of interest. Because the computed RVT satisfies a predetermined tolerance, the probability of detection for each of the illuminations is satisfied.

Multiple Intercept Rule Evaluation

As discussed above, there are conventional detection systems that scan a range of frequencies linearly and therefore these systems do not establish scan strategies. However, in a system that computes a scan strategy having multiple solutions for establishing dwells, multiple scan strategies may be determined having multiple configuration possibilities for one or more receiver(s). That is, there may be more than one scan solution for a given set of emitters, and there may be more than one hardware configuration that meets each scan solution's requirements. According to one aspect of the invention, a method is provided for solving the combinational problem for configuring receiver hardware where more than one possible scan solution exists.

Problems also exist in determining a solution for detecting multiple emitters involving satisfying the scanning requirements for each emitter and determining an overall solution. In particular, the detection system establishes, for each emitter, at what time and what range the signal produced by the emitter should be intercepted. Also, the system must determine how fast to sample the incoming signal to achieve an acceptable intercept time. Because the solution for multiple emitters is a complex problem, a system that has flexibility in prioritizing and handling the detection of multiple emitters is preferable.

According to one aspect of the invention, a rule-based system is provided for determining how emitters should be detected by a detection system (e.g., detection system 201). According to one embodiment of the invention, rules are associated with particular emitters which determine how signals generated by corresponding emitters are detected by the detection system. For instance, rules may be used to prioritize certain emitters with respect to other emitters and, based on these rules, an operator of the system may determine a solution to the scanning problem.

In one embodiment, there may be parameters that may be associated with an emitter of interest that affects if and/or how the emitter is detected. These parameters define generally how each rule operates. In one embodiment of the invention, an intercept rule may be defined per emitter mode, the rule determining, for example, at what minimum range the emitter needs to be detected, the allowed probability of intercept of the emitter, the amount of time allowed to observe an emitter prior to detection, etc. According to another embodiment, this may be expanded to allow several rules per emitter mode, and to allow for automatic selection of the most appropriate rule given a resolution criterion (e.g., most stringent rule, least stringent rule, ignore particular rules, etc.).

As discussed above, FIG. 3 shows a flow chart for determining a scan solution for emitters of interest. The first step of this process database determine an emitter of the emitters of interest for which a solution is determined. For each emitter and emitter mode, a single set of detection rules may be defined (e.g., by a user or operator). One or more detection rules may be stored in the emitter database (e.g., in an information matrix) and one or more rules may be associated with an emitter entry.

According to one embodiment of the invention, a detection rule may be created that includes one or more of the following parameters:

Probability of Intercept (Pd). This defines the probability or confidence that the signal will be detected within the desired time period, expressed in a number of scan periods ("paints") or clock time.

Turn-on Range. Maximum range from the receiver at which the signal becomes interesting to the receiver.

Detect-by Range. Minimum range by which detection is required to have occurred at least once.

Tolerance. Enumerated type to select observation time as time-of-flight between turn-on and detect-by ranges; number of scan periods; time; or the larger of time/scan periods.

Tolerance Direction. Indicates whether a tolerance is applied prior to or following the detect-by range.

Scan Periods. Indicates the number of emitter "paints" or illuminations that are allowed for observation prior to detection.

Time. Indicates the amount of time allowed for observation prior to detection.

Cumulative Pd flag. Enables Cumulative Pd logic. This logic basically accounts for any signal amplitude change as range changes from turn-on to detect-by ± tolerance. Amplitude may be considered constant as computed at turn-on range when the flag is false.

These parameters may be used to establish the geometry between the receiver and the emitter, and ultimately compute the required revisit time for each detection method of the receiver. Multiple sets of detection rules may be used, because an operator may have different scenarios in mind. For example, six sets of rules may be supported. The limit of the number of allowed rule sets may be set by human factors. The operator does not have to populate all six sets, but may choose to populate sets one through six, in any order. To support the multiple rules, two additional parameters may be added to the database per emitter, emitter mode definition:

Chosen Rule. This parameter allows the operator to pick a particular detection rule set, and allows a detection system (e.g., system 201) to resolve a solution across the detection rules. Therefore, an operator has the flexibility to choose certain rules to be used for a particular emitter.

Cross Rule Relation. This parameter allows the operator to guide the detection system to the appropriate rule:
Do not scan for the emitter mode at all (overrides all detection rules).
Assign a minimum cost, default revisit time (overrides all detection rules).

Evaluate all populated rules, and select the most difficult across the detection methods.

Evaluate all populated rules, and select the least difficult across the detection methods.

Given a set of data (the set referred to hereinafter as "DATA") specified by a matrix of emitter parameters (e.g., the information matrix) including multiple intercept rules, one example method for evaluating the detection rule sets may be performed as follows:
1. Loop on each row (emitter) in set DATA.
2. If the value of the Cross Rule Relation parameter indicates "Do Not Scan", skip processing of this emitter.
3. If the value of the Cross Rule Relation parameter indicates "Default", then assign default parameters.
4. If the value of the Chosen Rule parameter indicates a specific detection rule set, process the selected rule set for the emitter.
5. Otherwise, there are multiple detection rule sets to evaluate the row:
   a. For each populated detection rule set, replicate the emitter row and process the rule set for the new row.
   b. For each replicated row, assign a common identifier (e.g., a tracking index) to identify the replicated data set.
   c. Compute the information matrix for DATA, including the replicated rows. This will result in the computation of Revisit Time (RVT) for each receiver detection method for each row (original and replicated).
   d. Using the common identifier (e.g., the tracking index), identify the unique sets of RVT data that resulted from the multiple rule sets. This data can be visualized as a matrix of RVT values, where each column represents a detecting method, and each row represents the emitter evaluated for each rule. The data may be consolidated into a single set of RVTs based on the Cross Rule Relation selection (Most or Least Difficult) using the following procedure:
      i. If "Least Difficult" selected, then
         1. Ignore rows with all zero values (i.e., no detection using such rules possible).
         2. If there are rows with all non-zero values, select these. Otherwise use all remaining rows.
         3. Loop through the columns in increasing sensitivity order.
            a. Identify the row with a unique maximum RVT value. If found, this is the row with the easiest solution.
            b. If all columns are checked and the no unique maximum is found, select the first row found on the last "pass" as the least difficult solution.
      ii. If "Most Difficult" selected, then
         1. Ignore rows with all zero values (i.e., no detection using such rules possible).
         2. If there are rows with all non-zero values, select these. Otherwise use all remaining rows.
         3. Loop through the columns in increasing sensitivity order.
            a. Identify the row with a unique non-zero minimum RVT value. If found, this is the row with the most difficult solution.
            b. If all columns are checked and the no unique minimum is found, select the first row found on the last "pass" as the most difficult solution.
      iii. Insert the selected RVT data into the information matrix, replacing the data of one of the elements of the common tracking index set, and deleting the remaining replicated data of the tracking index set.

In this manner, rules may be used by an operator to control how the system prioritizes and monitors emitters of interest. That is, the operator is provided the capability of determining which emitters and in what priority these emitters are detected. These rules may also used by a detection system to automatically prioritize emitters when determining a scan solution.

Multiple Hardware Configuration Evaluation

As discussed above, a system according to one embodiment of the invention may be capable of determining more than one scan solution to satisfy a given set of emitters. Similarly, there may be multiple hardware settings that satisfy a given dwell solution.

In conventional systems, there is typically one hardware configuration appropriate for signal sampling. According to one embodiment of the invention, a system may be provided (e.g., system 215) that allows an operator to set alternate sampling configurations which provide equivalent representations of the intercepted signal. Thus, in one embodiment of the invention, representations of multiple hardware (HW) configurations per emitter mode may be used, and the most appropriate hardware configuration for the intercepting dwell may be selected. In one embodiment, configurations may be created and stored in the emitter database (e.g., information matrix) where they can be used later in determining an optimum dwell set.

According to one embodiment, the system may define one set of hardware settings for a particular receiver. This capability may be expanded, for example, to multiple sets of hardware settings. This additional capability may be useful, for example, for allowing the operator to define and make a final selection from the multiple sets of hardware settings that satisfy the dwell solution. For instance, different emitters may demand conflicting hardware settings, and allowing an operator to choose among multiple configurations can avoid such hardware conflicts. Conflicts may, for example, be flagged by the detection system as errors. However, because the detection system is capable of determining multiple set of hardware settings to choose from, the possibility that a conflict exists is less likely to occur.

Optionally, the detection system may be configured to present and/or select from multiple hardware configurations that do not have conflicts. For example, a cost may be associated with each hardware configuration, and the most appropriate configuration may be selected based on its comparative cost with other hardware configurations. Other ways of selecting optimum hardware configurations may be used, and the invention is not limited to any particular selection method. For example, the configuration that requires the smallest dwell duration may be preferred over other configuratives.

A hardware configuration may include various hardware controls that are configured to operate the receiver hardware. These controls may include, for example, a set of controls referred hereinafter to as discrete controls. Examples of discrete controls may include:

POP Control. A boolean value that enables/disables hardware receiver function.

Chop Control. An enumerated value that allows the operator to choose among discrete values for "chopping" the incoming signal as well as disabling the chop control. This control allows the operator to chop the incoming signal into pulses.

There may be, for example, sets of other controls that correspond to filtering operations that affect how a pulse train of the received emitter signal may be perceived by upstream receiver components (e.g., software used to analyze the received pulse train). The operator may wish to control how the received signal is processed by these upstream components. A set of controls referred to hereinafter as range controls may be provided and this control capability may include, for example, one or more of the following controls:

Doppler Trigger Count (min/max values). Upper and lower bounds of acceptable pulse counts which may trigger doppler processing.

Pulse Grouping Interval (min/max values). Upper and lower bounds of acceptable pulse interval timing that allow correct pulse repetition interval (PRI) measurements.

As discussed above in creation and evaluation of multiple intercept rules, the emitter database 210 is expanded to allow multiple sets of rules per emitter data element, and the operator may populate one or more of the sets with rules. Likewise, multiple hardware configuration settings (e.g., may be defined and stored by the detection system in emitter database 210 used to determine the optimum hardware solution.

Determining Conflicts

To understand how conflicts occur, it is necessary to understand how the emitter signals are observed and processed. For example, in the N×M information matrix discussed above, MDT for an emitter may be defined minimally as one Pulse Repetition Interval (PRI), and EDT may be defined as N*PRI of the signal represented in a row. This signifies that the detection system executes the dwell every RVT, and "sits" there for a period of the MDT to observe one pulse. If nothing is detected, the system moves onto the next dwell in the sequence and "sits" for a period of MDT. However, if pulse activity is detected, then the dwell extends observation of the signal up to EDT to collect the desired number of pulses (N). N may be chosen based on signal processing considerations, and may range, for example, between 3 and 20 pulses, although other minimum and maximum values may be used. Considerations for determining the minimum number of pulses include averaging measurements made on each pulse; the maximum number of pulses may define the volume of data required to analyze the signal, as necessary.

Figure 7:
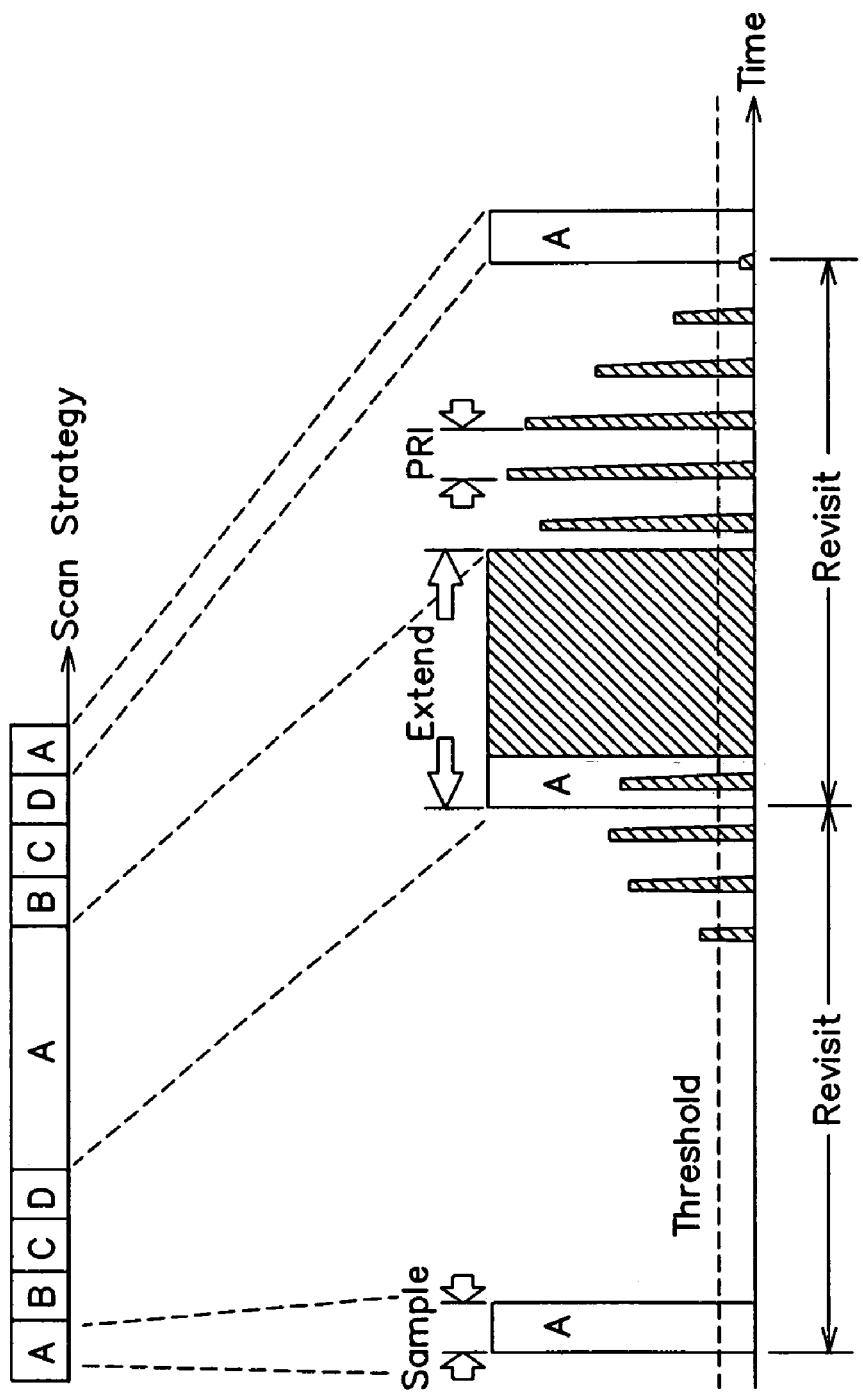
FIG. 7 is a chart showing an example emitter signal that can be received and detected according to one embodiment of the invention.

As discussed above, the MDT may be minimally one PRI, but there are exceptions that may alter this relation. Therefore, there are multiple pairs of MDT/EDT, and these pairs of MDT/EDT are driven by multiple pairs of "Pulse Sort Sets" PD_Trigger/Intra_Group ranges, respectively. These ranges provide a set of valid signal conditioning options that may be selected for the dwell to process the signal correctly. Pulses may be transmitted in groups, and the receiver would like to define PRI as the time from "first pulse in group" to next "first pulse in group" to make signal processing easier. The Intra_Group parameter shown in FIG. 7 defines the "PRI" range over which pulses may be grouped; the PD_Trigger parameter defines the expected number of pulses in a group. Particular values selected for these ranges may alter the corresponding values of MDT/EDT. Problems arise when "real" PRIs of one emitter fall into the grouping range of another. In that case, the trigger count may be exceeded. The receiver may be configured to recognize this and may modify the grouping logic, but depending on implementation, may need to collect an additional PD_Triggers worth of pulses. In this case, MDT actually may represent the time it takes for the detection system to collect an additional batch of pulses.

As shown in FIG. 8, "Pulse Sort Sets" are used to condition the pulse train for signal processing, particularly with respect to pulse-grouped signals. The consequence of this, however, is that it is possible for pulse sort values to satisfy one emitter and conflict with another. Hence, multiple hardware configurations may be supported. The settings that satisfy all or most of the signals may be selected (e.g., by the detection system or alternatively by the operator). The detection system may also display an error if not emitters all can be satisfied. Multiple Pulse Sort Sets lead to corresponding MDT/EDT sets, the effect of the Pulse Sort Sets may cause more pulses to be collected per dwell.

The following are several examples illustrating how conflicts can arise and be detected by a detection system:

EXAMPLES

The POP Boolean control is either on or off, so conflicts are handled by sorting dwells around the conflict, or if that is not possible, flagging the conflict. This is illustrated by the following example:

Emitter #1 Frequency range: 1500–2000 MHz, POP On (normal case). Emitter #2 Frequency range: 2050–2550 MHz. POP Off (for some receivers, this is required for AM pulses, since the assumption of "square" pulses is not true, and may cause multiple encoding if POP is left enabled).

Assume a detecting bandwidth of 1000 MHz and 250 MHz. Any solution that attempts to include the emitters in the same dwell will cause a conflict to be detected. Such solutions are not favored by the dwell placement methods described below, which should find at least two 1000 MHz dwells at bandwidths 1000–2000 and 2050–3050. These two dwells avoid the conflict. If there is no gap between the dwells, or if additional conflict exists, then the 1000 MHz dwell may not be allowed.

For instance, expanding on the previous example, add an Emitter #3 with Pop On and a frequency range 1000–1450 MHz. There is no 1000 MHz emitter, so therefore their may be a conflict-free solution to cover emitter #2, so one viable solution would include creating a dwell at bandwidth 450–1450, another at 2050–3050 and a pair of 250 MHz dwells to cover emitter #2, at bandwidths 1500–1750, 1750–2000.

Therefore, for the Boolean conflict discussed above, the process will end up finding any "gaps" between the conflicts and attempts to build dwells above and below the gaps to separate the emitters. This cannot be done in every case, and certainly cannot be done if the conflicting emitters overlap in frequency.

If the conflict cannot be avoided, the conflict may be recorded for the operator, since it might be possible to alter the emitter representation. If the operator cannot alter the representation, then the dwell solution will be redundant in the overlap range, with at least one dwell each tailored to solve the conflict. Building on the previous example, assume emitter #2 was identical to emitter #1 1500–2000, but POP is still off, and there is no emitter #3. Then two 1500–2500 MHz dwells are created, one with POP on and one with POP off, and an error is logged. A $3^{rd}$ dwell is still needed to cover emitter #1.

Chop is an enumerated type of short, long and "don't care". If all emitters are "don't care" then the default value, usually short, is assigned. The expectation is that most emitters are "don't care", so selection of a value other than the default is driven by the "rare" emitter that wants "long" or "short". If there is a conflict between "short" and "long", then the problem is very much like the Boolean POP case, and is solved the same way: use bandwidths that best isolate the conflicts, and in the absence of being able to do that, create redundant dwells for the conflicting region and log the problem.

For Doppler_Trigger and Pulse Grouping, the situation has more options. Each of these has an acceptable min/max range from which a value can be picked. In addition, additional sets of values can be assigned in the database by the operator (e.g., a total of six sets). The system selects a value for each of these fields that satisfies one of the six sets, favoring the minimum values. Referring below to the following example in Table 1:

TABLE 1

| Emitter | Set #1 | | | | Set #2 | | | |
| --- | --- | --- | --- | --- | --- | --- | --- | --- |
| | Doppler Min | Doppler Max | Pulse Group Min | Pulse Group Max | Doppler Min | Doppler Max | Pulse Group Min | Pulse Group Max |
| Emitter #1 | 2 | 12 | 20 μsec | 50 μsec | | | | |
| Emitter #2 | 3 | 15 | 40 μsec | 100 μsec | | | | |

In this example, only one set per emitter is defined. The assigned values for the dwell is 3 and 40 μsec, since these are the minimum values that satisfy both emitters. Now refer to the following example below in Table 2:

TABLE 2

| Emitter | Set #1 | | | | Set #2 | | | |
| --- | --- | --- | --- | --- | --- | --- | --- | --- |
| | Doppler Min | Doppler Max | Pulse Group Min | Pulse Group Max | Doppler Min | Doppler Max | Pulse Group Min | Pulse Group Max |
| Emitter #1 | 2 | 12 | 20 μsec | 50 μsec | 16 | 20 | 20 μsec | 50 μsec |
| Emitter #2 | 14 | 20 | 40 μsec | 100 μsec | 22 | 25 | 60 μsec | 75 μsec |

In the example in Table 2, the numbers are assigned such that there is not overlap within a set. In this case, the values 16 and 40 μsec satisfy emitter #1, set #2 and Emitter #2, Set #1. These dwell parameters imply that pulse trains with repetition intervals of less than 40 μsec are considered pulse grouped, and it may take 16 pulses to recognize a Doppler signal. This is acceptable relative to the database, because this is entered as a valid option. If emitter #1 was by itself, then these numbers could have been reduced to 20 μsec & 2. If there is more than one viable solution, the one that requires the fewest pulses and therefore requires the smallest dwell duration is selected.

If however, no overlap can be found among the hardware configurations, then the solution may be pushed by the improved dwell placement methods described above to find any frequency "gaps" to exploit. Barring this situation, redundant, overlapped dwells are generated to provide coverage and the conflict is logged for the overlapped region/dwells. One difference here is that the selected values are the ones that satisfy the most emitters. For example, if there are 10 emitters and a single set of values for a dwell can satisfy 9 of the 10 emitters, that set of dwell parameters is selected, and a separate dwell is built for the 10$^{th}$, "oddball" emitter.

Hardware Control Evaluation

When a dwell is hypothesized for a given frequency range, the emitters within the range to be processed by the dwell may be examined to establish the HW parameters for the dwell and detect and resolve conflicts. This may be done, for example, in parameter "flexibility" order, beginning with the most flexible parameters, which are the range controls discussed above.

Figure 9:
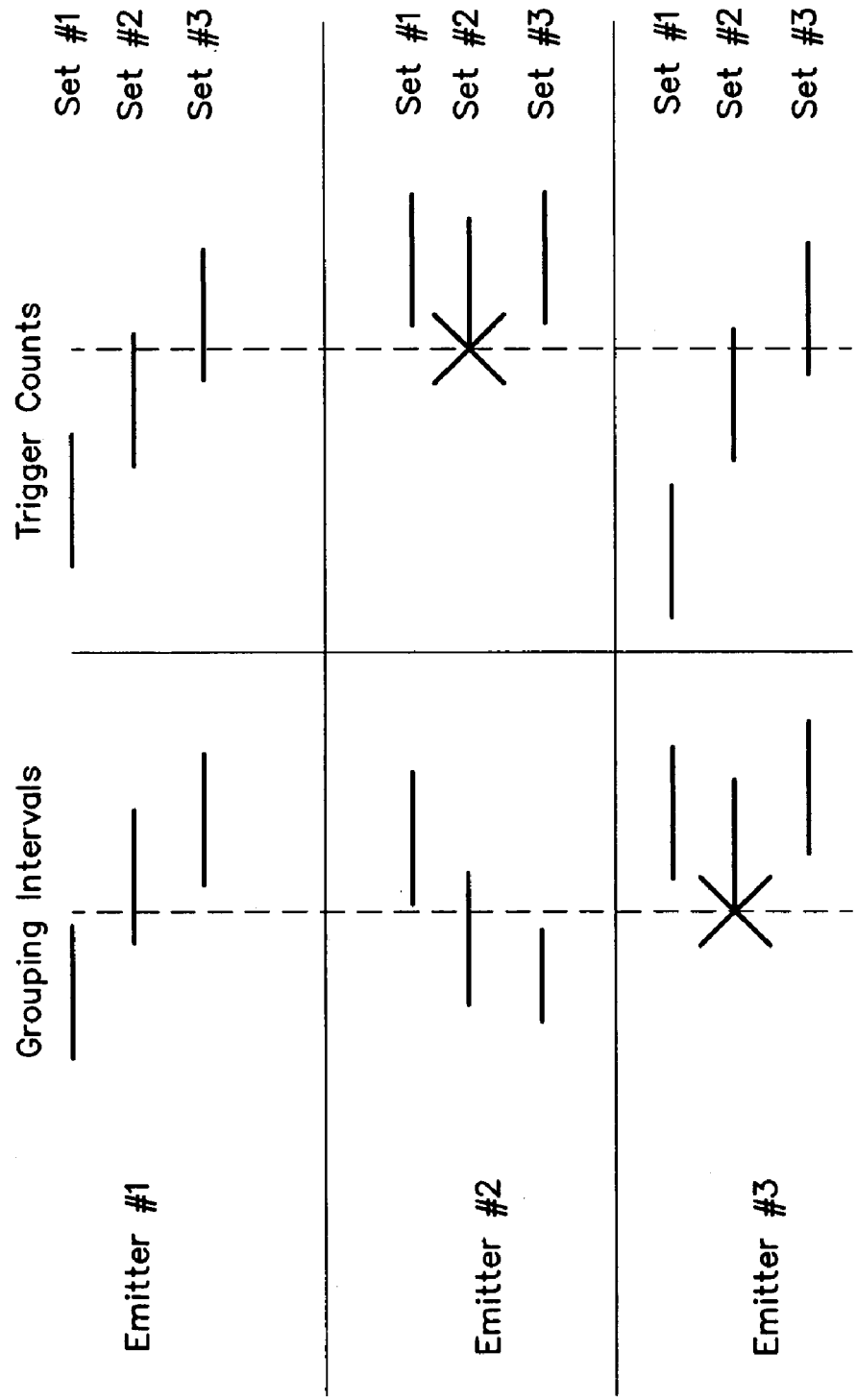
FIG. 9 is an example showing how emitters having different sets of range controls may be satisfied by selecting dwells according to one embodiment of the invention.

The dwell is assigned a single value of Trigger Count and a single value of Grouping Interval. The selected value lies within the range of at least set of the emitter to satisfy the emitter. In addition, the Trigger Count and Group Interval are "coupled", meaning that both parameters of the set bracket the selected values to "count". A conflict exists if the selected values do not satisfy any set of at least one emitter. The selected values are the minimum values that satisfy all emitters, or the preponderance of satisfied emitters. An example is illustrated in FIG. 9, where "X" indicates selected dwell values. In the example shown, three sets of range control parameters are shown, and dwells are selected that satisfy all emitters.

Next the discrete controls may be set using the emitters that are satisfied by the range control selection. Emitters that are indicated as "don't care" for a given parameter do not contribute to that parameter's selection. Again, the parameter is set to the value that satisfies the preponderance of the emitters. If all emitters indicate "don't care" for a parameter, then the value is set to a predetermined default value.

An indication of the number of controls experiencing conflicts is kept. If the dwell is kept as part of the scan strategy, the number of unresolved conflicts is taken into account in selection of the most appropriate scan strategy (e.g., the one with the fewest conflicts, then the lowest cost).

The selection process begins by trying to resolve Doppler Count/Pulse Group set first for the preponderance (if not all) of the emitters in the dwell. Mechanically, this may be accomplished by the following example:

1. Placing each of the sets into a single seven-column matrix, whose seven columns are Doppler min/max and Pulse Count min/max, MDT, EDT and emitter ID, respectively. The Emitter ID field allows the tracking of the multiple to the emitter "owner" of the set. A vector of unique ID values is saved in the matrix referred to as "ID".

2. Any rows that have unpopulated sets are discarded from the matrix. These are the ones that have zero values in the Doppler/Pulse Group columns. The matrix is now an N row by 7 column matrix.
3. Evaluate each Doppler Min (column 1) for containment in each range Doppler min≦Doppler Min≦Doppler Max, creating a N×N matrix of Boolean solutions. Because Doppler Min will always "pass" its own range, the matrix diagonal contains a value of 1. (Note that if all the other matrix values are zero, PD ranges have no intersection). This may be referred to as the "I" matrix.
4. Create a N×N matrix, which replicates the Emitter ID field across each row (column 7 of the ID matrix created in step 1). Multiply this matrix by the "I" matrix. The effectively replaces the "1"s in matrix I with the corresponding ID numbers. Reassign this resulting matrix to the "I" matrix.
5. Loop on each element in the ID vector and test for ID[k]=I. This creates k N×N Boolean arrays. Visualize this as a 3-D array, with N×N being the x-y plane and k is the z-axis.
6. OR the 3-D array across the x-axis. This results in a Boolean array of dimensions N×k. Perform a sum across the columns, creating an N element vector. Each element is the count of emitters the Nth Doppler min/max range solves for.
7. Identify the position(s) in the N element vector that has the largest count. This identifies the row(s) of the multiple column matrix of step 2 that solve Doppler count best. If the "largest count" is not unique in the vector, then select the Doppler count value that is mapped to the smallest MDT value (i.e., basically, sort on column 5).
8. Now solve for Pulse Group Interval:
    a. Given the Doppler Count solution of step 7, reduce the 7-column matrix of step 2 to the rows that satisfy Doppler min≦Doppler Count≦Doppler Max. This may return all or a subset of the matrix.
    b. Repeat steps 3–7, but extract Pulse Group Interval rather than Doppler Count.
9. Now assign MDT & EDT:
    a. Create another "I" matrix as in step 3 above, which satisfies the selected Doppler Count and Pulse Group Interval by evaluating [Doppler min≦Doppler Count≦Doppler Max] AND [Pulse Group min≦Pulse Group≦Pulse Group Max]. Log a conflict if any ID is not satisfied by this selection. This may be performed, for example, by incrementing a global counter that tracks conflicts (e.g., a "Doppler/Pulse Count conflict counter").
    b. Perform steps 4–6 on this "I" matrix.
    c. Perform step 7 above, but inspect the "I" matrix for an MDT/EDT entry that corresponds to the "largest count". If the "largest count" is not unique, then MDT and EDT may be set to the largest values in the solution set.

Step 8 determines the emitters to be solved for, step 9 establishes, MDT and EDT. The emitter list is then tested for compatible POP and Chop values. The POP and Chop values are set to the values that satisfy the most emitters in the set, and any conflicting emitters are dropped from the set. Dwells for these emitters will be build on a subsequent pass. Again, global conflict counters are maintained for POP and Chop.

As discussed above, cost may be used to determine the most appropriate scan strategy. A cost may include, for example, overall evaluation of the dwell solution. At the start of the process, the global conflict counters are zeroed out. As each dwell is built, dwell parameters, and increments the counters as conflicts are encountered. At the completion of each candidate scan table, the cost of dwell execution (Sum of Dwell durations/Revisit times) and total number of conflicts is compared to the results of the prior scan table build pass, and the one with the lesser conflicts is kept as the solution. If the number of conflicts is equal, then the lesser-cost solution is kept. The latter may be the typical case, if solutions exist around potential conflicts.

Real Antenna Data Option

A detection system that detects one or more emitters may use antenna data that describes the characteristics of various antennas used by such emitters. This data is then used by a detection system to identify and classify emitters encountered in the field. Conventionally, antenna measurements are performed which yield such data in a facility referred to in the art as an antenna range. An antenna range is generally an elaborate and a costly facility (e.g., an antenna range, anechoic chamber, etc.) that isolates an antenna from external energies (e.g., range clutter) and allows for the measurement of antenna characteristics such as beam width, gain, sidelobe levels, and polarization of antennas or antenna subsystems over a particular frequency range. A detection system that uses such data is limited by the number and type of antennas defined to the detection system, and is limited in identifying antennas that are unknown or are undefined to the detection system. Further, it is realized that static antenna characteristics measured using conventional methods do not adequately define all antennas, even of the same type. For instance, two antennas of the same type may have different antenna characteristics which may cause them to be seen by a detection system as different antenna types.

According to one aspect of the invention, it is realized that it would be beneficial to use antenna characteristics measured by the detection system to model antennas. Because antenna models can be "learned" and used by the detection system to detect those antennas, the detection system capabilities are increased.

Also, because actual data from antennas measured in the field can be used by the detection system, the detection system may be more accurate as a result. It is realized that conventional databases of antenna models contain coarse data that describes a particular model, and therefore the detection system is limited to using this coarse data to detect emitters. More particularly, in conventional detection systems, models are empirically defined using data supplied by conventional sources (e.g., the RAND Corporation) and a portion of the data that describes these models is estimated. However, in a system that can observe antenna characteristics in the field, the detection system is not limited to coarse data provided by a static antenna model; the detection system is capable of determining more accurate models for modeling antennas. For example, measured data may yield models that more accurately determine the curvature of an antenna lobe pattern.

A set of models may be used to compute antenna characteristics as a function of frequency, gain, power, beam width, scan and polarization. Thus, actual antenna gain versus azimuth may be observed by the detection system (e.g., detection system 201) for several polarizations, and this data may be reduced for antenna modeling purposes.

The emitter database may include a field that allows the specification of a location where "real" antenna data can be found for the emitter. If a location is specified, the "real" antenna data may be accessed and used instead of the internal antenna model. The antenna data may be one file for several emitter modes, or a unique antenna file per mode. If data cannot be found or is invalid, an error may be logged by the detection system and the internal antenna model is used. If data is found, then illumination times may be determined directly from the real antenna data.

For example, given a set of data specified by a matrix of emitter parameters (referred to hereinafter in the example below as "DATA"), each row representing an emitter, emitter/mode and set of real data (referred to hereinafter in the example below as "RealData"), specified by actual antenna data (e.g., amplitude (dBm) vs time for one or more polarizations, representing at least one scan period), an example method for determining illumination times may be performed as follows (e.g., when computing RVT for the Nth emitter in DATA):

1. If the emitter indicates that RealData is available, access the real antenna data file.
2. If the file does not exist or has invalid data, log an error and resume with the internal antenna model.
3. Otherwise, proceed to access and process RealData.
    a. The file may contain up to four polarization curves: Horizontal, Vertical, LHC and RHC. Select Horizontal (H) & Vertical (V) if both valid, or Left Hand Circular (LHC) & Right Hand Circular (RHC) if both valid. Otherwise, select the first valid polarization found.
    b. Adjust amplitudes of each valid polarization for frequency dispersion due to the delta between the frequency of the data and desired frequency of the emitter.
    c. Apply receive antenna polarization loss model to RealData.
    d. If there is more than one polarization, merge the polarization data as the larger value for each time point.
    e. Interpolate any missing amplitude points versus time.
4. RealData now includes time versus amplitude data. Adjust amplitude for the range dispersion loss.
5. For each detection method to be evaluated:
    a. Screen out amplitude points below the method's sensitivity.
    b. Cross-correlate the extended dwell time (EDT) with the data to determine the unique illumination times (TIB) of the data. This basically "slides" an EDT rectangle cross the data in time, recording time above the method's sensitivity level. Each illumination time represents a unique intercept opportunity of sufficient duration to constitute a potential detection. An example shown in FIGS. 10A–10B shows TIB extraction for two different sensitivity levels that yield two different sets of discrete illuminations (TIBs) to be detected. Time is measured at or above a particular sensitivity level, as data below the sensitivity level are ignored.
    c. Scale TIBs to the ratio of recorded scan period to the desired emitter scan period.
    d. Compute RVT for the detection method (e.g., via the multi-valued illumination time RVT calculation discussed above).

It should be appreciated that other methods may be used to measure and process real data from one or more emitters, and the invention is not limited to any particular method. In this way, the system may use more accurate information that can be measured from real emitters, if that data is available. If real data is not available the detection system may use empirical data provided by one or more sources.

Jammer Compatibility

In one embodiment of the invention, a detection system (e.g., system 201) may operate in a manner cognizant of on-board active jammers (e.g., Electronic Countermeasures (ECM) systems) for jamming or misleading enemy weapons, communications, or radar. More specifically, the detection system may take into account the operation of one or more jammers when determining a scan strategy and may optimize jammer band and intercept band performance as a result. Conventionally, jammers and detection system hardware operate independently, and therefore, when an active jammer is operated, a detection system configured to detect emitters within or in proximity of the frequency band in which the active jammer operates produces a false indication of a threat. Further, because operation of the jammer does not take into account the intercept requirements of the detection system and therefore the detection system cannot perform detecting functions in the same frequency bands that the jammer is operating, there is no capability to both detect and jam in the same frequency range.

In a detection system (e.g., system 101) that determines an optimum scan strategy, it may be beneficial to take into account operation of a jammer, and determine an alternate scan strategy accordingly. It is realized that when a jammer is on, the jammer signal affects the frequency band in which it transmits, and adjacent bands in which harmonics are produced by the jammer signal. Also, it is realized that for a jammer to be effective, it should be operating as continuously as possible, so that it can reduce the possibility that the vehicle in which the detection system exists cannot be detected by a threat that produces an emitter signal to be "jammed." Thus, it is a goal to minimize the amount of time the jammer is off. However, this goal competes with the need for a receiver to operate in the frequency bands affected by the jammer signal, such that the detection system can detect the threat. Therefore, a detection system is provided to balance the needs of an active jammer to operate effectively, yet allow a receiver to operate within a band affected by the jammer signal. According to one embodiment, scan strategies are determined for both jamming and non-jam situations.

To provide this capability, the detection system may be provided several additional inputs in addition to the emitters to be detected. In particular, this input information defines which bands are affected by the operation of one or more active jammers. For example, additional inputs to be used in performing this task include a Jammer Blanking Table, and a Receiver Blanking Table as discussed in more detail below. The capability to generate "dry" (no jam) and "wet" (jamming) scan strategies for an emitter set may be supported, with separate intercept rules for each.

A detection system may be switched between "Normal" and "Jammer" modes. When "Jammer" is selected, the following processing changes may be performed:

Information Matrix Computation Changes:

One of the six multiple intercept rules of the database is interpreted as containing jamming mode intercept rules (referred to hereinafter as "Jamming Mode Intercept Rules") that determine how emitters affected by the active jammer should be processed when jamming is enabled. By evaluating these Jamming Mode Intercept Rules, a scan strategy different from the "dry" (no jam) strategy using the same emitters may be determined.

A subset of the emitters in the data is identified as the signals to be targeted by the jammer(s). This, for example, may be operator input. This subset has corresponding Revisit Times (RVT) computed using the Jamming Mode Intercept rules.

When establishing minimum Dwell Duration (MDT), for an emitter, a fraction of the maximum Pulse Repetition Interval (PRI) may be assigned for jammer candidates, while the max PRI is assigned to the remaining emitters. A lower bound can be imposed to ensure that MDT is not too small. The goal of a small MDT is to deny the jamming candidates consecutive pulses when the jamming is dropped for a receiver "look".

To compensate for the fractional MDT's affect on Intercept Performance, the RVT of the jammer candidates may be scaled by MDT÷maxPRI, with the ratio limited to 1.0.

These changes allow for computation of dwell parameters for jammer candidates separately, assign a sub-PRI Dwell Duration, and still maintain a probability of intercept consistent with the Jammer Mode Rules.

Extract Scan Strategy Changes:

When in Jammer mode, a Receiver Blanking Table and a Jammer Blanking Table are processed. These tables map the frequency ranges to band index numbers, and define which bands are simultaneously affected by a jammer active in a single band. Two tables are used because the jamming system (e.g., jammer processor 207) and receiving system (e.g., receiver processor 206) may have different frequency band definitions (e.g., the effects of signals in adjacent bands (coupling) may be different between the two systems).

When processing a frequency range, the emitters within the range are compared to the Receiver Blanking Table. The jamming candidates are identified for the range. If any emitters are present within the range, or if the Receiver Blanking Table indicates that there adjacent candidates that affect the range, then the minimum MDT (referred to as "JAMMDT") of all the related candidates is returned and is used as the MDT solution of the frequency range, replacing the MDT of each emitter. Similarly, the RVT of each updated emitter is scaled by JAMMDT divided by the original MDT. Once the dwells are built, this allows the jamming in the common bands to be paused for the common minimum time while the receiver "looks" for the signal(s).

With the input data now conditioned for the affects of the jamming candidates, the optimum set of dwells may be built.

The Jammer Blanking Table may be used to map each dwell affected by the jamming to the jammer bands to exert "look" control. This allows the receiver to blank multiple jammer bands for the dwell's "look" time.

If a receiver frequency range is found to be free of a jammer assignment, then its dwells are built and assigned normally.

In this manner, the detection system may take into account the operation of active Jammers when computing a scan strategy.

Dwell Placement

As mentioned above, once the information matrix including the emitters of interest is computed, a scan strategy may be extracted from the information matrix. The scan strategy is defined by one or more dwells and describes how the receiver's resources may be utilized. It is desirable for the scan strategy to use these resources efficiently and the parameters of the dwells which define the scan strategy directly impact the efficiency of the scan strategy. A dwell is defined by several parameters. These parameters include the frequency range which the dwell is intended to cover, the dwell duration (i.e., the amount of time the receiver spends tuned to that frequency range), and a revisit time (i.e., how often the dwell is executed).

Thus, for example, when executing a dwell having a frequency range of 1100 MHz–1200 MHz, a dwell duration of 10 milliseconds (ms), and a revisit time of 125 ms, the receiver will spend 10 ms tuned between 1100 MHz and 1200 MHz. Revisit time is measured from the beginning of the first execution of the dwell to the beginning of the next execution of the dwell. After the dwell has completed execution (i.e., after the 10 ms dwell duration has expired), 115 ms will elapse before the dwell is executed again. An additional dwell parameter is the detecting method. The detecting method of a dwell is the IF and VBW filter bandwidth combination. Each detecting method has an associated sensitivity. The detecting method affects the frequency range of a dwell, as the dwell's maximum frequency range is limited by the bandwidth of the receiver's IF filter. The revisit time of the dwell is also dependent on the detecting method as a more sensitive detecting method will yield a higher probability of detection. Thus, the more sensitive (i.e., smaller bandwidth) detecting method used, the greater the revisit time will be.

Figure 11:
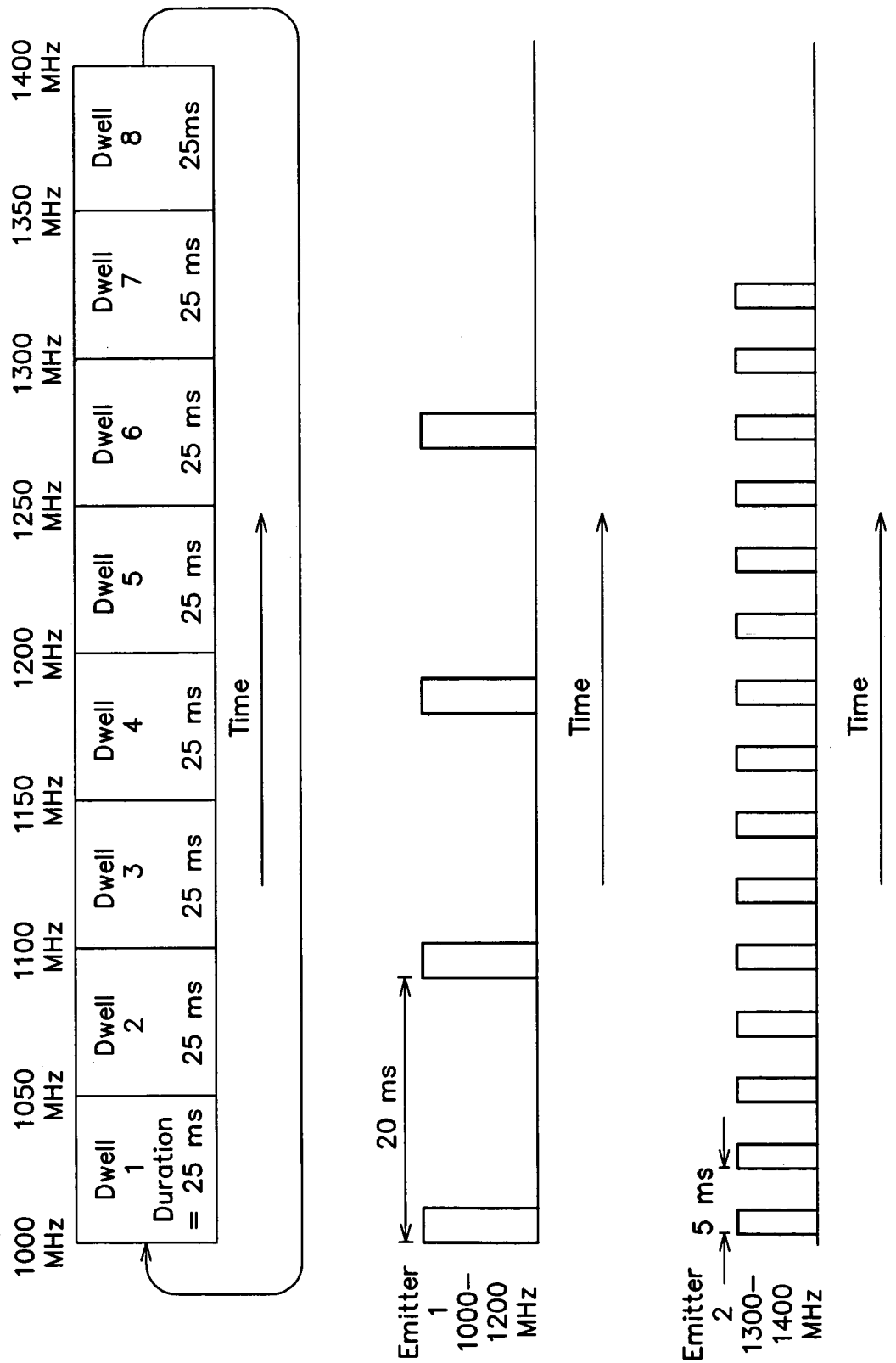
FIG. 11 is a diagram illustrating the placement of dwells in relation to the pulse repetition intervals of emitters, according to one embodiment of the invention.

An example of a simple scan strategy for detecting two emitters is shown in FIG. 11. The first emitter, emitter 1, operates in the frequency range of 1000–1200 MHz while the second emitter, emitter 2, operates in the frequency range of 1300–1400 MHz. For the purposes of this example, each dwell is assumed to use the same detecting method and the IF filter of the detecting method is assumed to have a bandwidth of 50 MHz. Thus, the frequency range of each dwell is limited to 50 MHz. The scan strategy includes eight dwells. Dwell 1 has a frequency range of 1000–1050 MHz. Dwell 2 has a frequency range of 1050–1100 MHz. Dwell 3 has a frequency range of 1100–1150 MHz. Dwell 4 has a frequency of range of 1150–1200 MHz. Dwell 5 has a frequency range of 1200–1250 MHz. Dwell 6 has a frequency range of 1250–1300 MHz. Dwell 7 has a frequency range of 1300–1350 MHz. Dwell 8 has a frequency range of 1350–1400 MHz. Each of the eight dwells has a duration of 25 ms. Because the eight dwells are executed in succession and the process of executing all eight dwells repeats after Dwell 8 is executed, the revisit time of each dwell is 200 ms (8×25). Thus, this scan strategy has the effect of sequentially stepping through the frequency spectrum from the minimum frequency of the lowest frequency emitter (i.e., emitter 1) to the maximum frequency of the highest frequency emitter (i.e., emitter 2).

The pulse repetition interval (PRI) of a signal is the time between pulses in the signal of an emitter. As shown in FIG. 11, the PRI of Emitter 1 is 20 ms and the PRI of Emitter 2 is 5 ms. Typically, the minimum dwell duration of a dwell is set to the highest PRI of the emitters that the dwell is intended to detect. This way, the execution of a dwell will not fall in between pulses in the emitters' signals. In the example of FIG. 11, because the highest PRI of emitters is 20 ms, (i.e., the PRI of Emitter 1) the minimum dwell duration of the dwells in the scan strategy should be at least 20 ms.

While the scan strategy of FIG. 11 is effective, in that it is capable of detecting both Emitter 1 and Emitter 2, it is not an efficient use of the receiver's resources. Because there is no emitter to be detected that uses the 1200–1300 MHz range, no emitter will be detected by Dwell 5 and Dwell 6. These two emitters illustrate a problem associated with sequentially scanning the frequency spectrum. This problem is that the receiver spends time scanning a portion of the frequency spectrum in which no emitters of interest are operating. Thus, the receiver is wasting time scanning this portion of the spectrum that could be used to scan portions of the frequency spectrum in which emitters of interest are operating. Indeed, Dwell 5 and Dwell 6 could both be removed from the scan strategy without reducing the likelihood of detecting signals from one of the emitters.

Dwell 7 and Dwell 8 cover the 1300 MHz–1400 MHz portion of the frequency spectrum. These dwells cover the portion of the frequency spectrum in which Emitter 2 operates. Removing these dwells from the frequency spectrum may result in failure to detect signals from Emitter 2. However, as discussed above, the dwell duration of both Dwell 7 and Dwell 8 is 25 ms, while the PRI of Emitter 2 is 5 ms. Executing a 25 ms dwell to detect an emitter signal with a PRI of 5 ms may waste receiver resources as it may not be necessary to wait for 25 ms to detect a pulse from Emitter 2. That is, if the dwell duration of Dwells 7 and 8 may be reduced to 5 ms, without the dwell being executed between pulses of the signal from Emitter 2. This concept is illustrated more fully in FIG. 12.

Figure 12:
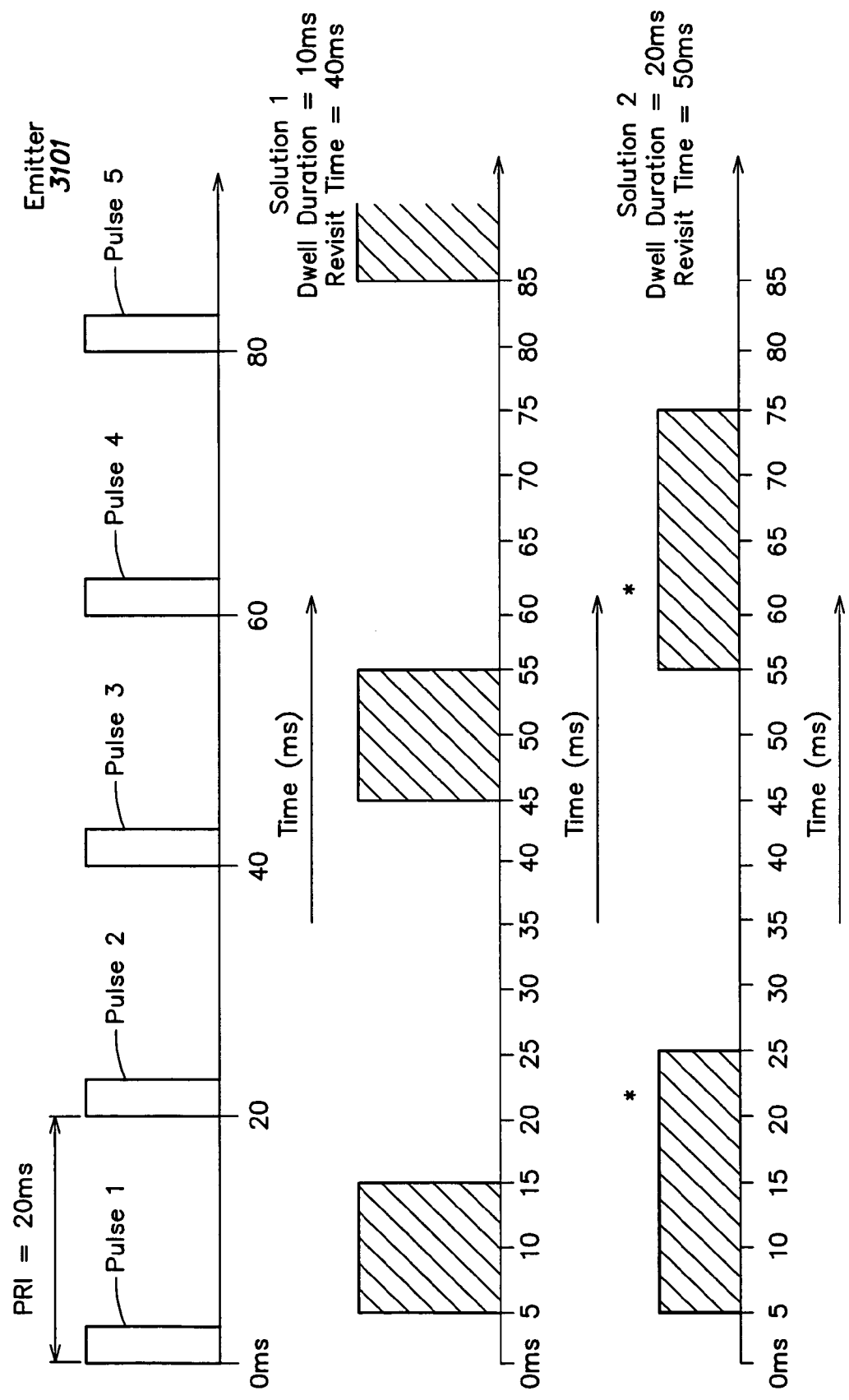
FIG. 12 is a diagram illustrating two possible dwell placement solutions for detecting an emitter, according to one embodiment of the invention.

In FIG. 12, a signal from Emitter 3101 is shown having a PRI of 20 ms. Solution 1 shows a dwell in the frequency range of Emitter 3101 having a dwell duration of 10 ms and a revisit time of 40 ms. The dwell is initially executed at 5 ms. However, because the duration is only 10 ms, dwell execution is completed before the next pulse in the signal of Emitter 3101. Thus, execution of the dwell falls in between Pulse 1 and Pulse 2 of the signal of Emitter 3101. The revisit time of the dwell is 40 ms, thus the dwell is "revisited" and again executed at 45 ms. This time the dwell falls in between Pulse 3 and Pulse 4 of the signal of Emitter 3101. As can be seen, unless the timing of execution of the dwell happens, by chance, to line up with the timing of the pulses of the signal from the emitter, then it is possible for a dwell, which is otherwise capable of detecting the emitter signal, to fall in between pulses of the signal and consequently fail to detect the emitter signal. This problem can be solved by increasing the dwell duration. For example, if the minimum dwell duration is as long or longer than the PRI of the emitter signal, then the dwell does not fall in between pulses of the signal.

Solution 2 of FIG. 12 shows an alternate solution where the dwell covering the frequency range of Emitter 3101 has a duration of 20 ms (i.e., the PRI of Emitter 3101) and a revisit time of 40 ms. The dwell is first executed at 5 ms, however unlike solution 1, execution of the dwell is not complete until 25 ms, thus Pulse 2, which occurs at 20 ms, is detected, as indicated by the asterisk in Solution 2. After 50 ms, the dwell is "revisited" and again executed at 55 ms. This time, Pulse 4 is detected by the dwell, as indicted by the asterisk at 60 ms. As can be seen in the example of FIG. 12, by increasing the minimum dwell duration to the maximum possible PRI of the emitter, execution of the dwell does not slip in between pulse of the emitter signal. In Solution 2 of FIG. 12, the dwell duration remains the same whether or not a pulse is detected. As will be discussed later in greater detail, it should be appreciated that dwell duration may be extended if a pulse is detected during that dwell (e.g., to verify the presence and other characteristics of the emitter signal). It should further be understood that there are, however, certain situations in which the duration of a dwell may be lower than the maximum possible of PRI of the emitter which the dwell covers. Such a situation may occur, for example, when the revisit time of the dwell is short enough that the dwell is adequately over-sampled, such that desired probability of detection is not sacrificed. Such a situation will be discussed in detail below.

Thus, in the example of FIG. 11, it can be seen that the efficiency of the scan strategy may be improved by eliminating Dwells 5 and 6 which cover a portion of the frequency spectrum unused by any of the emitters of interest. The efficiency can further be improved by reducing the dwell duration of Dwells 7 and 8 to the maximum possible PRI of Emitter 2. Additionally, each dwell in the scan strategy of FIG. 11 uses the same detecting method. As discussed above, by using a different detecting method, the frequency range of the dwell as well as the revisit time of the dwell may be altered. For example, if a more sensitive detecting method were used to create the scan strategy, the frequency range of each dwell might be decreased, requiring a greater number of dwells to cover the entire frequency range of all emitters of interest (assuming that each dwell uses the same detecting method). Intuitively, an increased number of dwells results in an increased cost, in terms of the receiver's resources. However, a higher sensitivity detecting method may also result in an increased revisit time. The increased revisit time reduces the cost of executing a dwell and therefore may offset the cost of the additional dwells and reduce the overall cost of the scan strategy.

For example, consider a simplified information matrix 4000 of FIG. 13. The first column of information matrix shows that there are four emitters of interest: E1, E2, E3, and E4. Each row of information matrix 4000 contains data about one of the emitters. The second and third columns of the information matrix provide information about the revisit time for a particular detecting method. For example, the second column provides revisit time information for the detecting method of 250 MHz IF/15 MHz VBW. The third column provides revisit time information for the detecting method 30 MHz IF/15 MHz VBW. For the purposes of simplicity in this example, only two detecting methods are show in information matrix 4000. However, it should be appreciated that any reasonable number of detecting methods may be provided in the information matrix. Likewise, although there are only four emitters of interest shown in information matrix 4000, any number of emitters of interest, such as one, two, three, or five or more emitters may be provided in the information matrix. It should also be understood that information matrix 4000 has been simplified for the purposes of this example and the information matrix may include more information than is shown in FIG. 13.

In addition to including additional detecting methods and emitters of interest, the information matrix may also include multiple pulse sort sets that contain information used to condition the pulse train for signal processing. Because these pulse sort sets affect dwell duration, there may be multiple pairs of minimum dwell duration time (MDT) values and extended dwell duration time (EDT) values. As discussed above, the MDT value is typically the maximum possible PRI of the emitter. If a pulse is detected during a dwell, the dwell duration may be extended to collect additional pulses. The more pulses that are collected, the longer the EDT of the dwell. The number of pulses that are collected is dependent on the information in the pulse sort set. Thus, depending on which pulse sort set is used the EDT of the dwell will vary. Thus, for each pulse sort set that is provided in the information matrix, they may also be a corresponding MDT/EDT pair.

Returning to the example of FIG. 13, the third and fourth columns indicate the frequency range in which the emitter operates. For example, emitter E1 operates between 1000–1300 MHz and emitter E2 operates between 1220–1350 MHz. The last column of information matrix 4000 is the MDT of E1. As mentioned above, the information matrix typically contains an MDT/EDT pair. As will be discussed below in greater detail, the cost of executing a dwell is based, in part, upon the duration of that dwell. The actual duration of the dwell may be, for example, MDT or EDT, depending on whether a pulse was detected during execution of the dwell. Thus, one may estimate the actual dwell duration by assuming that a certain number of MDT dwells and EDT dwells will occur. However, for the sake of simplicity, in this example the cost of the dwell will be computed using only the MDT of the dwell.

In one embodiment of the invention, the cost to the receiver of executing a dwell is measured by the ratio of dwell duration to revisit time. The cost may be computed by the equation in Table 3. In the equation of Table 3, c represents the cost to the receiver, $DD_{MAX}$ represents the highest dwell duration of all emitters covered by the dwell, and $RVT_{MIN}$ represent the shortest revisit time of all emitters covered by the dwell.

TABLE 3

$$c = \frac{DD_{MAX}}{RVT_{MIN}}$$

For example, suppose that a dwell using Detecting Method 1, 250 MHz IF/15 MHz VBW, covered both emitters E1 and E2 of information matrix 4000. The dwell duration of emitter E1 is 3 ms, while the dwell duration of emitter E2 is 5 ms. Because emitter E2 has a higher dwell duration, the dwell duration of emitter E2 will be used in computing the cost. However, because the revisit time of emitter E1 (100 ms) is shorter than the revisit time of emitter E2 (120 ms), the revisit time of emitter E1 will be used in the cost computation, as shown in Table 4. Thus, the cost of a dwell that covers both emitters E1 and E2 is 0.05 or 5%.

TABLE 4

$DD_{MAX} = 5$
$RVT_{MIN} = 100$ $$c = \frac{5}{100} = .05$$

Using a more sensitive detecting method (e.g., Detecting Method 2) may decrease the cost of the dwell (i.e., by increasing the value of $RVT_{MIN}$. However, using a more sensitive detecting method may require the use of more dwells to cover the same portion of the frequency spectrum, due to the decreased bandwidths of the IF and VBW filters. Thus, it is desirable to reduce the cost of a dwell by increasing the sensitivity of the detecting method as much as possible without increasing the number of dwells to the point that the cost of the additional dwells outweighs the cost savings of using the more sensitive detecting method. Consider, as an example, constructing a scan strategy for emitters of information matrix 4000. When one or more dwells have been constructed as part of the scan strategy that cover an emitter, that emitter is removed from the information matrix. Thus, as the scan strategy is constructed, the number of emitters in the information matrix will decrease. First, using the first detecting method in information matrix 4000 (i.e., 250 MHz IF/15 MHz VBW detecting method), a dwell is constructed for emitter E1. The dwell starts at the minimum frequency of emitter E1's frequency range (i.e., 1000 MHz) and extends upwards to the detecting method's maximum frequency. Thus, as shown in Solution 1 of FIG. 14A, which utilizes Detecting Method 1, Dwell 1 is created which covers the portion of the frequency spectrum from 1000–1250 MHz. Because the frequency range of Emitter E2 overlaps that of Emitter E1, part of the frequency range Emitter 2 is also covered by Dwell 1. Thus, this dwell may be used to cover part of the frequency range of Emitter E1 and Emitter E2. As a result, the cost of Dwell 1 is the ratio of the maximum dwell duration between Emitter E1 and Emitter E2 to the minimum revisit time of those two emitters. Thus, as shown in FIG. 14A, the cost of this dwell is 5/100 or 0.05.

Solution 2 illustrates the cost of covering the same frequency range with a higher sensitivity detecting method. In Solution 2, Detecting Method 2 (i.e., 30 MHz IF/15 MHz VBW) is used to cover the portion of the frequency spectrum ranging from 1000 MHz to 1270 MHz. Because of the smaller bandwidth of this detecting method, more dwells are needed to cover the same portion of the frequency spectrum. However, because the revisit time associated with the more sensitive detecting method is greater than that of the less sensitive detecting method, the cost per dwell is reduced. In Solution 2, Dwells 1–7 cover only Emitter E1 because Emitter E2 does not operate in the frequency range covered by Dwells 1–7. Thus, Dwells 1–7 have a $DD_{MAX}$ of 3 ms and a $RVT_{MIN}$ of 650 ms. As a result, the cost of each of Dwells 1–7 is 3/650. However, Dwells 8 and 9 cover both Emitter E1 and Emitter E2, thus the $DD_{MAX}$ of these dwells is 5 (i.e., the MDT of Emitter E2) and the $RVT_{MIN}$ is 650 ms (i.e., the RVT of Emitter E1). Thus, the cost of each of Dwells 8 and 9 is 5/650. As shown in Table 5, the total cost is 31/650 or approximately 0.048.

TABLE 5

$$7\left(\frac{2}{330}\right) + 2\left(\frac{4}{330}\right) = \frac{22}{330} = .0\overline{6}$$

Thus, in the example of FIG. 14A, the more sensitive detecting method yields a lower total cost. However, in some situations the less sensitive detecting method yields a lower total cost. For example, Solution 1 of FIG. 14B shows a dwell constructed to cover part of Emitter E3 of FIG. 13 using Detecting Method 1. This dwell, Dwell 1 of Solution 1, ranges from the minimum frequency of Emitter E3 (i.e., 1510 MHz) to the maximum frequency of the detecting method (i.e., 1760 MHz). Dwell 1 also covers part of the frequency spectrum in which Emitter E4 operates, thus the dwell durations and revisit times of both Emitters E3 and E4 may be taken into account when determining the cost of the dwell. As a result, $DD_{MAX}$ is 4 ms and $RVT_{MIN}$ is 330 ms, yielding a dwell cost of approximately 0.012 for Dwell 1.

Solution 2 covers the same portion of the frequency spectrum using the more sensitive detecting method, Detecting Method 2. In this case, nine Detecting Method 2 dwells are needed to cover the same portion of the frequency spectrum as one Detecting Method 1 dwell. In Solution 2, Dwells 1–7 cover only Emitter E3, as Emitter E4 does not operate in the portion of the frequency spectrum covered by Dwells 1–7 (i.e., 1510 MHz–1720 MHz). Thus, the cost of each of Dwells 1–7 is computed using a $DD_{MAX}$ of 2 ms and an $RVT_{MIN}$ of 330 ms (i.e., the minimum dwell duration and revisit time of Emitter E3). However, Dwells 8 and 9 cover portions of the frequency spectrum that may be used by both Emitters E3 and E4. Thus, the cost of each of Dwells 8 and 9 is computed using a $DD_{MAX}$ of 4 ms (i.e., the dwell duration of Emitter E4) and an $RVT_{MIN}$ of 330 ms (i.e., the revisit time of Emitter E3). As shown in Table 6, the total cost of these nine dwells is approximately 0.06. In this case, a single lower sensitivity dwell (i.e., Solution 1) yields a lower cost than multiple higher sensitivity dwells (i.e., Solution 2).

TABLE 6

$$7\left(\frac{2}{330}\right) + 2\left(\frac{4}{330}\right) = \frac{22}{330} = .0\overline{6}$$

Therefore, when extracting a scan strategy from the information matrix, it is desirable to determine which detecting method yields the lowest cost for a particular dwell or set of dwells. It should be appreciated that in the example shown in FIGS. 14A and 14B the dwells constructed (in both Solution 1 and Solution 2) did not cover the entire frequency range in which each of the emitters, E1, E2, E3, and E4 operates. To completely cover the entire frequency range of each of these emitters, it may be necessary to construct additional dwells. In one embodiment of the invention, the information matrix is updated based on what portion of the frequency spectrum of an emitter in the matrix has been covered by a dwell. When the information matrix is empty, then all emitters have been completely covered by dwells and the scan strategy is complete.

For example, in FIG. 14A, assume that the scan strategy uses Solution 2 (i.e., the lower cost solution) and Dwells 1–9 of Solution 2 are constructed. Information Matrix 4000 of FIG. 13 may be updated as follows. The RF Min values for Emitter E1 may be changed to 1270 MHz, because the 1000–1270 MHz range is covered by Dwells 1–9. Similarly, the RF Min value of Emitter E2 may be changed 1270 MHz because the 1220–1270 MHz range is been covered by Dwells 8 and 9. When additional dwells are constructed to cover the remaining portion of the frequency range of these two emitters, these two emitters may be removed from Information Matrix 4000.

The examples in FIGS. 14A and 14B compute the cost of a dwell under the assumption that dwell duration will always be $MDT_{MAX}$, that is, the dwell duration will be the maximum PRI of the emitters covered by that dwell. However, as mentioned above, in certain situations the actual dwell duration may be longer than $MDT_{MAX}$. These situations may occur, for example, where a pulse is detected during a dwell. If a pulse is detected, the dwell duration may be extended based on the computed EDT. Thus, when a pulse is detected during a dwell, the cost of that dwell may be increased if the dwell duration is extended from MDT to EDT. Thus, it may be desirable to take into account the occurrence of some EDT dwells when computing cost while extracting the scan strategy. In one embodiment of the invention, a steady state model may be used, where it is assumed that a certain number of EDT dwells and a certain number of MDT dwells will be executed over a specific period of time. If this specific period of time is called exam_time, then Table 7 shows an equation for estimating the number of MDT dwells and EDT dwells that will occur in that period of time. The number of MDT dwells executed for every EDT dwell. The variable RVT represents the revisit time of the dwell.

TABLE 7

$$\text{Count} = \left\lceil \frac{\text{Exam\_Time}}{\text{RVT}} \right\rceil$$

In the equation of Table 7, Count is defined as Exam_Time divided by the revisit time of the dwell, RVT. The value of Exam_Time may be selected, for example, based on the signal processing algorithms used and the overall affect of the signal environment, based on field tests. Once Count has been determined by the equation in Table 7, an Actual Dwell Duration may be expressed as a weighted average of MDT and EDT, as shown in the equation of Table 8.

TABLE 8

$$\text{Actual\_Dwell\_Duration} = \frac{(\text{TO} + \text{EDR}) + (\text{Count} - 1) \times K \times (\text{TO} + \text{MDT})}{\text{Count}}$$

The equation of Table 8 computes this weighted average, assuming some tuning overhead (TO), or dead time between dwells, as a result of tuning the receiver. The constant K, in the equation, accounts for multiple fields of view per dwell cycle. It should be appreciated that the equations of Table 7 and Table 8 are merely an example of method for estimating actual dwell duration to determine dwell cost. Many other methods for estimating actual dwell duration may be used and are intended to be within the spirit and scope of the invention.

Figure 17:
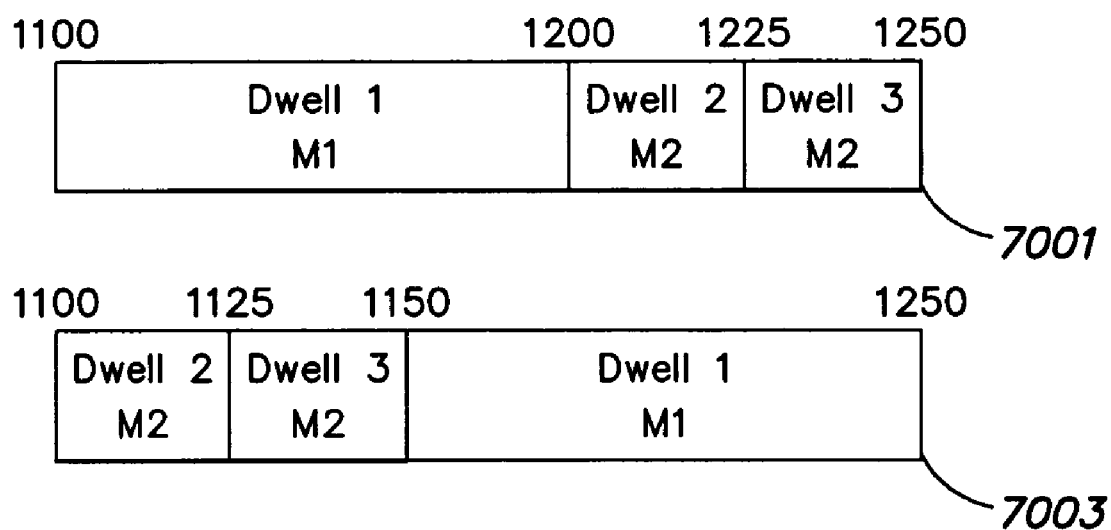
FIG. 17 is a diagram illustrating two possible scan strategies generated by using different initial limit values, according to one embodiment of the invention.

In the example of FIG. 14A, as mentioned above, the first dwell or set of dwells was created starting with the lowest RF Min value in Information Matrix 4000 of FIG. 13. However, if the lowest RF Min value in the information Matrix is used to construct the initial dwell, other possible scan strategies, which may or may not yield a lower cost, may not be considered. For example, FIG. 17 shows two emitters, E1 and E2. Emitter E1 has an RF Min value of 1100 MHz and an RF Max value of 1200 MHz. Emitter E2 has an RF Min value of 1150 MHz and an RF Max value of 1250 MHz. Suppose the initial dwell is constructed using the lowest value of RF Min, when constructing a scan strategy for Emitters E1 and E2. Scan strategy 7001 is one possible scan strategy that may result from using the lowest value of RF Min to construct the initial dwell. In this example, Dwell 1, which uses detecting method M1, covers the 1100–1200 MHz range. The remaining portion of the frequency spectrum in which emitter E2 may operate is covered by Dwell 2 and Dwell 3 which uses a greater sensitivity detecting method, M2. Scan strategy 7003, which might yield a lower cost than scan strategy 7001, depending on dwell parameters, would not be considered if the lowest value RF Min (1100 MHz) was initially used. When initially using the lowest value RF Min, even if it had been decided to use the greater sensitivity method, M2, at the bottom of the frequency spectrum, four M2 dwells would have been constructed. Then, the remaining portion of the frequency spectrum used by emitter E2 would have been covered by additional dwells (e.g., one M1 dwell or two M2 dwells).

However, by altering the frequency at which the initial dwell is constructed, other possible scan strategies may be constructed. For example, suppose that the initial dwell is constructed using the RF Min of emitter E2 (i.e., 1150 MHz). A scan strategy such as scan strategy 7003 may result. In scan strategy 7003, the initial dwell, Dwell 1, uses detecting method M1 and covers the 1150–1250 MHz range. Because the information matrix would not be empty after the construction of Dwell 1, Dwells 2 and 3 may be constructed to cover the portion of the frequency spectrum in which emitter E1 operates, but which is not covered by Dwell 1. Thus, by varying the RF Min at which the initial dwell is constructed, different lower cost scan strategies may result.

Figure 15:
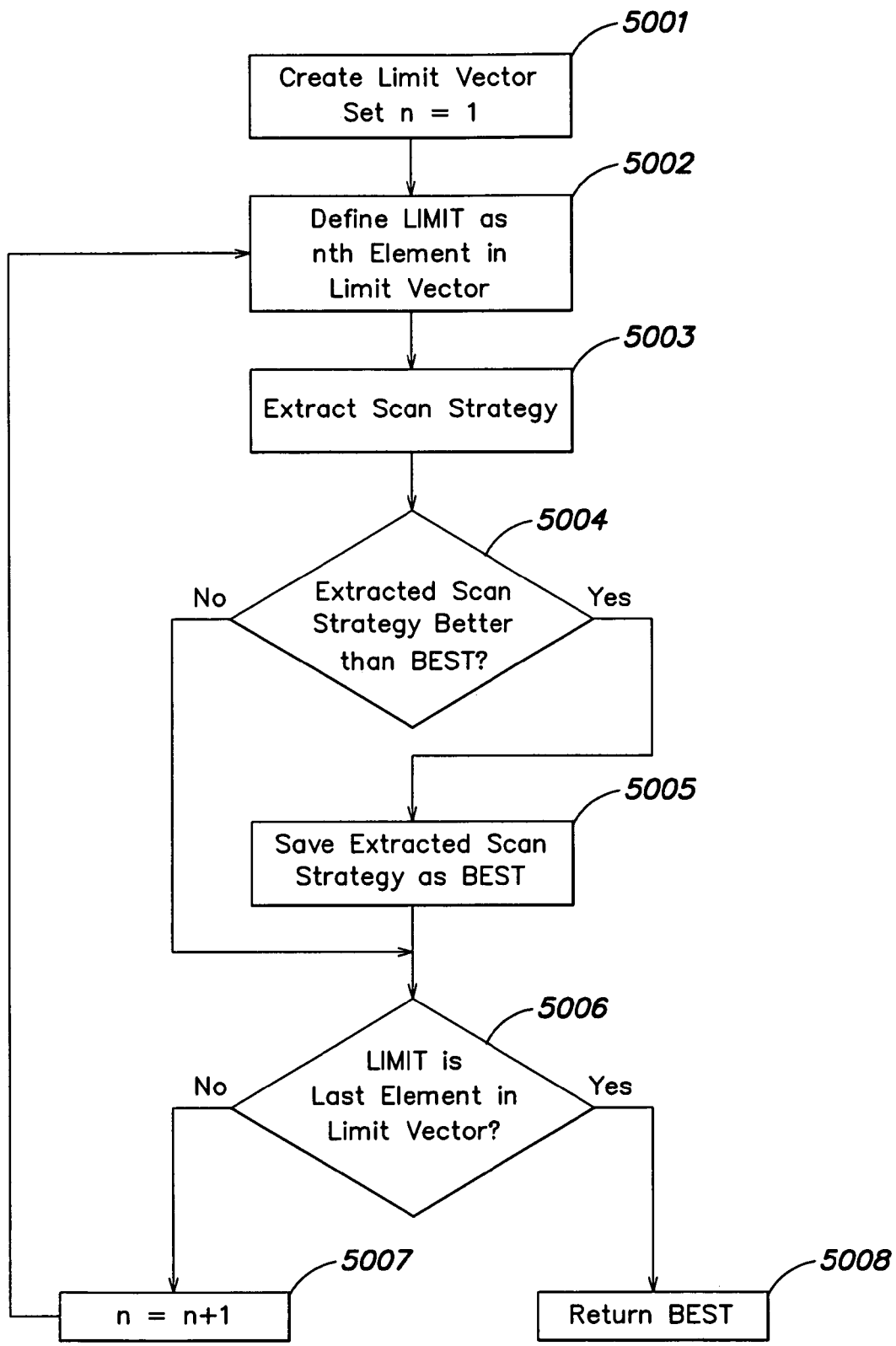
FIG. 15 is a flow chart illustrating an example of a method for creating a scan strategy, according to one embodiment of the invention.

A flow chart for constructing scan strategies with varying initial RF Min values, according to one embodiment of the invention, is shown in FIG. 15. At act 5001, a Limit Vector is created. The Limit Vector is a vector of each of the RF Min values in the information matrix. Thus, for the two emitters, E1 and E2 in FIG. 17, the Limit Vector would be, for example, [1100 1150], because the RF Min value for emitter E1 is 1100 and the RF Min value for emitter E2 is 1150. Also at act 5001, a variable n is initialized to 1. The variable n represents the current position in the Limit Vector on which the process is operating. Thus, initially the process operates on the first value in the Limit Vector.

The process then continues to act 5002, where a variable LIMIT is defined as the nth element in the Limit Vector. Because n initially has the value 1, LIMIT is first set as the first element in the Limit Vector. Using the example of FIG. 17, with emitters E1 and E2, LIMIT would first be set to 1100. The process then continues to act 5003, where the scan strategy is extracted using the value of LIMIT. As will be discussed in greater detail below, extracting the scan strategy includes building dwells to cover the emitters in the information matrix and evaluating different the cost of using different detecting methods for these dwells.

Next the process continues to act 5004 where the cost of the scan strategy is compared to the cost of BEST, which is the scan strategy which has the lowest cost so far. BEST is initialized to a scan strategy having infinite cost, so the first scan strategy extracted at act 5003 will be lower in cost than BEST. If the cost of the extracted scan strategy is lower than the cost BEST, then the extracted scan strategy is saved as BEST and the process continues to act 5006. If the extracted scan strategy is not lower in cost than BEST, then act 5005 is skipped and the process continues directly to act 5006. At act 5006 it is determined if LIMIT is the last element in the Limit Vector. If LIMIT is the last element in the Limit Vector, then the scan strategy BEST is returned as the scan strategy to be used for the emitters in the information matrix. If LIMIT is not the last element in the Limit Vector, the value of n is incremented by one, and the process returns to act 5002. At act 5002 LIMIT is redefined as the next element in the Limit Vector and the process repeats using this new LIMIT value.

In the example of FIGS. 14A and 14B, the initial detecting method used to create a dwell was the lowest sensitivity, widest bandwidth, detecting method. Then, the greater sensitivity detecting method was evaluated to see if it yielded a lower cost for a dwell or set of dwells having a bandwidth defined by the lowest sensitivity detecting method. Thus, the number of dwells needed for the greater sensitivity detecting method was based on this initial bandwidth of the lowest sensitivity detecting method. It has been recognized that in some situations, the cost of a scan strategy may be reduced if the initial bandwidth is varied from that of the lowest sensitivity detecting method. The cost may be reduced because each detecting method may differ in instantaneous frequency coverage and sensitivity, which in turn alters the mix of emitters in the database which may be satisfied by a dwell having a frequency range based on the bandwidth of the detecting method. That is, if one were to assume that the lowest sensitivity detecting method was not available, then a lower cost scan strategy may result from using the bandwidth of the next greatest sensitivity detecting method as the initial bandwidth. That is, the method for extracting a scan strategy may loop on all available detecting methods, progressively inhibiting detecting methods. This may be done for each value of the Limit Vector. That is, each time the process in FIG. 15 extracts a scan strategy at act 5003 (i.e., with a different value for LIMIT), the loop on detecting methods may be performed. As a result, a total of M×N scan strategies may be generated, where M represents the number of elements in the Method Vector and N represent the number of elements in the Limit Vector.

Figure 18:
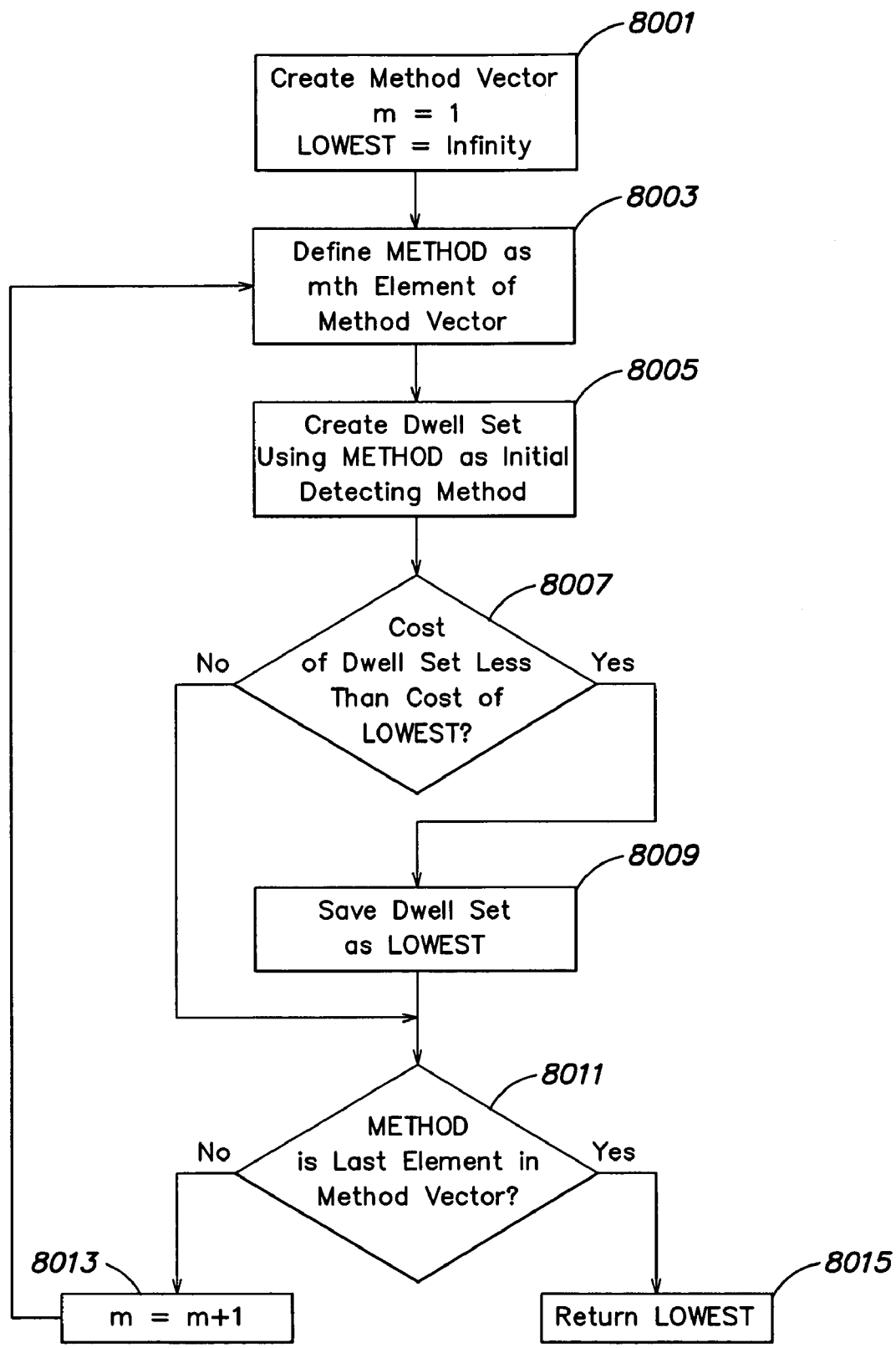
FIG. 18 is a flow chart illustrating an example of a method for creating a scan strategy, according to one embodiment of the invention.

A process for looping on detecting methods, according to one embodiment of the invention, is shown in FIG. 18. At Act 8001 a Method Vector is created. The Method Vector is a vector of all detecting methods, ordered from lowest sensitivity to greatest sensitivity. The variable m which represents the current position in the Method Vector is initialized to one. The variable LOWEST which represents the scan strategy with the lowest cost so far is initialized to a scan strategy having a cost of infinity. The process then continues to act 8003, where the variable METHOD is defined as the $m^{th}$ value in the Method Vector. As m is initialized to one, METHOD will initially be the first value in the Method Vector. At act 8005, the Create Dwell Set Process is invoked to create the dwell set using METHOD as the initial detecting method that defines the initial bandwidth. As will be discussed in greater detail below, The Create Dwell Set Process also uses the current value of LIMIT as determined in the flow chart of FIG. 15. If it is decided not to loop on LIMIT values (e.g., to omit the process of FIG. 15), then Create Dwell Set Process may simply uses the lowest RF Min value in the information matrix instead of LIMIT. As will also be discussed below, when the Create Dwell Set Process evaluates various detecting methods, the initial dwells will be created using the detecting method specified by METHOD. The cost of using METHOD will then be compared to all of using all the greater sensitivity detecting methods to cover that portion of the frequency spectrum.

After the dwell set is created, the process continues to act 8007, where the cost of the created dwell set is compared to the cost of LOWEST. If the cost of the created dwell set is less than the cost of lowest, the process continues to act 8009 where the created dwell set is saved as LOWEST. It should be appreciated that the first time a dwell set is created (i.e., before the process loops back at act 8013), the created dwell set will have a lower cost than LOWEST, as LOWEST was initialized to a dwell set having infinite cost.

If the created dwell set does not have a lower cost than LOWEST, the process continues directly to act 8011. At act 8011 it is determined if METHOD is the last detecting method in the Method Vector. If so, then at act 8015 the scan strategy LOWEST is returned. Otherwise, m is incremented by one, and the process returns to act 8003, and repeated using the next value in the Method Vector.

Figure 16:
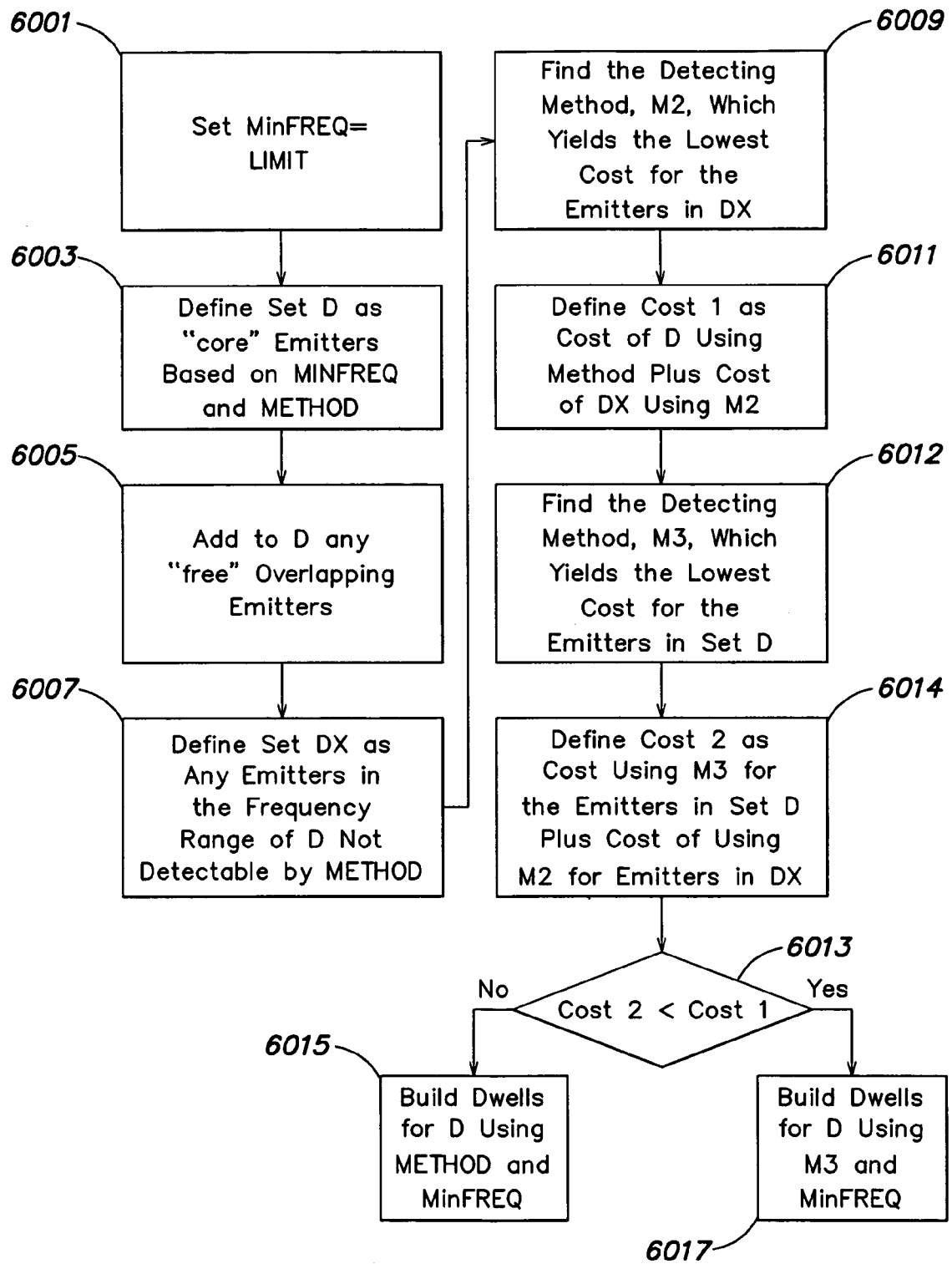
FIG. 16 is a flow chart illustrating an example of a method for creating a scan strategy, according to one embodiment of the invention.

As mentioned above, when creating a dwell set at act 8005, it is desirable to determine which detecting method yields the lowest cost for a dwell or set of dwells. FIG. 16 shows an example Create Dwell Set Process for performing act 8005 according to one embodiment of the invention. At act 6001 the variable MinFREQ is set to the current value of LIMIT. The process continues to act 6003, where set D is defined as the "core" emitters based on MinFREQ and METHOD.

The core emitters may be determined as follows. First, MaxFREQ may defined as the maximum frequency of METHOD starting at MinFREQ and extending upwards. Then the set of emitters INTERNAL may be defined as all of the rows (i.e., emitter modes) in the information matrix that have a frequency range (i.e., RF Min and RF Max) completely contained within MinFREQ and MaxFreq of METHOD. The set EXTERNAL may be defined as the rows of the information matrix whose frequency contains the entire frequency range of MinFreq to MaxFreq. That is, the frequency range of METHOD, starting at MinFREQ, is completely contained with the RF Min and RF Max of each emitter mode in the set EXTERNAL. Set D may be defined as the union of the sets EXTERNAL and INTERNAL. The emitters in set D represent the "core" emitters.

Emitters may then be pre-filtered out of set D, if METHOD is a poor choice for detecting these emitters. Each emitter mode has a pre-filtering flag associated with each detecting method. Thus, for example, if there are eight detecting methods, there would be eight pre-filtering flags for each row (i.e., each emitter mode) in the information matrix. If the pre-filtering flag for associated with a particular detecting method is false, then the flag indicates that the detecting method is a poor choice for solving for that emitter mode.

The flags may be set by computing the cost of each of the methods, multiplied by the number of dwells required to cover the row's frequency range. If there is no difference in cost, all methods for a row remain enabled. If there is a big difference in cost, then the method is a candidate to be filtered out via the flags. However, a detecting method may only be filtered out via the flags if the cost of other rows within the IF bandwidth of the method are not similar (or greater in cost) than the given method. By pre-filtering out some detecting methods, the algorithm reduces the amount of computation necessary to find a highly cost effective solution by eliminating detecting methods which are unlikely to yield satisfactory solutions for particular emitters.

Each time a dwell is built, the flags may be recomputed. This may be necessary because the dwell may have removed adjacent rows from the information matrix or the frequency range of the row may have be reduced because the dwell that was just built covered part of the frequency range of that row. Reducing the frequency range of row alters the cost of the detecting methods. Also, after a dwell is built, a check may be made to see if any of the pre-filtered out rows are incidentally covered by the dwell. If they are, then they may included in that dwell anyway and removed from the information matrix. Thus, pre-filtering of detecting methods may help set up the solution search, but does not necessarily prevent a method from being used.

After pre-filtering has been applied to set D, removing any rows from the set D which are a poor choice for METHOD, the process continues to act 6005 where any "free" overlapping emitters may be added to set D. At act 6005, sets HIGHOVERLAP and LOWOVERLAP may be defined. Set HIGHOVERLAP includes rows of the information matrix that have an RF Min value greater than MinFREQ and less than MaxFREQ, but have an RF Max value greater than MaxFREQ. LOWOVERLAP includes rows of the information matrix that have an RF Max value greater than MinFREQ and less than MaxFREQ, but have an RF Min value less than MinFREQ. The rows in HIGHOVERLAP and LOWOVERLAP may be termed "overlapping" emitters because the frequency range of these emitters overlaps the frequency range of METHOD, defined by MinFREQ and MaxFREQ. A row in one of these two sets may be added to D if that row would not drive the dwell parameters (i.e., if the dwell duration is less than $DD_{MAX}$ of the rows in D and revisit time greater than the $RVT_{MIN}$ of the rows in D).

However, a row in of these two sets may be added to D even if the row would drive the dwell parameters, as long as overall dwell count would not increase. For example, if an emitter's frequency range overlaps with the upper part of the frequency range of METHOD (i.e., an emitter in HIGHOVERLAP), and if this overlapping emitter's frequency range needs two dwells to provide coverage of the entire frequency range, and the emitter's frequency range is overlapping METHOD's frequency range by at least half of the emitter's frequency range, this emitter may be added in to set D. As a result, only one additional dwell will be needed at a later time to cover the rest of the emitter's frequency range. However, if the overlap was only ten percent, there is no reason to include this emitter in set D, because two dwells will still be generated at a later time to cover the remaining ninety percent.

At this point, any emitters in set D which have conflicting hardware controls may be removed from set D. That is, set D may be redefined as the largest subset of set D which has no hardware controls conflicts. The process then continues to act 6007 where set DX is defined. DX includes any emitters that are in the frequency range of D, but are not detectable by detecting method METHOD (i.e., due to pre-filtering, hardware conflicts, etc.) After set DX is defined the process continues to act 6009. At act 6009, it is determined which detecting method, of greater sensitivity than METHOD, yields the lowest cost for DX. This detecting method may be called M2. Finding M2 may be accomplished by evaluating the cost of each detecting method for covering the desired frequency range, as in the examples of FIGS. 14A and 14B. It should be appreciated that, as in the examples of FIGS. 14A and 14B, the greater sensitivity detecting method may require more than one dwell to cover the frequency range of the emitters in set DX. It should further be understood that in the examples of FIGS. 14A and 14B, for the sake of simplicity, only two detecting methods were evaluated to determine which detecting method yielded the lowest cost. However, many more detecting methods could be used for a dwell. In one embodiment of the invention up to eight detecting methods are available, although any suitable number of detecting methods could be used, as the invention is not limited in this respect.

The process next continues to act 6011 where Cost 1 is defined as the cost of using METHOD as the detecting method for the emitters in set D plus the cost of using detecting method M2 for the emitters in set DX. After Cost 1 is computed, the process continues to act 6012, where the detecting method, of greater sensitivity than METHOD, that yields the lowest cost for the emitters in D is determined. This detecting method may be called M3. Similar to M2, detecting method M3 may be identified by evaluating the cost of dwell D for the available detecting methods and selecting the one with the lowest cost. Because M3 is a greater sensitivity and a smaller bandwidth detecting method than M2, more than one M3 dwell may be needed to cover the entire frequency range of METHOD. The process continues to act 6014, where Cost 2 is defined as the cost of using M3 for the emitters in set D, plus the cost of M2 for emitters in DX. It should be appreciated that M3 and M2 may be the same detecting method or may be different detecting methods. If M3 and M2 are the same detecting method, it may be assumed that the emitters in DX and D are covered by the same set of M3 dwells, and Cost 2 is defined as the cost of these dwells. Otherwise, as mentioned above, Cost 2 is the sum of the cost of M2 dwells for DX and the cost of the M3 dwells for D.

Next, at act 6013, Cost 1 is compared to Cost 2. If Cost 1 is less than Cost 2, then a dwell is built for the emitters in D using METHOD. A dwell or multiple dwells are also built for the emitters in DX using M2. Otherwise, if Cost 2 is less than or equal to Cost 1, a dwell or set of dwells is built for set D using method M3 and one or more dwells are built for DX using M2.

It should be appreciated that MinFREQ may be altered as the process of FIG. 16 is executed. Initially, MinFREQ is set to LIMIT. LIMIT is a proposed lower bound of a potential dwell. Thus, when the process starts, it is testing the hypothesis that a dwell having the bandwidth of METHOD starting at LIMIT will satisfy the emitters in that frequency range. It is possible that when extracting the subset of emitters that have compatible, non-conflicting hardware controls, the smallest frequency of this set may be a frequency other than LIMIT. Another possibility is that the emitter that defined LIMIT is the vastly different in minimum frequency, relative to the other emitters that can be covered, and it has been tossed out of the "core" set, D. In this case, D contains the emitters that we want to solve on this iteration, and its possible that the dwell start for this set is something other than LIMIT. In this case MinFREQ would be set to the dwell start for set D.

Once the dwell or set of dwells is built, the information matrix may be updated to remove rows that are completely covered by the dwells and to alter the frequency ranges of the rows that are partially covered by the dwell or set of dwells. MinFREQ is again to be the lowest RF Min left in the information matrix that is greater than LIMIT. If no such RF Min exists, then MinFREQ may be set to the lowest RF Min left in the information matrix. The process of FIG. 16 may then be repeated starting at act 6003, and using the new value of MinFREQ. Once the information matrix is empty, then a scan strategy has been constructed for this particular LIMIT and METHOD combination.

It should be appreciated that looping on the Limit Vector and Method Vector (i.e., M×N looping) are not necessary in building a scan strategy. For example, LIMIT may simply be fixed at the lowest RF Min in the information matrix and METHOD may be fixed at the lowest sensitivity detecting method. The Create Dwell Set Process (e.g., in FIG. 16) may simply be called using these fixed values for LIMIT and METHOD (e.g., without using the LIMIT looping in FIG. 15 and the METHOD looping of FIG. 18). Alternatively, LIMIT looping may be used without METHOD looping. That is, the value of METHOD is fixed at the lowest sensitivity detecting method, and the Create Dwell Set Process is called for each value in the Limit Vector. Alternatively, METHOD looping may be used without LIMIT looping. In this scenario, the value of LIMIT is fixed at the lowest RF Min initially in the information matrix and the Create Dwell Set Process is called for each value in the Method Vector.

Various modifications to the algorithms discussed above for creating dwells as part of a scan strategy are available and intended to be within the scope of the invention. Such modifications include, but are not limited to, modifications to the method of computing cost, modifications to the pre-filtering algorithm and the like. An example of such a modification involves computing dwell cost using a smaller dwell duration value than the maximum from among the signal parameters of the emitters of interest. This modification will be discussed below in greater detail.

Non-Maximum Dwell Duration Selection

As mentioned above, the minimum duration of a dwell is typically the maximum PRI of the emitters that the dwell is intended to cover. However, in some situations it may be possible to reduce the minimum dwell duration of a dwell to a length of time less than that of the maximum PRI of the emitters that the dwell is intended to cover. It may be possible to reduce the minimum dwell duration, for example, when the overall probability of intercept of a particular dwell may still be met with a shorter dwell duration.

A first aspect of overall probability of intercept is the probability that, during an illumination period, a pulse of the emitter will occur during execution of dwell. As mentioned above, because the minimum dwell duration for detection of an emitter is typically set to the PRI of that emitter, the probability of intercept is typically 1.0, because in most cases, a dwell will not fall between pulses of the emitter. However, if the dwell is not executed during an illumination period, detection of the emitters may not occur. Thus, a second aspect of probability of intercept is the probability that the dwell will be revisited during an illumination period. If the revisit time is "out of phase" to the illumination periods, then detection may not occur until after many illumination periods. Worse, if the revisit time and illumination period are exactly harmonically related and out of phase, then an intercept may never occur. However, as the revisit time for a dwell is decreased, the likelihood that the dwell will be revisited during an illumination time is increased. Thus, as discussed above, a desired probability of intercept is used in computing revisit times for emitters in the information matrix, for a particular detecting method. As a result, the overall probability of intercept may be expressed as the probability of executing the dwell during an illumination time (i.e., intercepting the emitter) multiplied by the probability of dwelling long enough to intercept sufficient energy to declare detection.

When a dwell is built from parameters of different emitters (e.g., $DD_{MAX}$ is associated with Emitter 1 and $RVT_{MIN}$ is associated with Emitter 2), it may be possible to meet the overall probability of intercept without considering the dwell duration of a particular emitter when determining the $DD_{MAX}$ of the emitters. For example, suppose a first emitter and a second emitter are covered by a dwell which has a revisit time associated with the second emitter (i.e., $RVT_{MIN}$ is the revisit time of the second emitter). As a result, the overall probability of intercept of the first emitter in that dwell has increased because the revisit time for the dwell is lower than the revisit time calculated for that emitter. A cost savings may be achievable by decreasing the overall probability of intercept for that emitter (i.e., to bring the overall probability of intercept back to approximately what was specified during revisit time calculation). The overall probability of intercept for the emitter may be decreased in certain situations by decreasing the dwell duration of the dwell to a length of time less than that of the PRI of the emitter. These situations occur, for example, when the revisit time of the dwell (i.e., the $RVT_{MIN}$) adequately over-samples for that emitter. It may be determined if the revisit time of the dwell adequately over-samples for the emitter if the inequality in Table 9 is true. In Table 9, $RVT_{MIN}$ represents the lowest revisit time of the emitters covered by the dwell. $DD_{MIN}$ represents the dwell duration of the emitter having $RVT_{MIN}$. Thus, $DD_{MIN}$ and $RVT_{MIN}$ are in the same row and are associated with the same emitter. $RVT_N$ and $DD_N$ represent the revisit time and dwell duration of the emitter being tested to determine if $DD_N$ may be excluded when determining $DD_{MAX}$ for the dwell.

TABLE 9

$$RVT_{MIN} \leq RVT_N\left(\frac{DD_{MIN}}{DD_n}\right)$$

Thus, if $RVT_{MIN}$ is less than or equal to the product of $RVT_N$ and the ratio of $DD_{MIN}$ to $DD_N$, then $RVT_{MIN}$ adequately over-samples such that $DD_{MIN}$ may be used as the dwell duration without decreasing the overall probability of detection desired for the emitter associated with $DD_N$ and $RVT_N$.

An example of such a situation is shown in FIG. 19. Emitter 1 in FIG. 19 has a dwell duration of 1 ms and a revisit time of 500 ms. Emitter 2 has a dwell duration of 2 ms and a revisit time of 1200 ms. Suppose that when extracting a scan strategy for these two emitters (e.g., using the method described above in connection with dwell placement), a dwell is created that covers both Emitter 1 and Emitter 2 of FIG. 19. Using the method of computing cost as described in Table 3, the cost of this dwell would be $$\frac{2}{500}$$

or 0.004, because the $DD_{MAX}$ of the two emitters is 2 ms, and the $RVT_{MIN}$ of the two emitters is 500 ms. However, as mentioned above, because the dwell covering Emitter 2 will now be executed every 500 ms instead of every 1200 ms, the overall probability of intercept of Emitter 2 by the dwell has increased. As mentioned above, a cost savings may be achieved by decreasing $DD_{MAX}$ to the dwell duration of Emitter 1 (i.e., 1 ms), because the increased revisit time of the dwell, $RVT_{MIN}$, adequately over-samples so that the original desired probability of intercept is not sacrificed.

For example, suppose that the desired probability of intercept specified when calculating the revisit time for Emitter 2 is 0.5. If the probability of intercept based on dwell duration is 1.0 (i.e., if dwell duration is 2 ms), then the overall probability of intercept would be 0.5. Also assume that if the revisit time for Emitter 2 were 500 ms, then the probability of intercept would be 1.0. Thus, when a dwell is created having a revisit time of 500 ms and a dwell duration of 2 ms, the overall probability of detection is 1.0. However, the overall desired probability of intercept was previously specified as 0.5. Now assume that decreasing the dwell duration from 2 ms to 1 ms decreases the probability of dwelling long enough to intercept sufficient energy to declare detection (i.e., the probability of intercept based on dwell duration) of Emitter 2 to 0.5. Now the overall probability of detection Emitter 2 is back to 0.5 (i.e., the product of 1.0 and 0.5) and a cost savings is achieved by reducing the dwell duration from 2 ms to 1 ms. As mentioned above, the inequality of Table 9 may be used as a test to determine if an emitter is adequately over-sampled for by $RVT_{MIN}$ so that the dwell duration of that emitter may be disregarded in determining the $DD_{MAX}$ for the dwell. Table 10 shows the result of this inequality using the emitters of FIG. 19, where $RVT_{MIN}$ and $DD_{MIN}$ represent the revisit time and dwell duration of Emitter 1, and $RVT_N$ and $DD_N$ represent the revisit time and dwell duration of Emitter 2, respectively.

TABLE 10

$$500 \leq 1200\left(\frac{1}{2}\right)$$

Because the inequality is true (i.e., 500 is less than or equal 600) for the values of Emitter 1 and Emitter 2, the dwell duration of Emitter 2 may be excluded when determining the $DD_{MAX}$ for the dwell. In the example of FIG. 19, the dwell would have a revisit time of 500 ms and a dwell duration of 1 ms, yielding a cost of $$\frac{1}{500}$$

or 0.002.

In addition to cost savings in this manner, a cost savings may also be achieved in certain situations by running several dwells with different timing relationships, as opposed to a single dwell, even though the dwells otherwise have the same tuning configurations. As a result, the frequency range of the set of emitters covered by the dwell or dwells is scanned by the receiver multiple times, but at different rates. For example, in FIG. 20, Emitter 1 and Emitter 2 have same hardware and tuning configuration and thus could be covered by a single dwell. The cost of covering these two emitters with a single dwell would be 0.01 (i.e., 5/500). The cost of covering these two emitters with two separate dwells (i.e., a first dwell for Emitter 1 and a second dwell for Emitter 2) would be 0.007 (i.e., 0.002+0.005). In addition, every time the second dwell for Emitter 2 executes, it satisfies the detection requirements for Emitter 1 and Emitter 2, allowing the cost estimate of 0.007 to be lowered.

Figure 21:
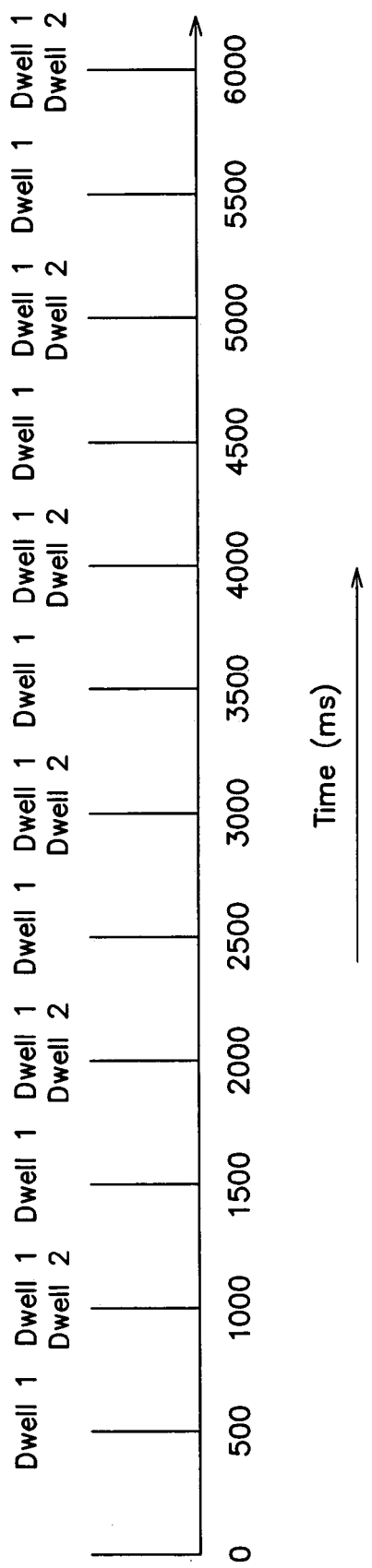
FIG. 21 is a diagram showing the timing of execution of dwells, according to one embodiment of the invention.

For example, as illustrated in FIG. 21, Dwell 1, which covers Emitter 1 has a revisit time of 500 ms, thus it is executed every 500 ms. Dwell 2 has a revisit time of 1000 ms and is executed every 1000 ms. However, because Dwell 2 satisfies the detection requirements for Dwell 1 (i.e., the dwell duration of Dwell 2 is greater than 1 ms), it may not be necessary to execute Dwell 1 at the 1000 ms intervals (i.e., 1000 ms, 2000 ms, 3000 ms, etc.). As a result, the cost of executing Dwell 1 at the 1000 ms intervals may be subtracted from the total cost of the two dwells. The equation in Table 11 is an example of an equation that may be used to compute the cost of covering two emitters with separate dwells, taking into account the reduced cost provided by overlap of the dwells. In the equation of Table 11, $DD_1$ and $RVT_1$ represent the dwell duration and revisit time of the emitter with the shorter revisit time, while $DD_2$ and $RVT_2$ represent the dwell duration and revisit time of the emitter with the longer revisit time.

TABLE 11

$$Cost = \frac{DD_2 + DD_1\left(\frac{RVT_2}{RVT_1} - 1\right)}{RVT_2}$$

Thus, in the example of FIG. 21, the cost of using independent dwells, as computed by the equation of Table 11, would be 0.006. Table 12 shows this computation. Thus, using two independent dwells for Emitter 1 and Emitter 2 in FIG. 21 yields a cost of 0.006, as opposed to a cost of 0.01 for a single or "merged" dwell.

TABLE 12

$$\text{Cost} = \frac{5 + 1\left(\frac{1000}{500} - 1\right)}{1000}$$

$$\text{Cost} = \frac{6}{1000}$$

$$\text{Cost} = .006$$

Figure 22:
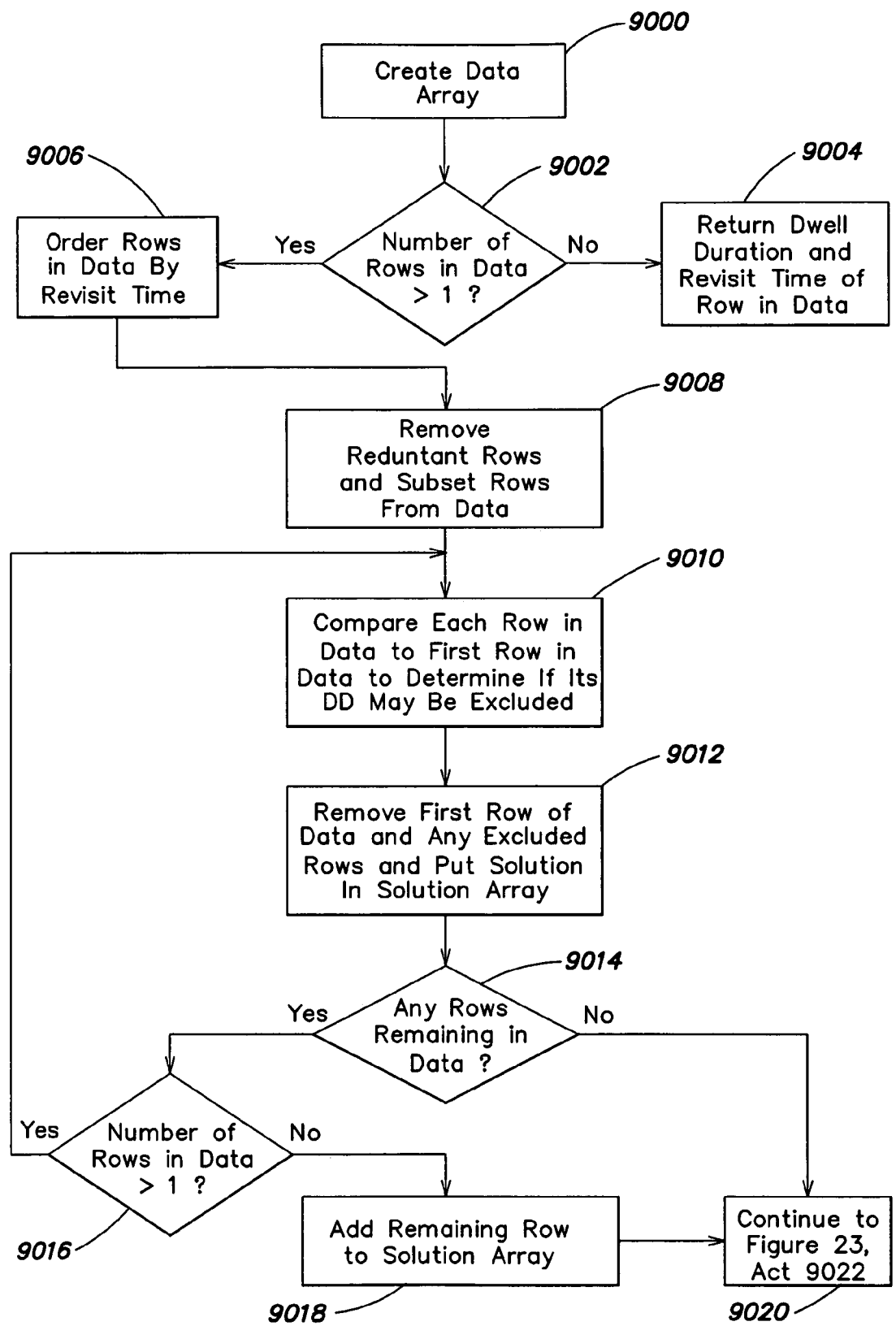
FIG. 22 is a flow chart illustrating a method of selecting a non-maximum dwell duration, according to one embodiment of the invention.
Figure 23:
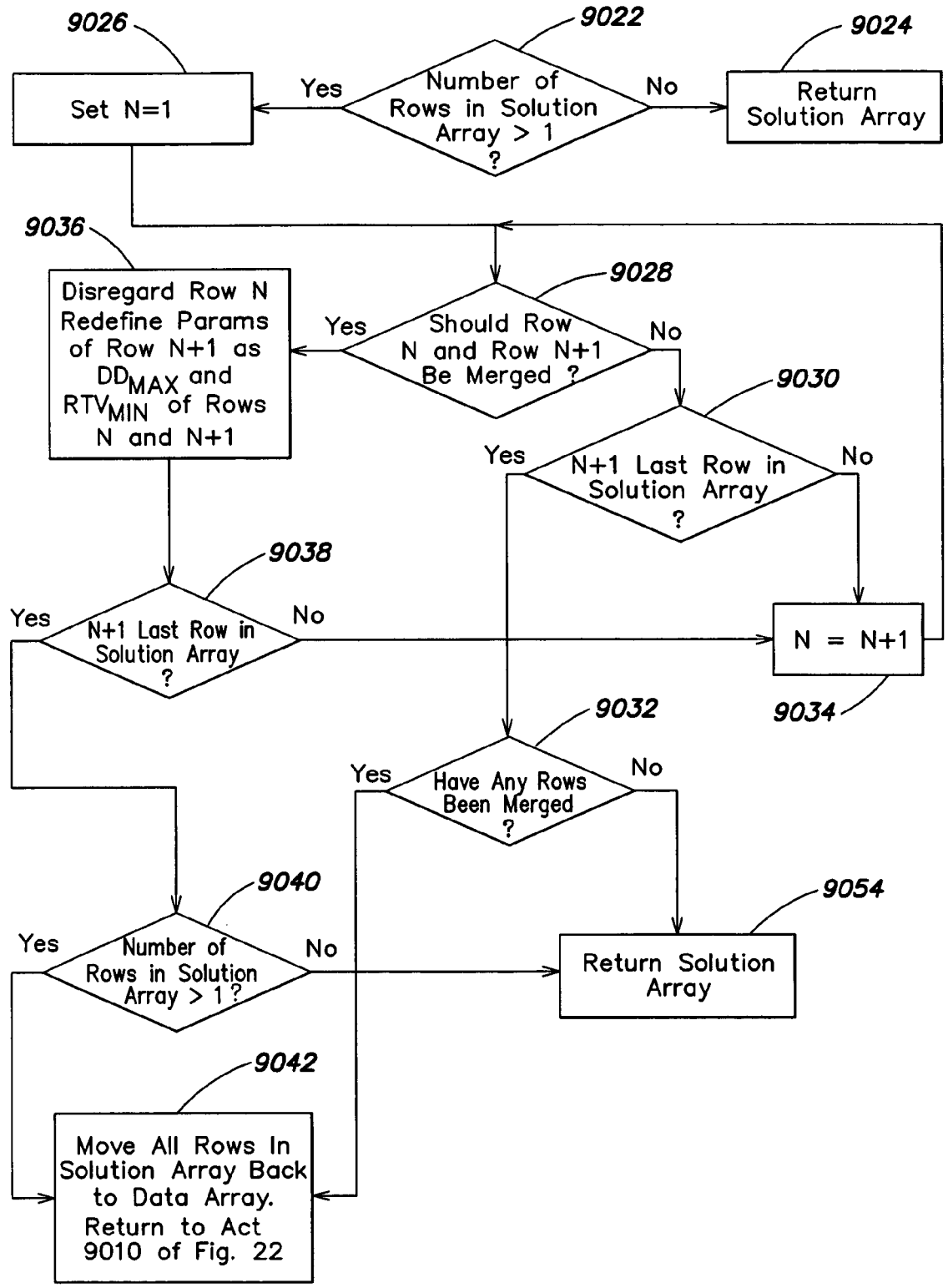

FIG. 22 and FIG. 23 are flowcharts illustrating a method for determining whether the dwell duration of a dwell may be reduced from the $DD_{MAX}$ of the emitters which the dwell is intended to cover and whether a single dwell or two or more dwells with different timing relationships should be used to cover these emitters. That is, the method of FIG. 22 and FIG. 23 may reduce the cost of covering the emitters by returning the number of dwells and the parameters of these dwells to be used in the scan strategy. Thus, for example, when extracting the scan strategy, this method may be performed when computing the cost of a dwell.

At act 9000 of FIG. 22, the Data Array is created. Each row in the Data Array corresponds to an emitter that is covered by the dwell for which the cost is being computed. The Data Array has three columns. The first column is minimum dwell duration (MDT), the second column is extended dwell duration (EDT), the third column is revisit time. An example of a Data Array 9044 is shown in FIG. 24A. Data Array 9044 initially has seven rows, indicating that the dwell is intended to cover seven emitters. At act 9002, it is determined whether there is more than row in the Data Array. If there is only one row in the Data Array, then the dwell only covers one emitter. Thus, the parameters of the dwell (i.e., dwell duration and revisit time) which yield the lowest cost are simply the dwell parameters associated with that emitter (e.g., the dwell duration and revisit time of the row in Data Array). Accordingly, the process continues to act 9004, where the dwell duration and revisit time of the row in the Data Array are returned as the solution for the parameters of the dwell.

If, however, there is more than one row in the Data Array, the process continues to act 9006, where the rows are ordered by revisit time, from the shortest revisit time to the longest revisit time. If two rows have the same revisit time, but different dwell durations, the row with the shorter minimum dwell duration may be replaced by the row with the longer minimum dwell duration. In the example of Data Array 9044 of FIG. 24A, because Data Array 9044 has more than one row, it is ordered by revisit time, as shown in FIG. 24B. The process next continues to act 9008, where any redundant rows and rows that are a subset of other rows are removed from Data. A row is a subset of another row if it has a greater revisit time but a shorter MDT and EDT than the other row. Because this row will not drive the dwell parameters (i.e., its dwell duration will not be $DD_{MAX}$ and its revisit time will not be $RVT_{MIN}$), it may be excluded from the cost analysis. In Data Array 9044 of FIG. 24B, because row 4 9048 is a subset of another (e.g., row 1) it may be removed. Additionally, because row 6 9050 is redundant with respect to row 5 9049, it may also be removed. The resulting Data Array 9044 is illustrated in FIG. 24C.

Once these rows are removed, the process continues to act 9010, where each row in the Data Array is compared to the first row in the Data Array to determine if that row's MDT may be excluded when determining $DD_{MAX}$ for the dwell. This may be done, for example, as described above using the equation of Table 9. That is, if the revisit time of the first row is less than or equal to the product of the revisit time of the row being compared and the ratio of the dwell duration of the first row to the dwell duration of the row being compared, then the row being compared passes the test and it's dwell duration may be excluded when determining $DD_{MAX}$. In the example of Data Array 9044 in FIG. 24C, row 4 9051 and row 5 9052 both pass this test. This indicates that a dwell may be created having a $DD_{MAX}$ of the first row and an $RVT_{MIN}$ of the first row, which covers the emitters associated with the first row, row 4 9051, and row 5 9052. The process of FIG. 22 then continues to act 9012, where the first row and any rows that were excluded in act 9010 (e.g., any rows passing the test of the equation of Table 9) may be removed from the Data Array. If no rows passed the test of the equation of Table 9, only the first row of the Data Array is removed. Additionally, a row is created in a Solution Array that indicates the parameters of a dwell which would cover the emitters associated with the rows removed from the Data Array in act 9012. The parameters of this dwell would typically be the $DD_{MAX}$ and the $RVT_{MIN}$ of the rows removed. However, because it was determined at act 9010 that the dwell durations of the rows passing the test of the equation of Table 9 could be excluded when determining $DD_{MAX}$, $DD_{MAX}$ is set to the dwell duration of the first row. The EDT of the row added to the solution matrix may be set to the longest EDT of all the rows removed from the Data Array. FIG. 24D shows Data Array 9044 and Solution Array 9046 after acts 9010 and 9012 have been performed. As can be seen, the first row of Data Array 9044, as well as rows 9051 and 9052 have been removed from the Data Array. Additionally, a row has been created in Solution Array 9046 which includes the parameters of dwell that would cover the rows removed from Data Array 9044.

The process of FIG. 22 next proceeds to act 9014, where it is determined if there are any rows remaining in the Data Array. If there are no rows remaining, the process continues to act 9020. Otherwise, if there are rows remaining the process continues to act 9016, where it is determined if there is more than one row remaining in the Data Array. If there is only one row remaining in the Data Array, then process continues to act 9018 where the remaining row is removed from the Data Array and added to the Solution Array. After the row is added to the Solution Array, the process continues to Act 9020. If there is more than one row remaining in the Data Array at act 9016, the process returns to Act 9010, where the row comparisons are repeated, this time using the new first row and comparing the subsequent rows to the new first row. The process then continues again to act 9012 where the first row of the Data Array and any rows that were excluded in act 9010 are removed from the Data Array, and the resulting solution row for the removed rows is added to the Solution Array. For example, because Data Array 9044 in FIG. 24D has more than one remaining row, the second row will be compared to the first row using the equation of Table 9. The second row passes this test, and thus both rows of the Data Array may be removed and the solution row resulting from these two rows may be added to the Solution Array. The resulting Data Array 9044 and Solution Array 9046 are shown in FIG. 24E. Data Array 9044 is empty, because both rows have been removed. Solution Array 9046, now includes an additional row, which represents the parameters of a dwell for the two emitters corresponding to the two rows just removed from the Data Array.

The process then continues to act 9014, where it is again determined if any rows are left in the Data Array. In the example of FIG. 24E, no more rows are left in Data Array 9044, so the process would continue to act 9020. However, if there was more than one row left in the Data Array, the process would return to act 9010 to again determine if any rows could be excluded given the new values of $RVT_{MIN}$ and $DD_{MIN}$.

Once the process reaches act 9020, the Data Array is empty and the Solution Array includes possible solutions for the dwell parameters. For example, Solution Array 9046 includes two rows, indicating that two dwells may be used to cover the emitters. The first dwell has an MDT of 1 ms, an EDT of 19 ms, and an RVT of 500 ms, while the second dwell has an MDT of 2 ms, an EDT of 11 ms, and an RVT of 700 ms. However, as discussed above, it is possible in some situations that merging these two dwells into a single dwell may result in a lower cost than running two separate dwells. The process of FIG. 23 evaluates this possibility and determines if dwells should be maintained as separate dwells or if dwells should be merged. As will be discussed in greater detail below with respect to FIG. 23, if, after some rows in the Solution Array are merged, more than one row remains in the Solution Array, it may be desirable to return to FIG. 22 to determine if any of the rows left in the Solution Array may be excluded in determining $DD_{MAX}$ for the dwell.

Thus, at act 9020 of FIG. 22, the process continues to act 9022 of FIG. 23, where it is determined if there is more than one row in the Solution Array. If there is only row in the Solution Array, then the process continues to act 9024 Solution Array is returned as the solution, indicating that one dwell may be used to cover the emitters, having dwell parameters defined by the one row in the Solution Array. If there is more than one row in the Solution Array, then the process continues to act 9026, where the index variable N is set to one. The variable N indicates the row in the solution that is currently being evaluated. The process next continues to act 9028, where it is determined if Row N and Row N+1 of the Solution Array should be merged. This determination may be made for example, by calculating the cost of using separate dwells for Row N and Row N+1 using the equation of Table 11 and comparing this cost to the cost of using a single "merged" dwell that covers both row N and row N+1. The cost of using a single merged dwell for both rows N and N+1 may be calculated, for example, using the equation of Table 3. That is, the cost of a merged dwell would be the $DD_{MAX}$ of rows N and N+1 divided by the $RVT_{MIN}$ of rows N and N+1.

If using separate dwells yields a lower cost than a merged dwell, the rows are kept separate. In the example of Solution Array 9046 of FIG. 24E, there are two rows in the Solution Array. The cost of using two separate dwells for these two rows is approximately 0.003, as shown in Table 13. The cost of using a single merged dwell is 0.004, as shown in Table 14. Because the cost of using separate dwells is less, the rows are not merged.

TABLE 13

$$\text{cost} = \frac{2 + 1\left(\frac{700}{500} - 1\right)}{700}$$

$$\text{cost} \approx .003$$

TABLE 14

$$\text{cost} = \frac{2}{500}$$

$$\text{cost} = .004$$

In the cost computation examples in Table 13 and Table 14, minimum dwell duration (MDT) was used for the sake of simplicity. As mentioned above, the actual dwell duration may in some situations be greater than the minimum dwell duration. It should be appreciated that in any cost computation involving dwell duration an estimation of the actual dwell duration may be used, for example, using the equations of Table 7 and Table 8 to determine an estimate of the actual dwell duration. However, for the sake of simplicity in the examples included herein, MDT may sometimes be substituted for the estimate of actual dwell duration.

If it is determined that the rows should not be merged at act 9028, the process continues to act 9030, where it is determined if N+1 is the last row in the solution array. If N+1 is the last row in the Solution Array the process continues to act 9032 where it is determined if any rows have been merged. If no rows have been merged, the process continues to act 9054 where the Solution Array is returned as the solution. Each row represents a dwell and the parameters of the dwell that will be used. Thus, in the example of Solution Array 9046, no rows were merged because it was decided to maintain separate dwells. FIG. 24F shows the Solution Array that will be returned as the solution. Solution Array has two rows, thus two dwells may be used. The first dwell has an MDT of 1, an EDT 19 and an RVT of 500, while the second dwell has an MDT of 2, an EDT of 11, and an RVT of 700.

However, if at act 9032, it is determined that two or more rows have been previously merged (e.g., on a previous iteration) the process continues to act 9042, where all rows in the Solution Array are removed from the Solution Array and added back into the Data Array. The order of the rows in the Solution Array is maintained in the Data Array. The process then returns back to act 9010 of FIG. 22, so that it may be determined, for the new rows created by the merging of rows, if it is possible to exclude the dwell duration of any of these rows in determining $DD_{MAX}$. The process then continues from 9010 as described above, until the Data Array is again empty and the unique solutions from the Data Array have been moved in to the Solution Array.

However, if at act 9030, it is determined that more than one row remains in the Solution Array the process continues to act 9034, where the index variable N is incremented by one. After the index variable N is incremented, the process returns to act 9028, where the determination as to whether rows should merged or kept separate is made again, this time with respect to the new row N and row N+1.

If it is determined at act 9028 that rows N and N+1 should be merged, then the parameters of Row N are disregarded as a solution, and the parameters of Row N+1 are redefined as the $DD_{MAX}$ and $RVT_{MIN}$ of Rows N and N+1. Thus, pretending for the sake of illustration, that rows 1 and 2 in FIG. 24F yield a lower cost as a single merged dwell (although, as discussed above, these rows actually yield a lower cost as separate dwells), then row 1 would be disregarded and row 2 would be updates so that it's parameters are the $DD_{MAX}$ and $RVT_{MIN}$ of row 1 and row 2 (i.e., MDT of 2, EDT of 19, and RVT of 500). The process then continues to act 9038, where it is determined if row N+1 is the last row in the Solution Array. If Row N+1 is not the last row in the Solution Array then the process continues to act 9034, where the value of the index variable N is incremented by one, and the process returns to act 9028 to evaluate whether the next two rows in the Solution Array should be merged or kept separate. If Row N+1 is the last row in the Solution Array, the process continues to act 9040, where it is determined if the number of rows in the Solution Array is greater than one.

If there is only one row in the Solution Array, the process continues to act 9054, where the Solution Array is returned as the solution. That is, one dwell will be used with the parameters of the row in the Solution Array. If there is more than one row in the Solution Array, the process continues to act 9042, where all rows are removed from the Solution Array into the Data Array and the process returns to act 9010 of FIG. 22. As discussed above, at act 9010 of FIG. 22 the "new" rows created by merging may be determined if it is possible to exclude the dwell duration of any of these rows in determining $DD_{MAX}$.

In this manner, it may be determined for a proposed dwell generated when extracting the scan strategy, if the proposed minimum dwell duration may be decreased, and if more than one dwell covering separate emitters would be more cost effective. It should be appreciated that this method may be performed each time dwell cost is computed or used only sometimes when dwell cost is computed.

Tuning Step Coverage Gap Avoidance

Once the scan strategy is created, a post-processing check may be performed to ensure that no coverage gaps have been introduced between adjacent dwells, as a result of rounding down the minimum frequency between dwells. When the scan strategy is created, if the minimum frequency of a dwell is not an integer multiple of the tuning step of the receiver, then the frequency range of the dwell will be shifted down so that the minimum frequency of the dwell is an integer multiple of the tuning step size. For example suppose the tuning step of the receiver is 10 MHz and a dwell is created having a frequency range of 1255 MHz–1355 MHz. When the scan strategy is created, the frequency range of the dwell may be rounded down to 1250 MHz–1350 MHz, so that the minimum frequency of the dwell (i.e., 1250 MHz) is an integer multiple of the tuning step size (i.e., 10 MHz).

Figure 25:
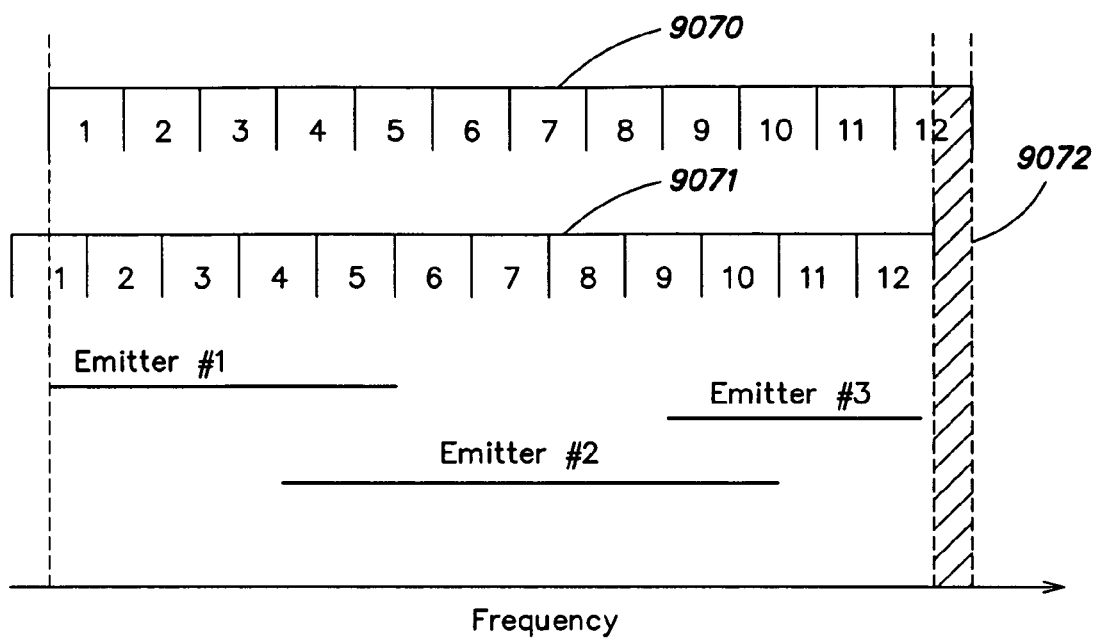
FIG. 25 is a diagram illustrating dwell coverage of emitters after rounding down dwell minimum frequencies, according to one embodiment of the invention.

For example, FIG. 25 shows a portion of a scan strategy 9070. The portion of scan strategy 9070 includes adjacent dwells 1–12. A dwell is adjacent to another dwell if the frequency range of that dwell ends where the frequency range of the other dwell begins or if the frequency range of that dwell begins where the frequency range of the other dwell ends. For example, in the portion of scan strategy 9070, dwells 1 and 2 are adjacent to each other because the frequency range of dwell 1 ends where the frequency range of dwell 2 begins. Similarly, dwells 2 and 3 are adjacent, dwell 3 and 4 are adjacent, etc. Hence, dwells 1–12 are a block of adjacent dwells. In the example of FIG. 25, each of the dwells 1–12 has the same bandwidth. However, it should be appreciated that the dwells do not necessarily have to have the same bandwidth to be a block of adjacent dwells. Dwells 1–12 together cover Emitters 1, 2, and 3.

Scan strategy 9071 shows the portion of scan strategy 9070 after the frequency range of each dwell has been rounded down so that the minimum frequency of each of the dwells 1–12 is an integer multiple of tuning step size. As a result of this rounding down, there is a portion of the frequency spectrum 9072 that is no longer covered by any of the dwells 1–12. This portion of the frequency spectrum was previously covered by dwell 12 in scan strategy 9070, but was left uncovered when the frequency range of dwell 12 was rounded down in scan strategy 9071. Nonetheless, there is no coverage gap introduced because the entire frequency range of Emitter 3 is still covered by dwells 9, 10, 11, and 12. However, if the frequency range of Emitter 3 had extended into the portion of the frequency spectrum 9072, then a portion of the frequency range in which Emitter 3 may operate is left uncovered by the scan strategy.

Figure 26:
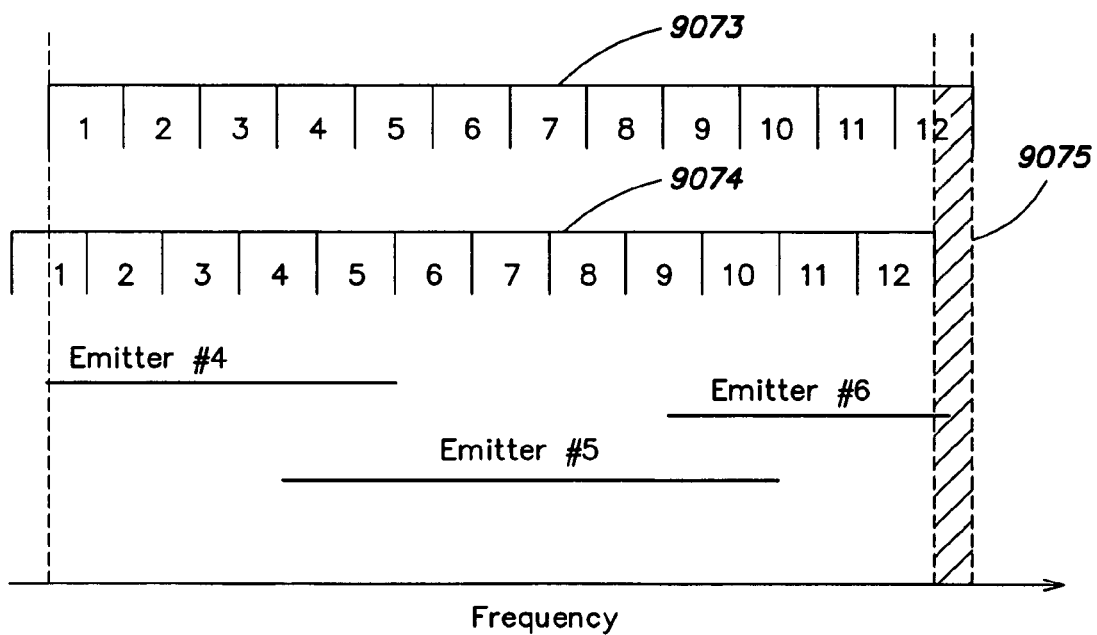
FIG. 26 is a diagram illustrating dwell coverage of emitters after rounding down dwell minimum frequencies, according to one embodiment of the invention.

For example, in FIG. 26 scan strategy 9073 is a portion of scan strategy again including 12 adjacent dwells (i.e., dwells 1–12). These dwells together are intended to cover Emitters 4, 5, and 6. Scan strategy 9074 results after the dwells of scan strategy 9073 are rounded down so that their minimum frequencies are integer multiples of the tuning step size. Similar to FIG. 25, a portion of the frequency spectrum 9075 that was previously covered by dwell 12 is left uncovered after dwell 12 is rounded down. However, in this instance, the frequency range in which Emitter 6 may operate extends into this portion of the frequency spectrum 9075. Thus, because a portion of the frequency range of Emitter 6 is not covered by a dwell, a coverage gap is introduced.

In one embodiment of the invention, this problem is detected and corrected by providing an addition dwell to cover the portion of the frequency spectrum left uncovered by the rounding down of dwells. Typically, coverage gaps are only problem for smaller bandwidth dwells. In the case of larger bandwidth dwells, when the receiver is stepped through the frequency range covered by the dwell and reaches the top of the frequency range of the dwell (i.e., the last tuning step of the dwell), the bandwidth of the detecting method is wide enough to pick up any emitter signals that are left uncovered above the maximum frequency range of the dwell. Therefore, in one embodiment of the invention, only the smallest bandwidth dwells are checked to determine if any coverage gaps have been introduced as a result of rounding down the minimum frequency of dwells. However, it should be appreciated that all dwells may be checked for this problem or only a subset of dwells may be checked.

Figure 27:
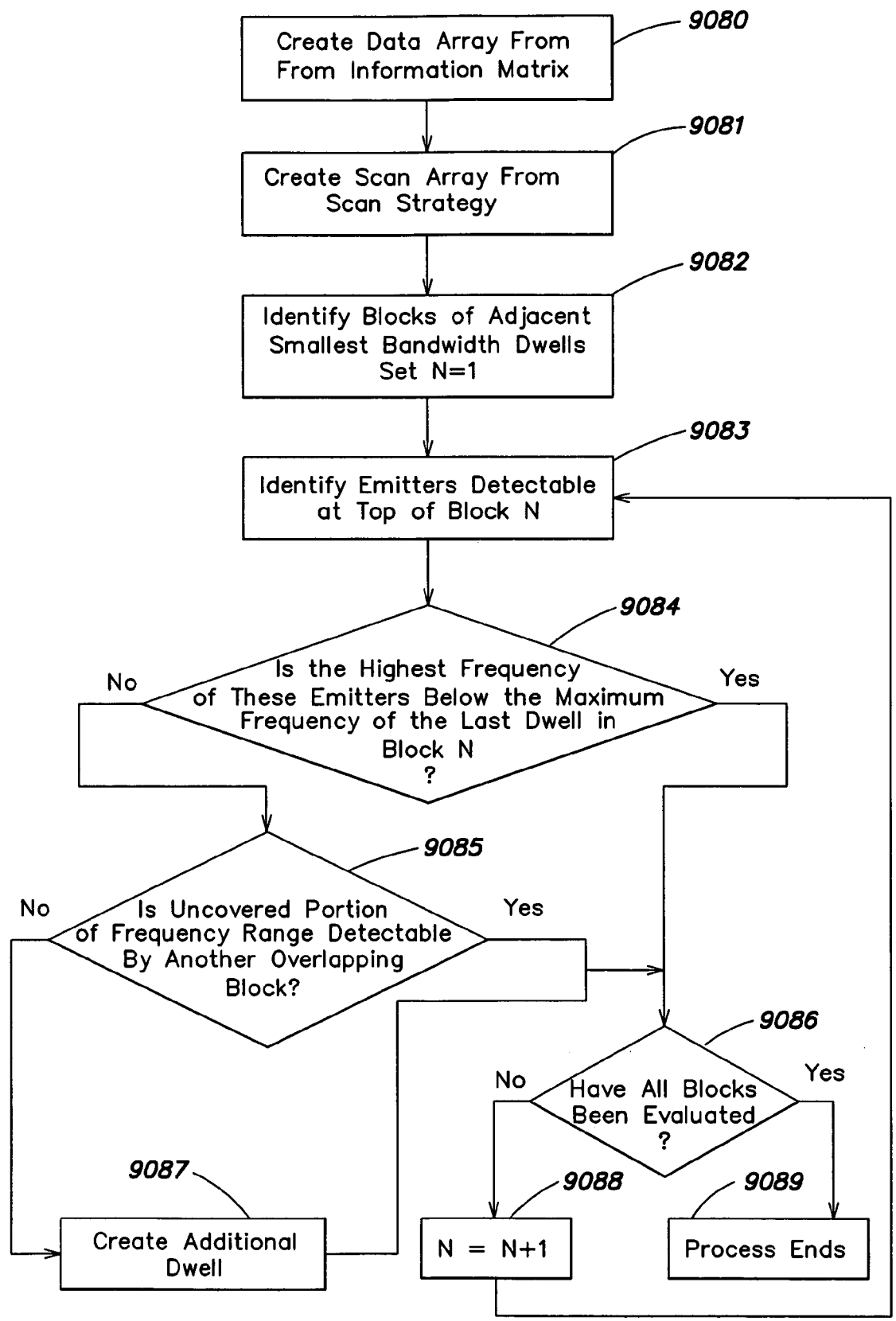
FIG. 27 is a flow chart illustrating a method of compensating for tuning step coverage gaps, according to one embodiment of the invention.

FIG. 27 is a flowchart illustrating a method for determining if any coverage gaps exist as a result of rounding down the smallest bandwidth dwells of the scan strategy. At act 9080 a Data Array is created. The Data Array is an array based on the Information Matrix. Each row in the Data Array represents an emitter/mode for which the scan strategy was created to detect. The columns in the Data Array represent the parameters of these emitters (e.g., RF Min, RF Max, dwell duration, revisit times, etc.). After the Data Array is created, the process continues to Act 9081 where the Scan Array is created based on the scan strategy. Each row in the Scan Array represents a dwell in the scan strategy. The columns of the Scan Array represent the parameters of the dwell (e.g., MDT, EDT, RVT, etc.). Once the Scan Array is created, the process continues to act 9082, where the Scan Array is used to identify blocks of adjacent smallest bandwidth dwells. A block may include one or more dwells. Also at act 9082, the index variable N is set to one. This index variable is used to identify which block identified in act 9082 is currently being analyzed.

The process next continues to act 9083 where any emitters that are detectable at the top of block N are identified. That is, any emitters that are detectable by the top most dwell (i.e., highest maximum frequency dwell) in the block are identified. This includes emitters whose maximum frequency exceeds the maximum frequency of the dwell by at most one tuning step. The process then continues to act 9084 where it is determined if the highest frequencies the emitters identified in act 9083 are below the maximum frequency of the top most dwell in block N. If there are no emitters whose maximum frequency exceeds the maximum frequency of the block, then the process continues to act 9086, where it is determined if all blocks have been evaluated. If all blocks have been evaluated for the existence of coverage gaps then the process ends at act 9089. Otherwise, if some blocks have not yet been evaluated the process continues to act 9088 where the value of N is incremented by one and the process returns to act 9083 and the next block of adjacent dwells is evaluated for the existence of coverage gaps.

If, at act 9084, it is determined that one or more emitters' highest frequency exceeds the highest frequency of the top most dwell of block N, then the process continues to act 9085. At act 9085 it is determined if the uncovered portion of the frequency spectrum created by the rounding down of the top most dwell of block N is covered by another dwell and if the emitter or emitters which are uncovered are detectable by that dwell. This may be determined, for example, by searching the Scan Array for additional dwells which cover that portion of the frequency range, whose parameters are suitable for detecting the uncovered emitter or emitters.

If the uncovered portion of the emitter or emitters is detectable by another dwell, then the process continues to act 9086 where it is determined if all blocks have been evaluated. If all blocks have been evaluated for the existence of coverage gaps then the process ends at act 9089. Otherwise, if some blocks have not yet been evaluated the process continues to act 9088 where the value of N is incremented by one and the process returns to act 9083 and the next block of adjacent dwells is evaluated for the existence of coverage gaps.

Otherwise, if the uncovered portion of the emitter or emitters is not detectable by another dwell, a new dwell is created and this additional dwell is appended to the top most dwell of block N. The parameters of this dwell are set so that they cover the emitter or emitters that were left uncovered as a result of the rounding down of the top most dwell of block N. That is, the dwell duration and revisit time of the additional dwell will be the $DD_{MAX}$ and $RVT_{MIN}$ of the emitter or emitters that were left uncovered.

After the additional dwell has been created, the process continues to act 9086 where it is determined if all blocks have been evaluated. If all blocks have been evaluated for the existence of coverage gaps then the process ends at act 9089. Otherwise, if some blocks have not yet been evaluated the process continues to act 9088 where the value of N is incremented by one and the process returns to act 9083 and the next block of adjacent dwells is evaluated for the existence of coverage gaps.

It should be appreciated that if it is known that all dwells have a minimum frequency that is an integer multiple of the tuning step size, then it may not be necessary to check for coverage gaps. Many modifications to the general algorithm shown in FIG. 27 may occur to those skilled in the art and these are intended to be within the spirit and scope of the invention.

Resource Verification and Allocation

As described above, a scan strategy may be generated using data from the information matrix. However, the scan strategy may not be realizable due to hardware or software limitations of the receiver system. In one embodiment of the invention, the scan strategy is checked to verify that the scan strategy is realizable by the receiver system. If it is determined that the scan strategy is not realizable, then the scan strategy may be replaced or modified to fit within the capacity of the receiver system.

The limitations of the receiver system may be expressed as a limit on the total number of dwells and limits on the quantity of dwell types. That is, the receiver system may have capacity for a certain number of dwells total, as well as capacity for a certain number of dwells for each unique instantaneous frequency (IF) of the detecting methods. An algorithm may be used to check for dwell capacity violations. If any capacity violations are found, the excess capacity may be removed from the scan strategy. The portion of the scan strategy that is removed may be replaced with a scan strategy that is constrained not to use the consumed receiver system assets.

An algorithm for determining if a scan strategy is realizable by the receiver system and for constraining the scan strategy to fit within the capacity of the receiver system according to one embodiment of the invention is described below. This algorithm may be performed as a post-processing task, after the scan strategy has been generated. The algorithm tests the scan strategy from the widest IF bandwidth to the smallest. As capacity limits are reached for a particular IF bandwidth, the excess capacity dwells are removed, so that the capacity is satisfied for that particular bandwidth. These dwells may be replaced, for example, by using the dwell placement algorithms shown in FIGS. 15, 16, and 18, to create new dwells that cover the frequency range of the removed dwells. However, when the dwell placement algorithm is used, it will be constrained to only using detecting methods having an IF bandwidth less than that of the removed dwells. This process may be repeated for each IF bandwidth, from widest to smallest. As a result, capacity violations are "bow waved" to smaller IF bandwidths.

If the smallest IF bandwidth is checked and capacity violations still exist, then dwells may be discarded from the scan strategy. However, because any capacity violations have been "bow waved" to the smallest IF bandwidth, any discarded dwells will use a detecting method of the smallest IF bandwidth. Thus, the amount of frequency coverage that is lost by discarding dwells is reduced because the discarded dwells are smallest IF bandwidth dwells. Additionally, if dwells are discarded, an error may be logged which indicates to the operator that some frequency coverage may have been lost.

Figure 28:
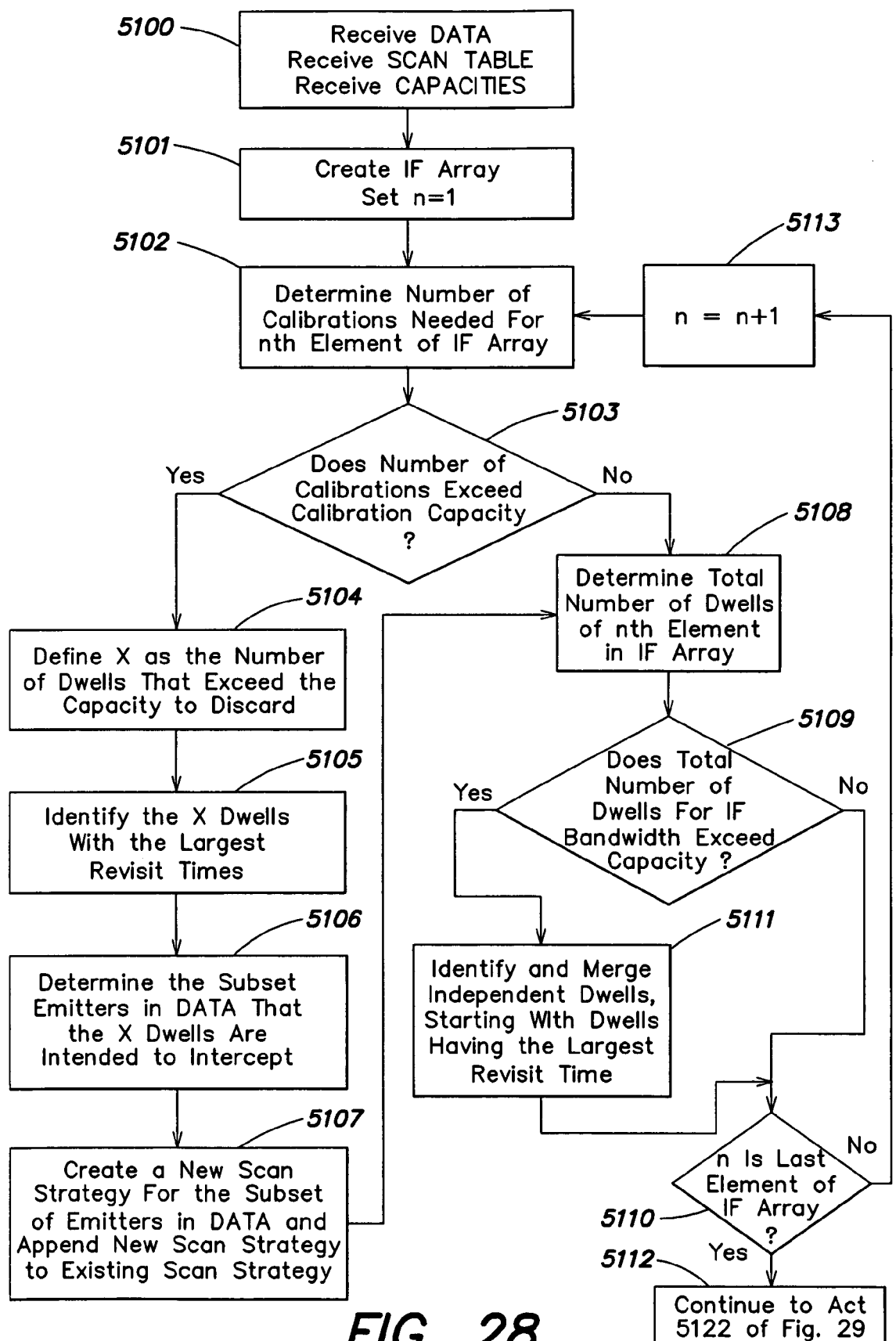
FIG. 28 is a flow chart illustrating a method for verifying and allocating receiver system resources, according to one embodiment of the invention.
Figure 29:
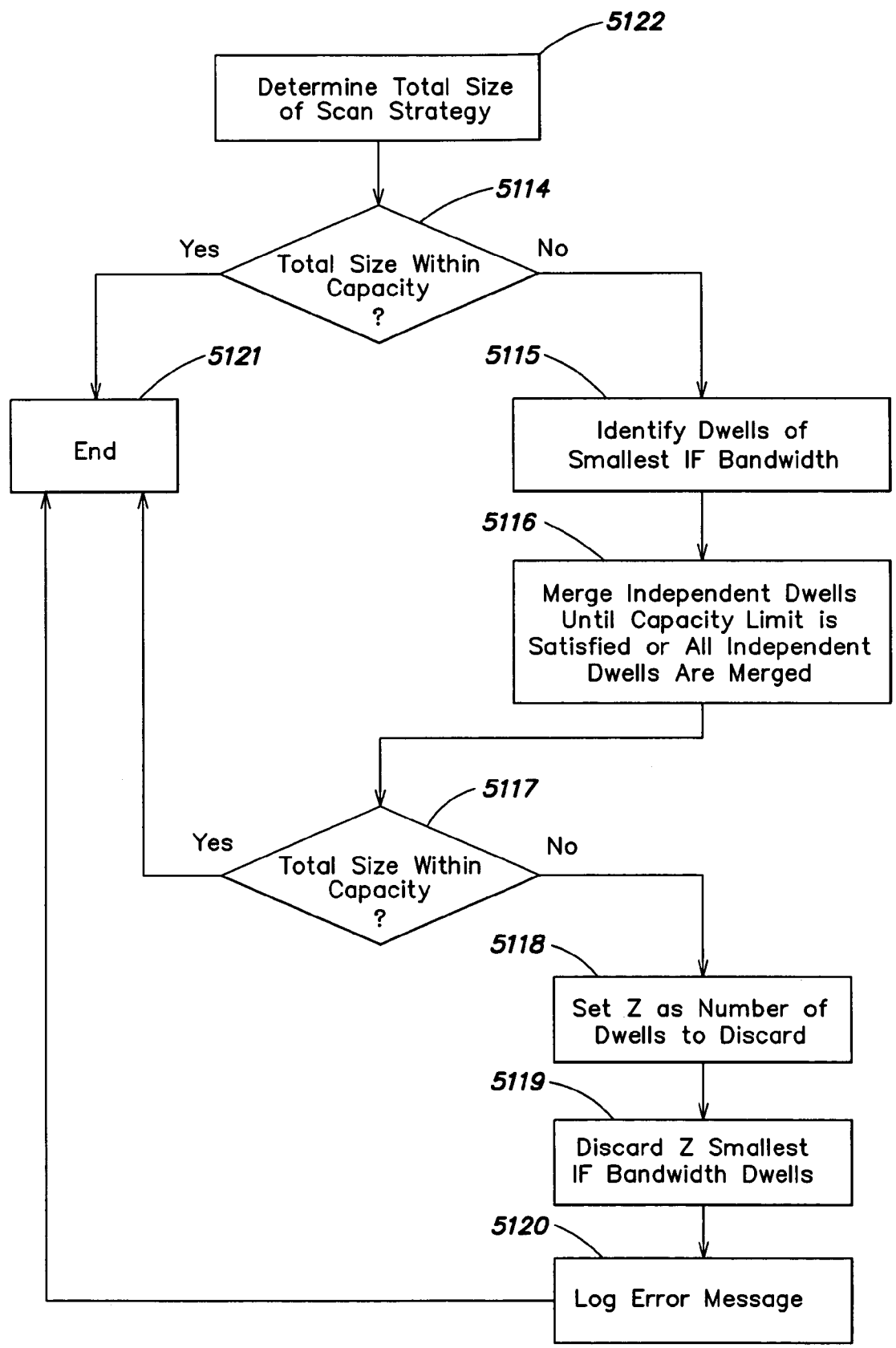
FIG. 29 is a flow chart illustrating a method for verifying and allocating receiver system resources, according to one embodiment of the invention.

FIG. 28 and FIG. 29 are flow charts illustrating an example of such an algorithm. At act 5100 of FIG. 28, DATA, SCAN TABLE and CAPACITIES are received. DATA is a matrix of emitter parameters, where each row in the matrix represents an emitter that is covered by the scan strategy. DATA may be, for example, the information matrix used in creating the scan strategy. SCAN TABLE is a table describing the scan strategy. That is, SCAN TABLE is a table of the dwells in the scan strategy. CAPACITIES includes information relating to the capacity of the receiver system. The capacity of the receiver system may be expressed in various ways. For example, the capacity may be expressed in limitations on number of dwells permitted and number of dwells permitted per unique IF bandwidth, and number of hardware calibrations permitted for a dwell. While the examples below discuss receiver system capacity in terms of calibrations it should be appreciated that any suitable measure at capacity may be used and the invention is not limited in this respect.

Once DATA, SCAN TABLE, and CAPACITIES are received, the process continues to act 5101, where an IF Array is created and the index variable, n, is set to one. The IF Array may be, for example, a one-dimensional array, that lists all the unique IF bandwidths, ordered from the widest IF bandwidth to the smallest IF bandwidth. As discussed above, a detecting method is a particular IF/VBW bandwidth combination. Thus, for example, if there are eight unique detecting methods available, there may be, for example, four unique IF bandwidths. In this case, the IF Array would include these four unique bandwidths, ordered from widest to smallest. In the example information matrix shown in FIG. 13, there are two detecting methods available. The first has an IF bandwidth of 250 MHz and the second has an IF bandwidth of 30 MHz. Thus, if only these two detecting methods were available, the IF Array would include these two elements. 250 MHz would precede 30 MHz in the IF Array because an IF bandwidth of 250 MHz is wider than an IF bandwidth of 30 MHz. It should be appreciated that, as any number of detecting methods may be used, the IF Array may include any number of elements, as the invention is not limited in this respect. The index variable n indicates the position in the IF Array that is currently being examined. Thus, at act 5101 n is initialized to one.

The process continues to act 5102 where the number of calibrations needed for the dwells in the scan strategy having an IF bandwidth of the nth element of the IF Array is determined. A calibration refers to the hardware configuration of a dwell. Some dwells may only differ in terms of timing (i.e., dwell duration and revisit time). If these dwells share the same hardware configuration, then they share the same calibration. Thus, there may be a certain number of unique dwells of a particular IF bandwidth, but the number of unique hardware configurations for those dwells may be less than that number (i.e., if two or more dwells have the same hardware configuration). Thus, two dwells have a the same calibration if they have the same IF bandwidth, video bandwidth (VBW), and center frequency. Typically, more receiver system resources are required to support the wider bandwidth dwells. Receiver systems are usually calibrated versus frequency. Thus, the wider the IF bandwidth of the dwell, the more frequency calibration points are required.

Once the number of frequency calibrations that are needed for the dwells of that particular IF bandwidth is determined the process continues to act 5103, where it is determined if the number of calibrations for the particular IF bandwidth determined at act 5102 exceeds the number of allowable calibrations for the particular IF bandwidth. This determination may be made, for example, by using the information in CAPACITIES.

If the number of frequency calibrations needed for the dwells of the particular IF bandwidth exceed the limitation imposed by the receiver system, the process continues to act 5104. Here, the variable X is defined as the number of dwells that that exceed the capacity to be discarded. That is, at act 5104, the number of dwells that may be discarded so that the number of frequency calibrations needed meets the limitation of the receiver system is determined. For the sake of clarity, this number is represented by the variable X. The process then continues to act 5105 where the X dwells with the largest revisit times are identified. These dwells are the dwells to be discarded.

The process continues to act 5106 where the subset of emitter in DATA that the X dwells were are intended to intercept is determined. Thus, the emitters (or portions of emitters) that are left uncovered by discarding the X dwells is determined. The process then continues to act 5107, where a new scan strategy is created for the subset of emitters that were left uncovered. This may be accomplished, for example, by creating an information matrix using the subset of emitters in DATA that are left uncovered, and performing the methods illustrated in FIG. 15 and FIG. 16 for determining a scan strategy, using this information matrix. However, the method of FIG. 16 is constrained so that detecting methods having an IF bandwidth greater than or equal to that of the discarded dwells cannot be used. That is, these detecting methods may be excluded from the Method Vector. Thus, a new scan strategy results for this subset of emitters, and this new scan strategy may be appended to the existing scan strategy, to provide coverage for the subset of emitters that were left uncovered by the discarding the X dwells.

Once the new scan strategy has been created and appended to the existing scan strategy the process continues to act 5108. If, at act 5103, it was determined that the number of calibrations does not exceed the calibration capacity of the receiver for that particular IF bandwidth, the process goes directly to act 5108. At act 5108, the total number of dwells with an IF bandwidth of the current IF bandwidth being analyzed (i.e., the nth element of the IF Array) is determined. The process then continues to act 5109 where it is determined if the number of dwells determined in 5108 exceed the receiver's capacity for dwells of the particular IF bandwidth. This determination may be made, for example, by comparing the number of dwells determined in act 5108 to the limit on dwells of the particular IF bandwidth specified in CAPACITIES.

If the total number of dwells for the IF bandwidth being examined exceeds the receiver system capacity, the process continues to act 5111. At act 5111 any independent dwells of the particular IF bandwidth are identified. These dwells are merged, starting with the independent dwells having the largest revisit times, until the number of dwells falls within the receiver system limits. By merging the dwells with largest revisit times first, the cost savings that is lost by using a merged dwell instead of separate dwells is reduced. The process then continues to act 5110 where it is determined if the nth element of the IF Array is the last element of the IF Array. If it is, then all IF bandwidths have been examined and the process continues to act 5112. If not all IF bandwidths have been examined then the process continues to act 5113, where the index variable n is incremented by one and the process repeats for the next IF bandwidth in the IF Array. That is, the next IF bandwidth in the IF Array will be examined to determine if the number of calibrations needed for that particular IF bandwidth fits within the receiver system capacity (i.e., acts 5102–5107) and if the number of dwells of that IF bandwidth fits within the receiver system capacity (i.e., acts 5108–5111). Thus, each IF bandwidth in the IF Array may be examined.

As mentioned above, once the last element in the IF array has been examined, as described above, the process continues to act 5112. At act 5112, the process continues to act 5113 of FIG. 29. At act 5122 of FIG. 29, the total size of the scan strategy is determined. The total size of the scan strategy may be expressed as the amount of receiver system memory needed to store and support the scan strategy. The process then continues to act 5114 where it is determined if the total size of the scan strategy is within the receiver system's capacity. If the scan strategy is within the capacity of the receiver system then the process ends at act 5121.

Otherwise, the process continues to act 5115 where the dwell of the smallest IF bandwidth are identified. The process continues to act 5116 where any independent dwells of the smallest IF bandwidth are merged until the capacity limit is satisfied or all independent dwells are merged. The process then continues to act 5117 where the size of scan strategy is again evaluated to determine if it is within the receiver system's capacity. If the scan strategy size is within the receiver system capacity, then the process continues to act 5121 where the process ends. Otherwise, the process continues to act 5118 where the number of dwells to be discarded so that the scan strategy size is within the receiver system capacity is determined. This number is defined as Z. The process then continues to act 5119 where Z smallest IF bandwidth dwells are discarded. The process then continues to act 5120 where an error message is logged for the operator indicating that a subset of emitters is left uncovered by the Z dwells which were discarded. The process then continues to act 5121 where the process ends.

It should be appreciated that many modifications may be made to the general algorithm described above and these are intended to be within the spirit and scope of the invention.

Intercept Performance Evaluation

Once a scan strategy is created, the scan strategy's intercept performance against a given emitter set under specific altitude, range and receiver load conditions may be evaluated. Evaluating the scan strategy may include modeling 2D and 3D emitter scan patterns, and the compilation of performance statistics for each emitter mode analyzed.

Intercept performance evaluation allows for an independent means of validating the scan strategy. A scan strategy may be built by applying sets of algorithms to determine the best way to satisfy a group of emitter characteristics. If the algorithms are perfect, and the emitter data does not conflict, then the scan strategy should be correct. However, the possible combinations of input data and their interactions can be very complex, so an independent means of validating the scan strategy may be desirable. As a result, one avoids the cost of lab testing with actual receiver system hardware and software to prove probability of intercept and mean time to intercept performance. Thus, each emitter is tested for detectability and intercept performance against the probability of detection and mean time to intercept requirements and reports are produced for a user to review.

Intercept performance evaluation may also take into account performance variation as a result of scenario assumptions. The scan strategy may be built for a specific set of emitters under specific engagement scenarios. Intercept performance evaluation allows variation in the scenario assumptions from those for which the scan strategy was built, and allows for evaluation of how well a scan strategy built for one set of emitters might perform for a different set.

An algorithm for intercept performance is described below. The algorithm uses a DATA matrix, which is a matrix of emitter parameters. Each row in DATA represents an emitter/mode. The algorithm also uses an Emitter List, that includes a list of emitters in DATA selected for probability of intercept and mean time to intercept analysis. The algorithm also a uses the scan strategy that was built. The scan strategy includes a set of dwells whose performance will be evaluated against the emitters in the Emitter List. Lastly, the algorithm uses a set of scenario assumptions. These scenario assumptions are parameters which define the intercept conditions and may include altitude, velocity, and scan load estimate.

Figure 30:
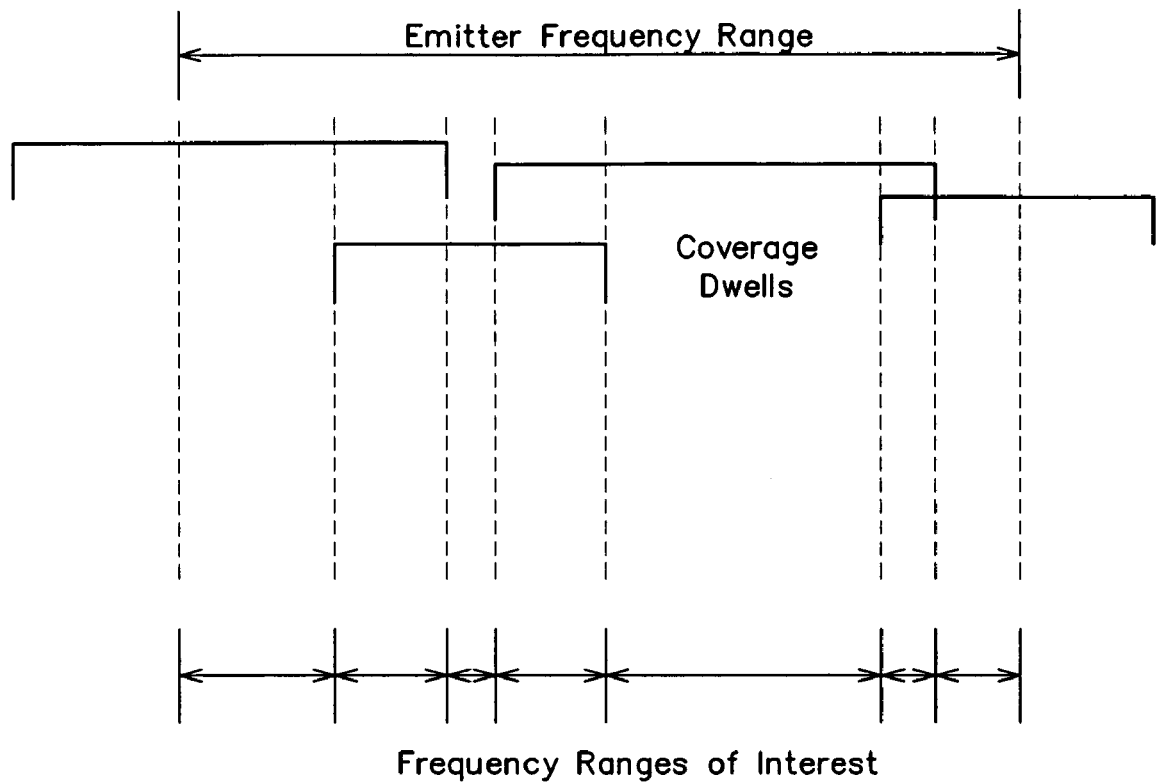
FIG. 30 is a diagram showing an emitter's frequency range broken up into discrete pieces, according to one embodiment of the invention.

The algorithm begins by computing the probability of intercept and mean time to intercept for each entry in the Emitter List. This may be accomplished by, for each emitter in the emitter list, finding that emitter in the DATA matrix and extracting its parameters. Then, the subset of dwells in scan strategy that provide coverage based on hardware attributes of the dwell (e.g., frequency coverage, pulse width coverage) is identified. If no dwell is found in the scan strategy, a coverage error may be logged to the user and the next emitter in the Emitter List. If one or more dwells is identified, the emitter's frequency range may be broken down into discrete pieces, as defined by the intersection with subset of detection dwell. FIG. 30 illustrates the breakdown of an emitter's frequency range into discrete pieces. As illustrated in FIG. 30, each portion of the emitter's frequency range that is covered by a unique combination of dwells is considered a discrete piece.

For each discrete frequency piece, p, identify the subset of dwells that cover that frequency piece. For each dwell of the subset of dwells, the following steps are performed. A simulation may be performed for each dwell against the emitter to generate a set of time-to-intercept results. The simulation for generating the time-to-intercept results will be discussed below in greater detail. Next, a normalized histogram of the time-to-intercept data may be created. Additional plots of the data may also be created. Next, the time-to-intercept data may be converted to probability of detection and mean time to intercept statistics. The probability of detection may be determined based on the percentage of time-to-intercept times less than or equal to required intercept time. The mean time to intercept may be generated based on the average of all time-to-intercept values. Further, the statistics generated by the simulation for each dwell and for each frequency piece may be stored.

Next, for each discrete frequency piece, p, the contribution of the composite dwells, to that frequency piece may be computed. Table 15 shows an equation for computing the contribution of the composite dwells (n) to the mean time to intercept (MTTI) for p. Table 16 shows an equation for computing the contribution of the composite dwells (n) to the probability of detection (Pd) for p.

TABLE 15

$$MTTI_p = \sum_n \frac{1}{MTTI_n}$$

TABLE 16

$$Pd_p = 1 - \prod_n (1 - Pd_n)$$

Using the equations of Table 15 and Table 16, the minimum performance may be recorded. The minimum performance is represented by the smallest $Pd_p$ value and largest $MTTI_p$ value. Also, the overall performance may be determined. The overall Pd and the overall MTTI are the weighted average of $Pd_p$ and $MTTI_p$ respectively. The weight for each piece is the ratio of each piece's frequency range divided by the emitter's frequency range.

Figure 31:
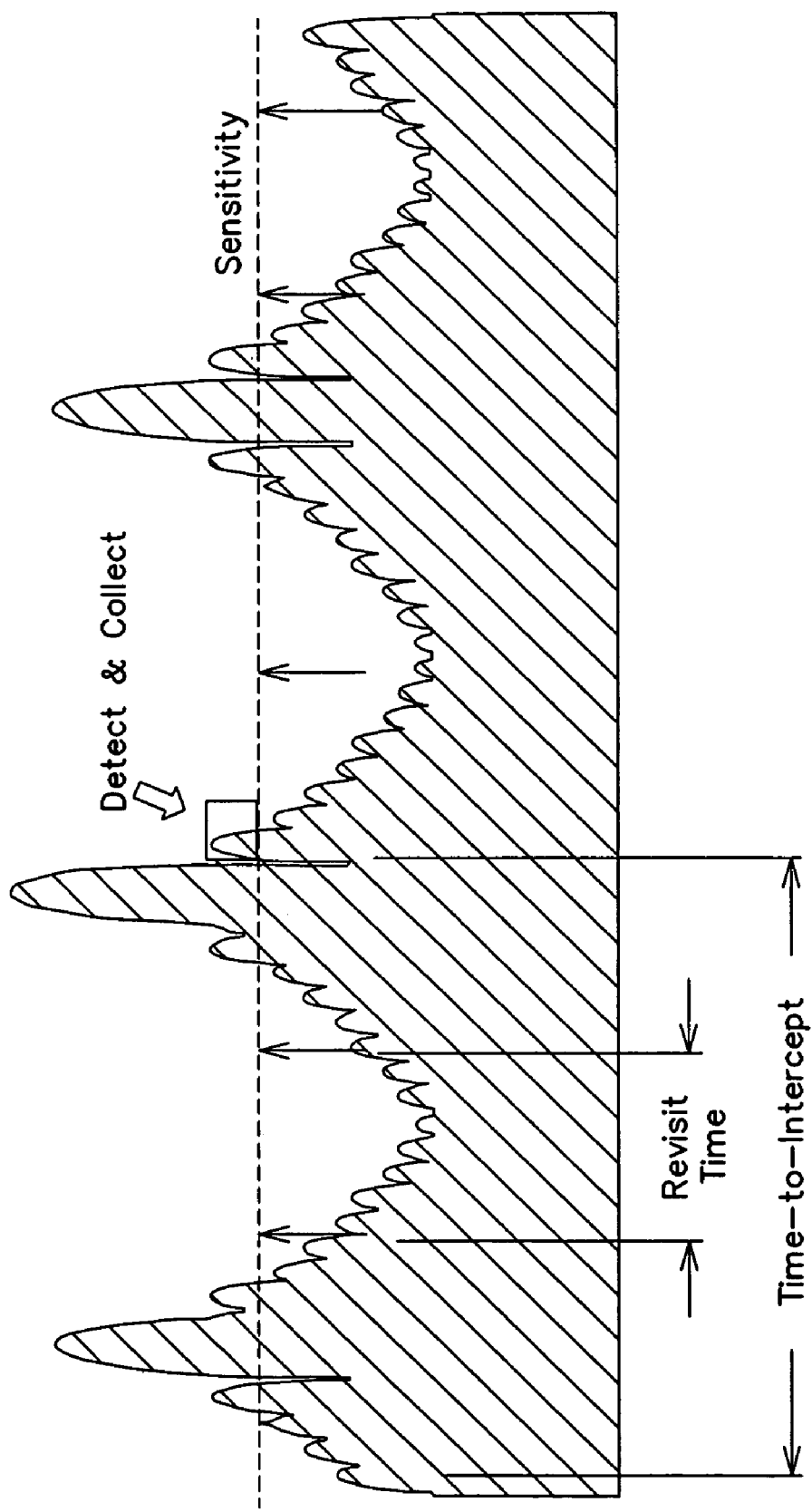
FIG. 31 is a diagram showing simulated detection of an emitter's scan pattern according to one embodiment of the invention.

As mentioned above, a simulation may be run to generate a set of time-to-intercept values. In one embodiment of the invention, a Monte Carlo simulation is performed to generate the data used to determine the statistics of intercept of a specific dwell against a specific emitter. The emitter's scan is simulated and time above dwell sensitivity is noted, reduced by the amount of time required for data collection. This represents the illumination time periods available for intercept. FIG. 31 shows an emitter scan pattern. FIG. 31 also shows an sensitivity threshold, based on the sensitivity of the dwell. The dwell's time of execution is modeled as a random process with a mean value of revisit time. "Jitter"

about the mean may be represented by a constant to simulate process noise. The mean revisit time may also be scaled to simulate receiver loading (i.e., utilization). The start time of the emitter's scan and the start time of the first dwell are both randomized at the start of each Monte Carlo trial. The trial ends when the dwell start time falls within one of the time periods available for intercept and the dwell duration captures at least one pulse or signal sample of the emitter. The time from emitter scan start to this time is recorded as the Time-to-Intercept for this trial. The number of Monte Carlo trials to perform may be selected by a user or may be specified in another manner. An array of time-to-intercept values is returned.

An algorithm for performing the simulation is described below. The algorithm uses a set of Emitter Parameters of the emitter to evaluate, a set of dwell parameters of a dwell for which the emitter will be evaluated, and a set of scenario assumptions, including parameters which define the intercept conditions (e.g., altitude, velocity, and scan load estimate, utilization)

The algorithm begins by using the set of scenario assumptions to determine Antenna/Scan pattern detectability. If there is real antenna data available, this data may be used in determining the antenna detectability. Otherwise, a propagation model may be used. If the emitter is a steady emitter, the propagation module may use insignificant amplitude modulation as a function of time/angle. If the emitter is a 2D emitter (e.g., sector, circular), the propagation model may use amplitude modulation as a function of time/angle in the azimuth plane only. If the emitter is a 3D emitter (e.g., electronic, mechanical raster), the propagation module may use amplitude modulation as a function of time/angle in several elevation planes and across azimuth.

Figure 32:
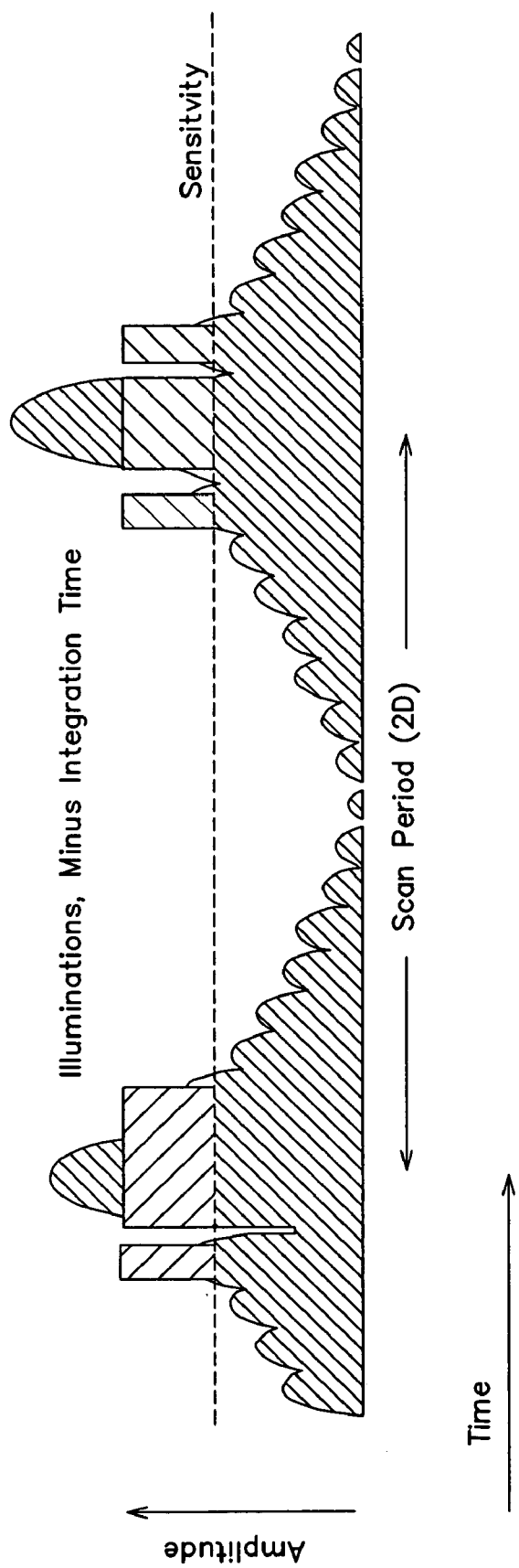
FIG. 32 is a diagram showing illumination periods of an emitter's scan pattern, minus integration time, according to one embodiment of the invention.

If the maximum amplitude is less than the dwell's sensitivity, then zero may be recorded as the time-to-intercept to indicate that the emitter is not detectable by the dwell. Otherwise, the start and stop times of each illumination time per scan period may be recorded. As shown in FIG. 32, the stop time may be reduce by the desired minimum integration time to declare a detection (e.g., several pulses or samples).

Once the antenna scan pattern is determined, a series of Monte Carlo trials may be performed. For each Monte Carlo trial, the following acts may be performed. First antenna pointing angle (antenna scan start) is randomized. The revisit time (RVT) may then be scaled by the load factor (i.e., RVT=RVT×Utilization). Next, the initial time T (i.e., time for first dwell execution) is set as a random value of process noise jitter. Next it is determined if T intersects one of the illumination periods of the scan pattern. If T does not intersect one of the illuminations, then T may be incremented by RVT plus process noise jitter (jitter always≦RVT) and again it may be determined if T intersects one of the illumination periods. If T grows too large, the time-to-intercept for this Monte Carlo trial is recorded as "infinity" and the next trial may be run. If T does intersect one of the illumination periods, it may be determined if the dwell duration (T, T+MDT) brackets at least one pulse or sample (i.e., if the receiver dwelled long enough to declare detection).

If the dwell duration did not bracket at least one pulse, T may be increased by RVT plus process noise jitter and it may again be determined if T intersects one of the illumination periods, as described above. Otherwise, T may be recorded as a valid time-to-intercept value for this Monte Carlo trial and the algorithm may proceed to next trial.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for use in detecting emitter signals, the method comprising acts of:
   determining, for at least one emitter, a period at which a jamming signal to jam at least one signal generated by the at least one emitter is applied by an on-board jammer; and
   determining, for the at least one emitter, a detection period in which an on-board receiver is configured to detect the at least one signal generated by the at least one emitter, wherein the act of determining the detection period is based on the period in which the jamming signal is applied.

2. The method according to claim 1, further comprising an act of determining, for the at least one emitter, an indication that the at least one emitter is affected by the jamming signal.

3. The method according to claim 2, further comprising an act of determining, for the on-board receiver, an indication that the on-board receiver is affected by the jamming signal.

4. A computer-readable medium having computer-readable signals stored thereon that define instructions that, as a result of being executed by a computer, instruct the computer to perform a method for use in detecting emitter signals, the method comprising acts of:
   determining, for at least one emitter, a period at which a jamming signal to jam at least one signal generated by the at least one emitter is applied by an on-board jammer; and
   determining, for the at least one emitter, a detection period in which an on-board receiver is configured to detect the at least one signal generated by the at least one emitter, wherein the act of determining the detection period is based on the period in which the jamming signal is applied.

5. The computer-readable medium according to claim 4, wherein the method further comprises an act of determining, for the at least one emitter, an indication that the at least one emitter is affected by the jamming signal.

6. The computer-readable medium according to claim 5, wherein the method further comprises an act of determining, for the on-board receiver, an indication that the on-board receiver is affected by the jamming signal.

* * * * *